United States Patent
Yamaguchi et al.

(10) Patent No.: US 8,704,804 B2
(45) Date of Patent: Apr. 22, 2014

(54) DISPLAY APPARATUS AND DISPLAY METHOD

(75) Inventors: Kazunori Yamaguchi, Kanagawa (JP); Tsutomu Harada, Kanagawa (JP); Mitsuru Tateuchi, Kanagawa (JP)

(73) Assignee: Japan Display West Inc., Aichi-Ken ( * ) Notice: Subject to any disclaimer, the term of this patent is extended or adjusted under 35 U.S.C. 154(b) by 752 days.

(21) Appl. No.: 11/537,825

(22) Filed: Oct. 2, 2006

(65) Prior Publication Data

US 2007/0120833 A1    May 31, 2007

(30) Foreign Application Priority Data

Oct. 5, 2005  (JP) ............................... P2005-292605
Sep. 12, 2006  (JP) ............................... P2006-246875

(51) Int. Cl.
*G09G 5/00*    (2006.01)

(52) U.S. Cl.
USPC ............ 345/204; 345/173; 345/102; 715/863

(58) Field of Classification Search
USPC ............ 345/204, 173, 102; 715/863; 382/274
See application file for complete search history.

(56) References Cited

U.S. PATENT DOCUMENTS

| | | | |
|---|---|---|---|
| 4,761,637 A | | 8/1988 | Lucas et al. |
| 5,825,352 A | | 10/1998 | Bisset et al. |
| 7,586,479 B2 | * | 9/2009 | Park et al. ...................... 345/102 |
| 2002/0104955 A1 | * | 8/2002 | Koops et al. ............... 250/201.2 |
| 2003/0156100 A1 | * | 8/2003 | Gettemy ....................... 345/204 |
| 2006/0017709 A1 | * | 1/2006 | Okano .......................... 345/173 |
| 2006/0026521 A1 | | 2/2006 | Hotelling et al. |
| 2006/0026535 A1 | | 2/2006 | Hotelling et al. |
| 2006/0026536 A1 | * | 2/2006 | Hotelling et al. ............ 715/863 |
| 2006/0161871 A1 | | 7/2006 | Hotelling et al. |
| 2006/0239580 A1 | * | 10/2006 | Dierickx ....................... 382/274 |

FOREIGN PATENT DOCUMENTS

| | | |
|---|---|---|
| JP | HEI 07-168949 | 7/1995 |
| JP | 07-230352 | 8/1995 |
| JP | HEI 07-230352 | 8/1995 |
| JP | HEI 07-261943 | 8/1995 |
| JP | 07-261932 | 10/1995 |

(Continued)

OTHER PUBLICATIONS

Japanese Office Action issued on Mar. 19, 2009, for corresponding Japanese Patent Application JP 2006-246875.

(Continued)

*Primary Examiner* — Amare Mengistu
*Assistant Examiner* — Joseph G Rodriguez
(74) *Attorney, Agent, or Firm* — K&L Gates LLP

(57) ABSTRACT

A display apparatus and display method are provided. The display apparatus capable of displaying an image and receiving light simultaneously or alternately, the display apparatus including: a plurality of display devices laid out to form a matrix; a plurality of light receiving devices for receiving light hitting a display screen; a received-light image generation unit for generating image data representing the state of a substance brought into contact with the display screen or brought to a position in close proximity to the display screen; an image processing/evaluating unit for evaluating the position and size of a substance as well as evaluating changes in the position and in the size; and a command determination unit for recognizing a command entered by an operator. In the display apparatus, predetermined processing according to a command recognized by the command determination unit is carried out.

10 Claims, 36 Drawing Sheets

(56) References Cited

FOREIGN PATENT DOCUMENTS

| | | |
|---|---|---|
| JP | HE 07-261932 | 10/1995 |
| JP | HEI 07-261932 | 10/1995 |
| JP | HEI 09-091079 | 4/1997 |
| JP | HEI 10-198515 | 7/1998 |
| JP | HEI 11-073271 | 3/1999 |
| JP | HEI 11-272422 | 10/1999 |
| JP | 2000-163443 | 6/2000 |
| JP | 2001-502078 | 2/2001 |
| JP | 2001-228971 | 8/2001 |
| JP | 2001-356878 | 12/2001 |
| JP | 2002-175532 | 6/2002 |
| JP | 2003-234945 | 8/2003 |
| JP | 2004-013615 | 1/2004 |
| JP | 2004-228770 | 8/2004 |
| JP | 2004-318819 | 11/2004 |
| JP | 2004-336597 | 11/2004 |
| WO | 98/42125 | 9/1998 |

OTHER PUBLICATIONS

Japanese Office Action dated Dec. 16, 2010, for corresponding Japanese Patent Appln. No. 2006-246875.

Japanese Office Action issued Jun. 7, 2011, for corresponding Japanese Patent Appln. No. 2006-246875.

European Search Report dated Nov. 2, 2010, corresponding to European Appln. No. 10179622.5.

Japanese Office Action issued Dec. 1, 2011, for corresponding Japanese Appln. No. 2009-233629.

Search Report corresponding to European Patent Application No. 06121831.9-2224, Apr. 17, 2007.

Japanese Office Action issued Aug. 30, 2011, for corresponding Japanese Appln. No. 2009-233629.

\* cited by examiner

FIG.7
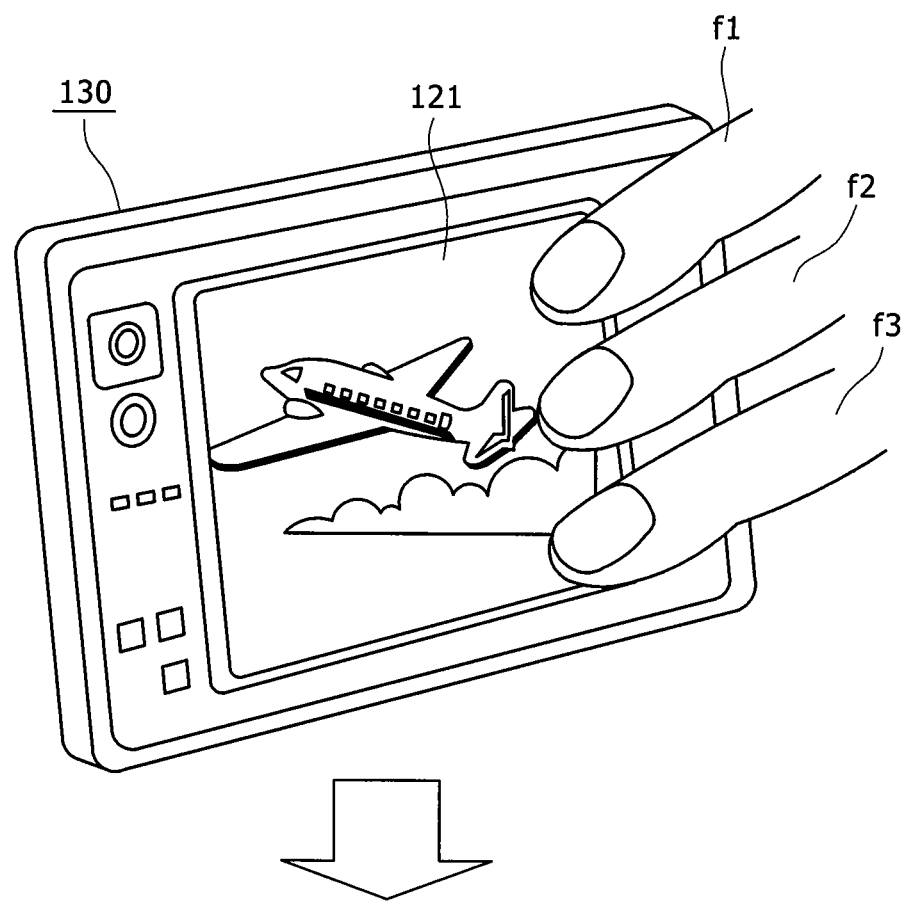
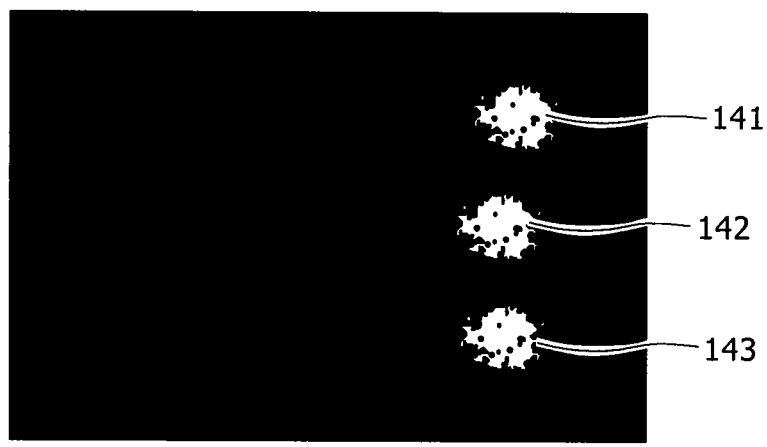

FIG.10
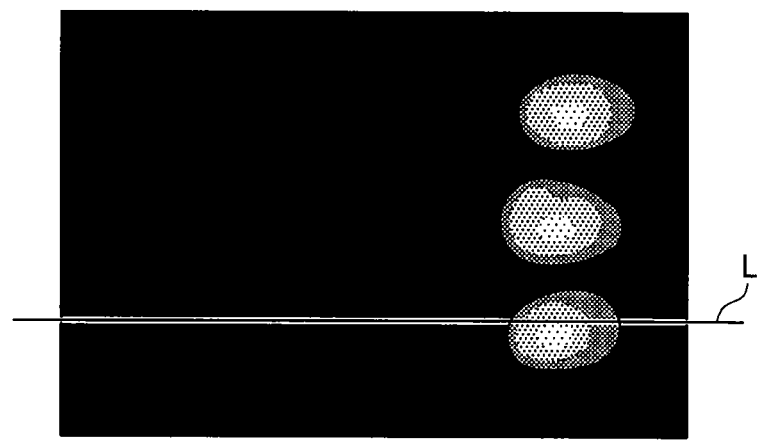
FIG.11
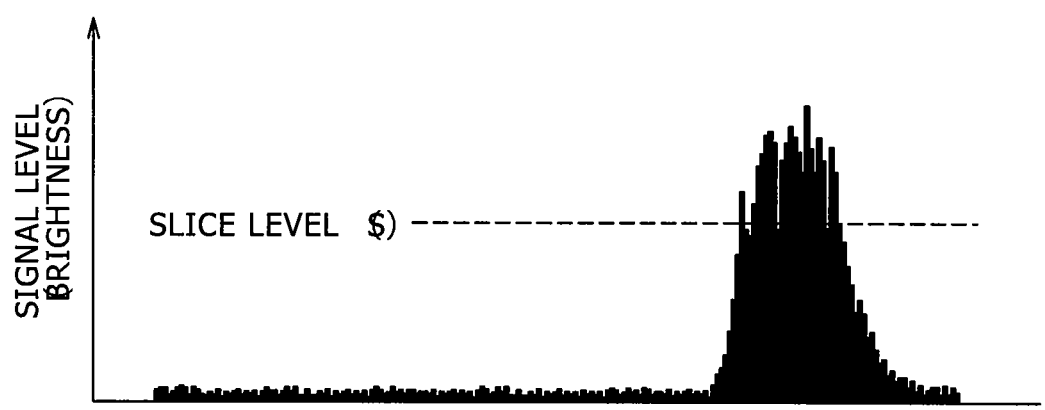

FIG.18
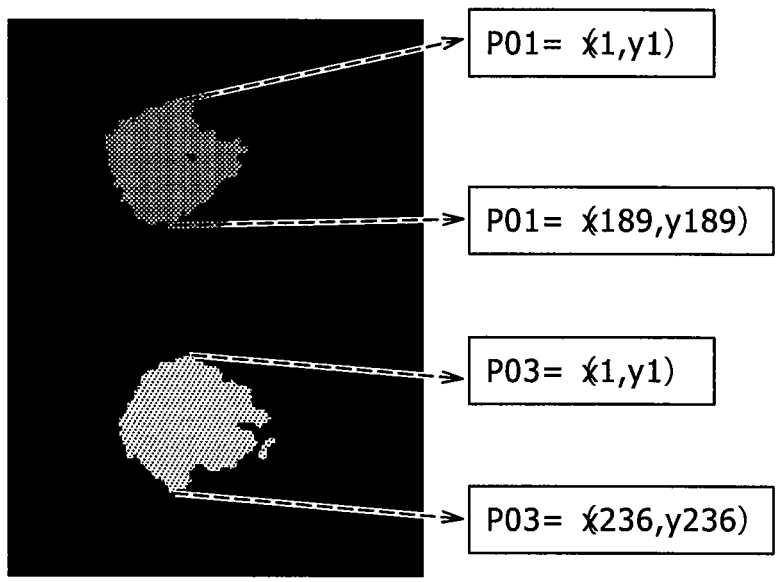
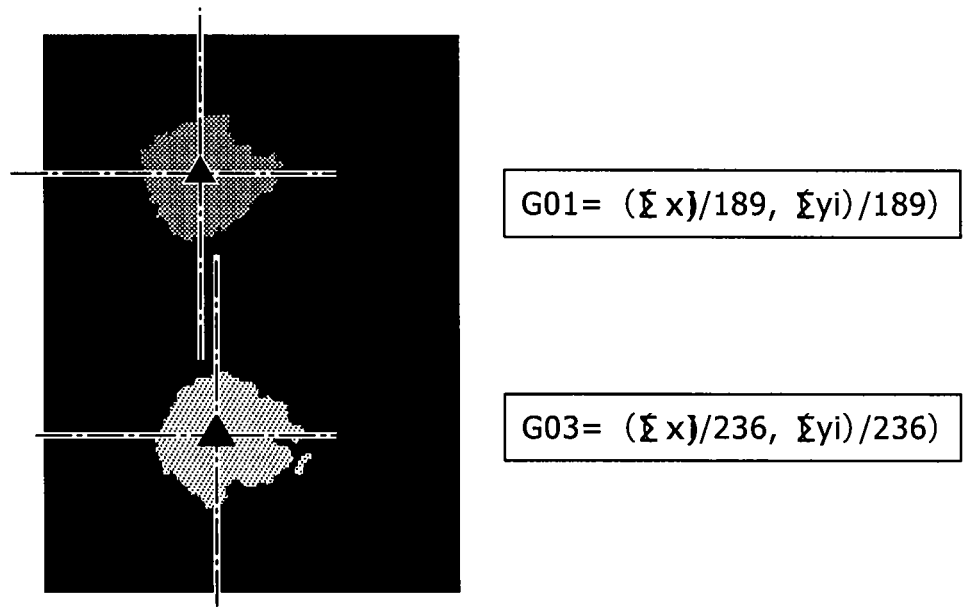

F I G . 1 9
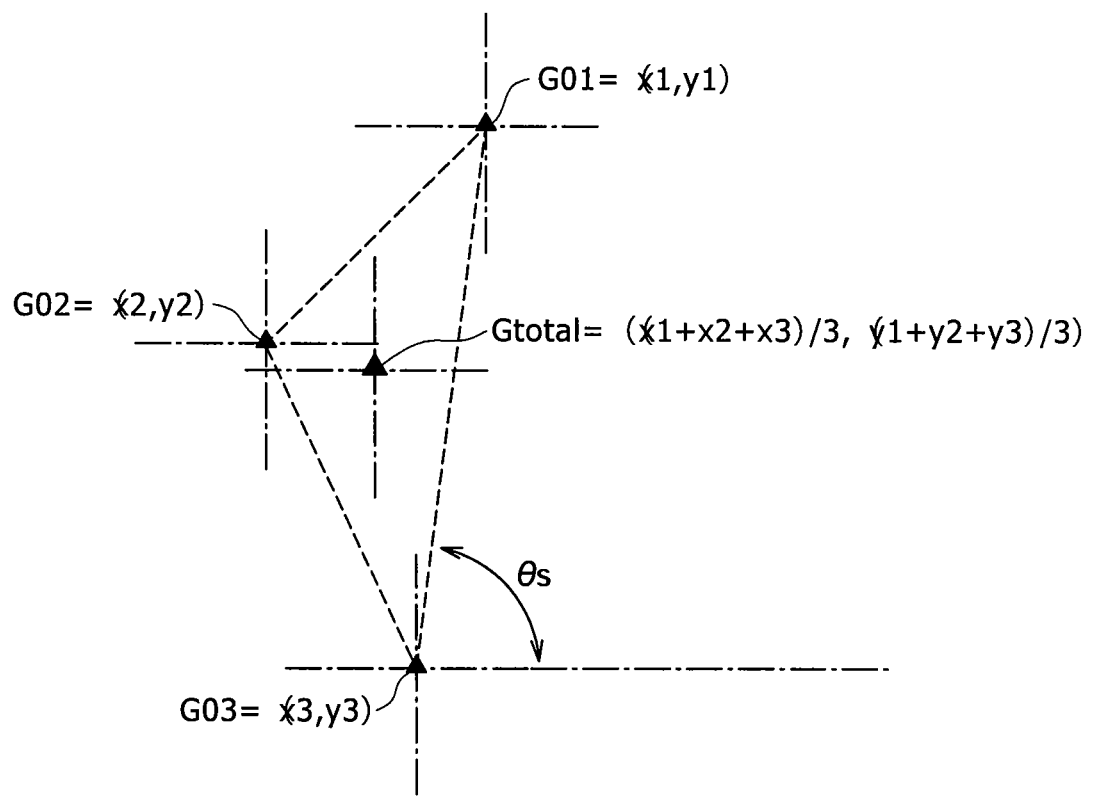

FIG. 21
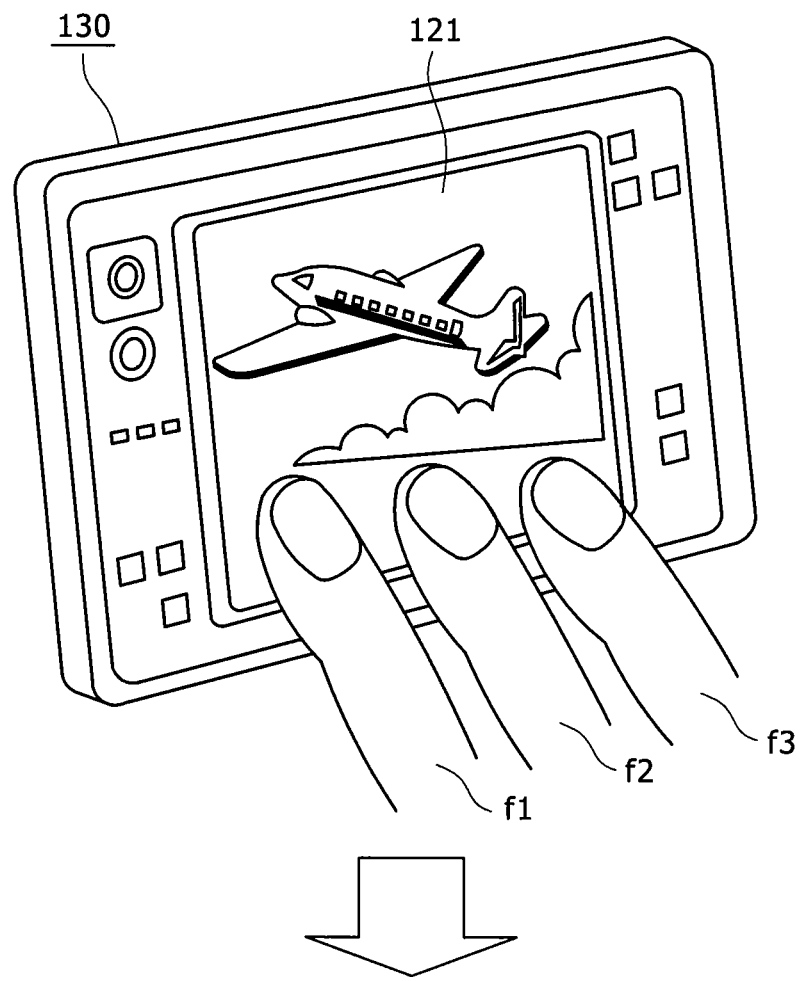
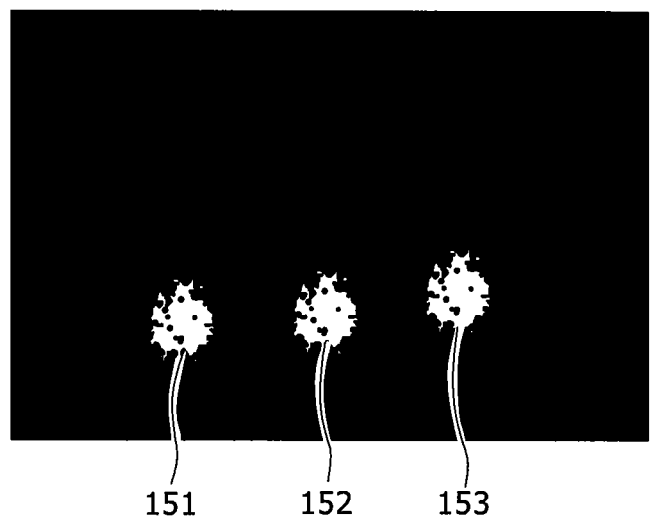

FIG. 23
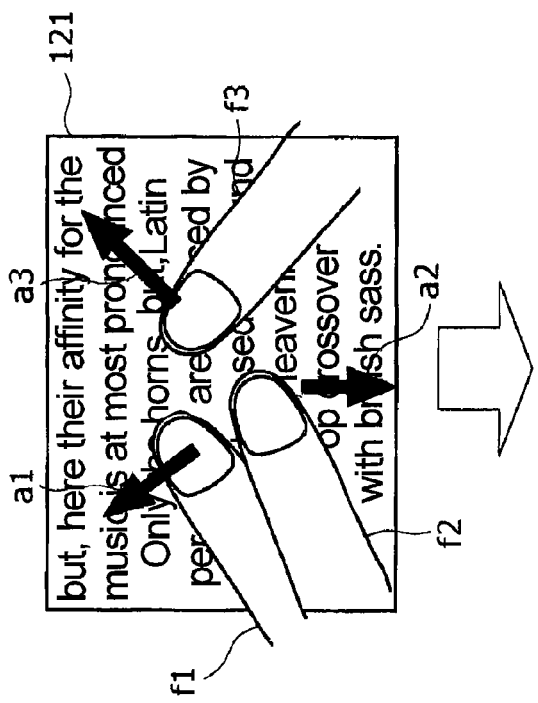
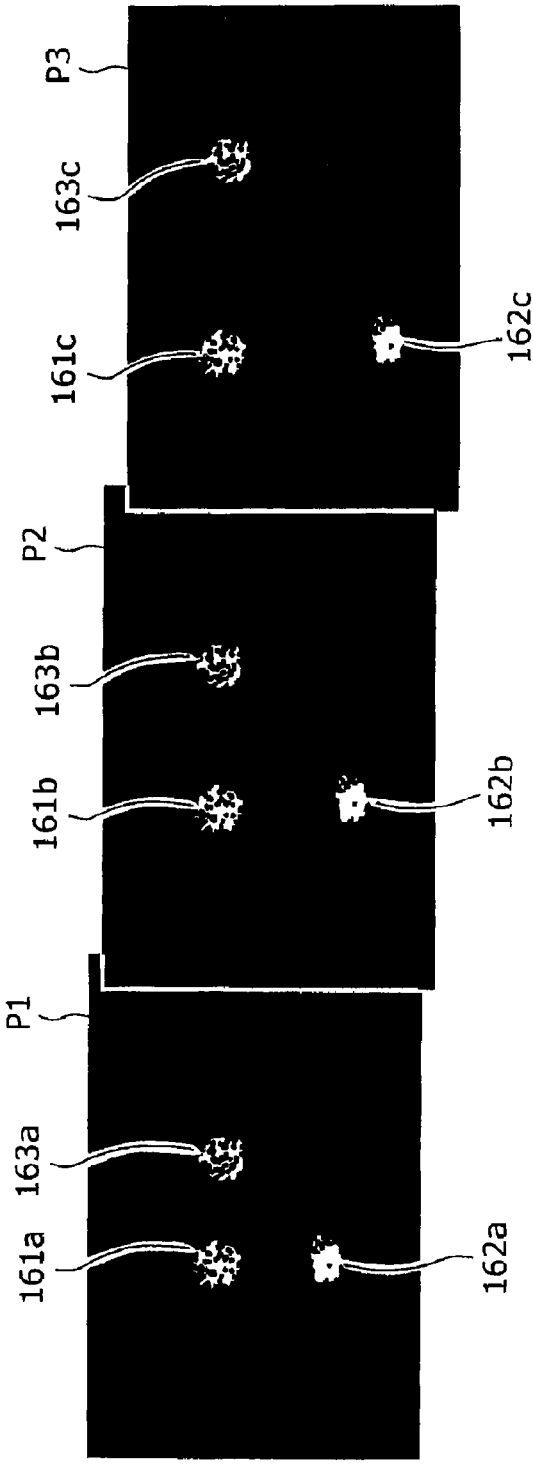

FIG.35
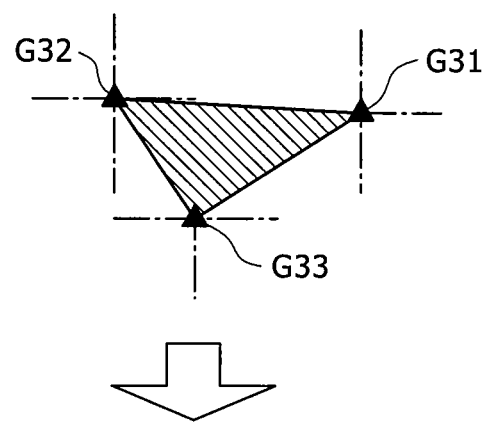
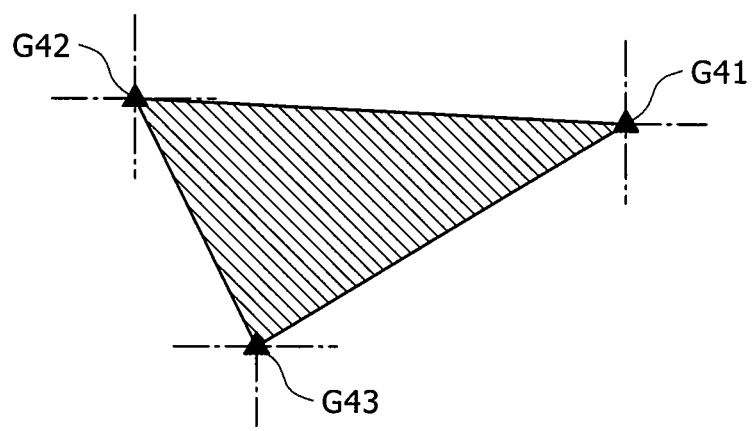

FIG.36
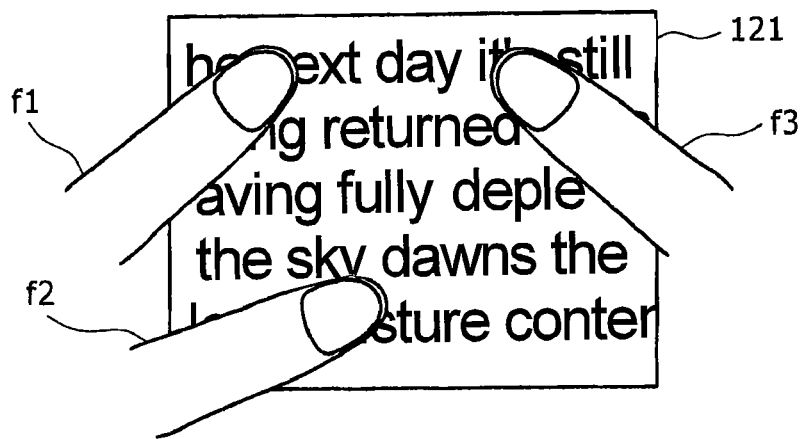
FIG.37
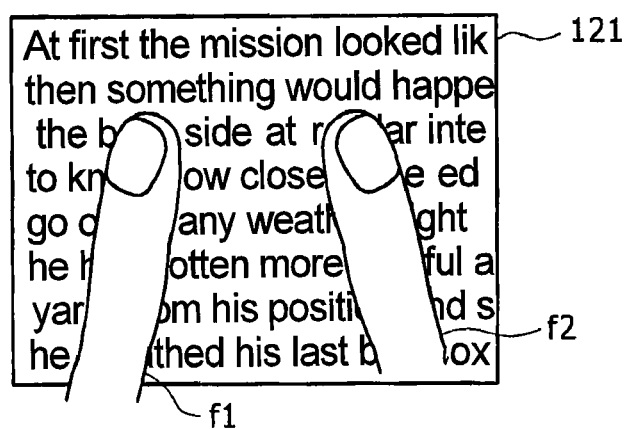
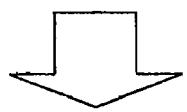
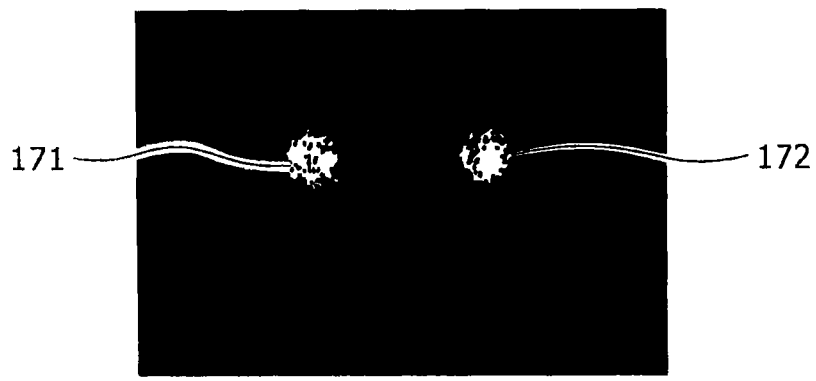

FIG.39
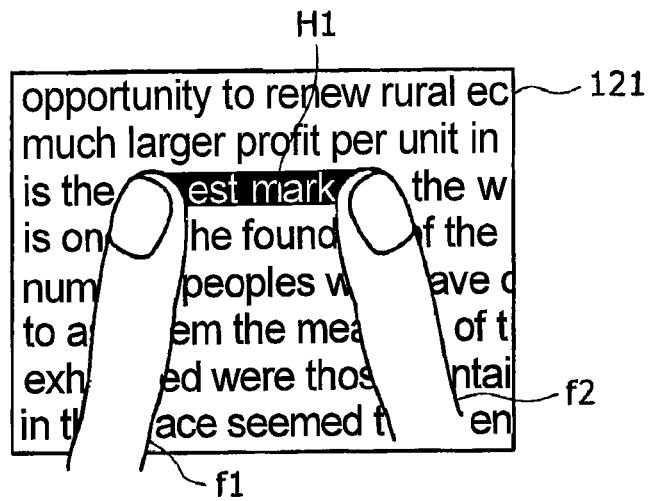
FIG.40
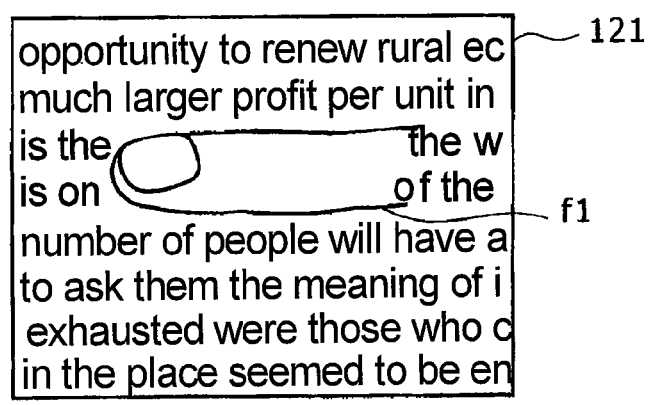
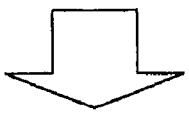
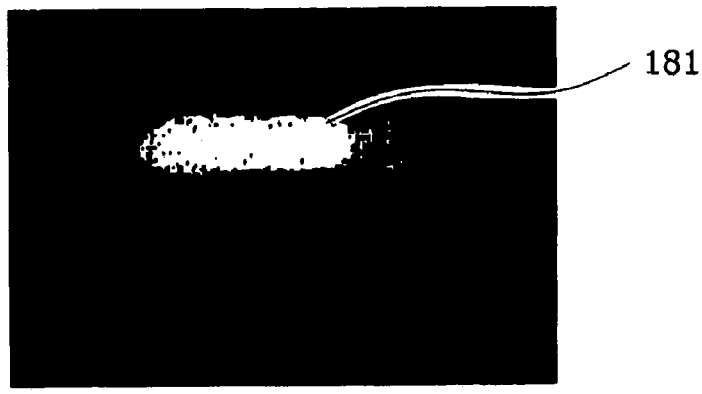

FIG.42 opportunity to renew rural ec
much larger profit per unit in
is the ⸽⸺⸺⸺⸺⸺⸽ the w
is one of the founders of the
number of people will have a
to ask them the meaning of i
exhausted were those who c
in the place seemed to be en

121

H2

DISPLAY APPARATUS AND DISPLAY METHOD

CROSS REFERENCES TO RELATED APPLICATIONS

The present application claims priority to Japanese Patent Application Nos. JP 2005-292605 filed in the Japanese Patent Office on Oct. 5, 2005, JP 2006-246875 filed in the Japanese Patent Office on Sep. 12, 2006, the entire contents of which is being incorporated herein by reference.

BACKGROUND

The present application generally relates to a technology for efficiently and effectively carrying out operations through a display apparatus, such as a liquid crystal display (LLD), electro-luminescence (EL) display, and the like.

In configuring a touch panel allowing an operation to be carried out by merely touching the display screen of a display apparatus such as a TV receiver, the touch panel separated from the display apparatus is superposed on the display screen.

As a typical configuration employing such a separated touch panel, there is a structure including a transparent and thin input detection apparatus stuck on the display screen. As means for detecting a touch on the display screen, a touch panel has been put to practical use. The touch panel put to practical use can be, among others, a touch panel of a resistance film type for sensing a change in pressure or an electrostatic capacitance type for sensing an electrostatic electrical signal, which changes in accordance with contact with a human body. However, these touch panels are basically capable of detecting the position of only a point on the surface but incapable of detecting the positions of a plurality of points at the same time. Thus, an operation inputting apparatus employing such a touch panel generally adopts a method for recognizing a command issued by the operator as a command based on a touched point of a method for recognizing an operation command issued by the operator as a command based on a change of the position of a point with the lapse of time.

Japanese Patent Laid-Open No. 2004-336597 discloses an operation-input accepting apparatus for accepting an input representing a movement of a command position in a two-dimensional direction on a display screen, recognizing the substance of an operation command issued by the operator on the basis of changes of the coordinates of the display position from the start of the movement to the end of the movement and carrying out a process according to the recognized substance of the command.

SUMMARY

In order to make an operation carried out through a display apparatus easy to understand and executable with a high degree of efficiency, there has been provided an effective method to be adopted as a method for allowing an operation command to be given by touching a display screen of the display apparatus.

In order to solve problems raised by these touch panels, there has been thought of a touch panel, which is segmented to allow a plurality of touched points to be detected. However, the method is capable of detecting only one touched point in the limited range of each segment of the touch panel. That is to say, it is difficult to detect a plurality of touched points at free positions on the display screen. In addition, there has also been devised a touched-position detection apparatus, which is made capable of detecting the positions of a plurality of touched points by providing a plurality of detection units adopting an infrared detection technique. In the case of this touched-position detection apparatus, however, it is necessary to provide the detection units in the outside of the display screen as one of requirements for realizing the apparatus. Thus, the touched-position detection apparatus raises problems that the size of the apparatus inevitably increases and the apparatus itself also becomes complicated.

Addressing the problems described above, inventors of the present application have devised a display apparatus allowing advanced input-entering operations to be carried out by the operator by detecting a plurality of touched locations on the display screen employed in the display apparatus and continuously monitoring the coordinates and size or each of the locations.

In order to solve the problems described above, the present application provides a display apparatus capable of: displaying an image on a display screen employed in the display apparatus by using a plurality of display devices laid out to form a matrix on the display screen; obtaining the image of each substance brought into contact with the display screen or brought to a position in close proximity to the display screen on the basis of a received-light signal output by each of light receiving devices each placed at a location in close proximity to one of the display devices; continuously monitoring the position and size of each substance brought into contact with the display screen or brought to a position in close proximity to the display screen by using the obtained image of the substance; and carrying out a process in accordance with changes in monitored position and monitored size.

By providing the display apparatus with the configuration described above, a command issued by the operator can be recognized on the basis of position and size changes of each of a plurality of objects each corresponding to a substance brought into contact with a display screen employed in the display apparatus or brought to a position in close proximity to the display screen and a variety of processes can be carried out in accordance with the recognized command.

In accordance with the present application, various kinds of processing can be carried out in accordance with position and size changes of each of a plurality of objects each corresponding to a substance brought into contact with a display screen employed in the display apparatus or brought to a position in close proximity to the display screen. Thus, the number of types of operations carried out on the display screen can be increased, allowing advanced operations to be performed on the display screen.

Additional features and advantages are described herein, and will be apparent from, the following Detailed Description and the figures.

BRIEF DESCRIPTION OF THE FIGURES

FIG. 7 is an explanatory diagram showing fingers carrying out an operation (1) on the display apparatus according to an embodiment of the present invention.

FIG. 10 is a diagram showing a typical result of the image processing represented by the flowchart shown in FIG. 9.

FIG. 11 is a diagram showing a typical result of the image processing represented by the flowchart shown in FIG. 9.

FIG. 18 is a diagram showing a typical result of the image processing represented by the flowchart shown in FIG. 17.

FIG. 19 is a diagram showing a typical result of the image processing represented by the flowchart shown in FIG. 17.

FIG. 21 is an explanatory diagram showing fingers carrying out an operation (2) on the display apparatus according to an embodiment of the present invention.

FIG. 23 is an explanatory diagram showing fingers carrying out an operation (3) on the display apparatus according to an embodiment of the present invention.

FIG. 35 is an explanatory diagram to be referred to in describing a typical substance of a determination process carried out at a step S123 of the flowchart shown in FIG. 24.

FIG. 36 is an explanatory diagram showing a typical post-operation displayed screen (1) produced by an embodiment of the present invention.

FIG. 37 is an explanatory diagram showing fingers carrying out an operation (4) on the display apparatus according to an embodiment of the present invention.

FIG. 39 is an explanatory diagram showing a typical post-operation displayed screen (2) produced by an embodiment of the present invention.

FIG. 40 is an explanatory diagram showing a finger carrying out an operation (5) on the display apparatus according to an embodiment of the present invention.

FIG. 42 is an explanatory diagram showing a typical post-operation displayed screen (3) produced by an embodiment of the present invention.

DETAILED DESCRIPTION

A detailed description of various embodiments of the present invention with reference FIGS. 1 to 44 follows.

Figure 1:
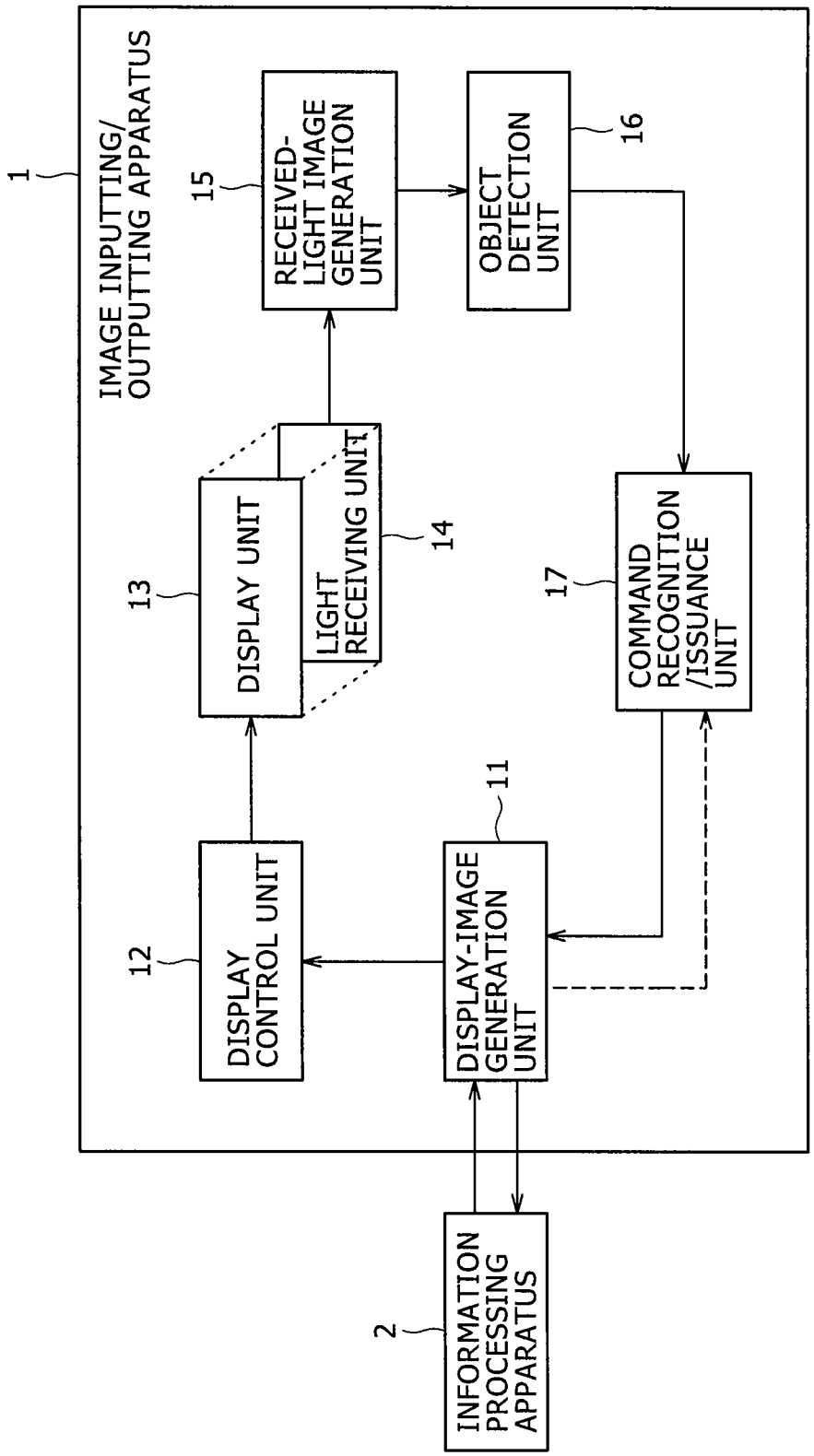
FIG. 1 is a functional block diagram showing a typical functional configuration of an information processing system provided by the present invention.

FIG. 1 is a functional block diagram showing a typical functional configuration of an information processing system provided by the present invention.

The information processing system shown in FIG. 1 includes an image inputting/outputting apparatus 1 and an information processing apparatus 2, which serve as an image processing apparatus applying the present invention in an embodiment.

The image inputting/outputting apparatus 1 is capable of displaying an image generated by itself or an image received from the information processing apparatus 2 as an image that can be recognized by the operator. The image inputting/outputting apparatus 1 also properly outputs various kinds of information such as a command for acquiring a predetermined image to the information processing apparatus 2.

To put it in detail, the image inputting/outputting apparatus 1 has a configuration including components ranging from a display-image generation unit 11 to a command recognition/issuance unit 17.

The display-image generation unit 11 is a section for generating image data of a still or moving picture to be displayed on a display unit 13 and supplying the generated image data to a display control unit 12. It is to be noted that, in the following description, the still and moving pictures are both referred to simply as an image, which is used as a generic technical term of both the pictures, in case it is not necessary to distinguish the still and moving pictures from each other.

In addition, if necessary, the display-image generation unit 11 exchanges various kinds of information with the information processing apparatus 2. Examples of the information exchanged between the display-image generation unit 11 and the information processing apparatus 2 will be described later.

The display control unit 12 is a section for converting image data received from the display-image generation unit 11 into data, which has a format displayable on the display unit 13 and has information on a proper display timing, and supplying the data to be displayed to the display unit 13. The display unit 13 is a section for displaying image data received from the display control unit 12 on a display screen as an image that can be recognized by the operator. As a result, the operator can view and recognize the displayed image.

A light-receiving unit 14 is a section having a configuration including a plurality of light receiving devices laid out to form a matrix. Each of the light receiving devices outputs a signal according to the amount of received light to a received-light image generation unit 15. The signal according to the amount of received light is referred to hereafter as a received-light signal.

The light-receiving unit 14 is typically provided on the same plane as the display unit 13 or superposed on the display unit 13. Thus, while the display unit 13 is displaying an image, the light-receiving unit 14 receives light arriving at the display unit 13.

In other words, while the operator is viewing an image displayed on the display unit 13, the operator is capable of giving a command based on light to the display unit 13. At that time, the light of the command is supplied to the light receiving devices employed in the light-receiving unit 14 and the light receiving devices each output a received-light signal having a level according to the command. In this case, a command based on light is a command represented by arriving light having an amount changed by at least a portion of the light receiving devices employed in the light-receiving unit 14. The magnitude of the change of the quantity of the arriving light, the rate of the change, the direction of the change and other attributes of the change are not specially prescribed. Examples of the amount change direction are a change from a level of brightness to a level of darkness and a change from a level of darkness to a level of brightness. There are a variety of commands each based on light. For example, a light-quantity increasing command or a light-quantity decreasing command can be used as a command based on light. A light-quantity increasing command is a command caused by radiation of light generated by an external source to the light-receiving unit 14. A light-quantity decreasing command is given as a shadow obtained as a result of cutting off light generated by an external source. In addition, the command based on light can be a command represented by light coming from the display unit 13 as light, which is obtained as a result of reflection of light arriving at the display unit 13, instead of a command represented by light generated by an external source.

A received-light image generation unit 15 is a section for generating image data of one still picture on the basis of a received-light signal output by each of the light-receiving devices employed in the light-receiving unit 14 and supplying the data to an object detection unit 16. In the following description, the image data of a still picture is referred to as received-light image data. To put it more precisely, since the light-receiving devices employed in the light-receiving unit 14 output received-light signals sequentially, the received-light image generation unit 15 generates pieces of received-light image data continuously and supplies the pieces of received-light image data sequentially to the object detection unit 16 in the generation order with each piece supplied for one still picture. That is to say, let us assume that a piece of received-light image data is a field or a frame. In this case, the received-light image generation unit 15 generates stream data of a moving picture including a plurality of fields or frames and supplies the stream data to the object detection unit 16. In other words, in the following description, a received-light image means a field or a frame.

The object detection unit 16 is a section for detecting at least one object from received-light image data received from the received-light image generation unit 15.

In this case, an object is an area formed in accordance with a predetermined rule as an area in a received-light image. For example, a received-light image has a configuration including a plurality of pixels. In this case, an assembly of one or more pixels linked in accordance with a predetermined rule is a typical object. In the following description, such an assembly is referred to as a linked element.

The object detection unit 16 further generates various kinds of information on each object. The information on an object is referred to hereafter as object information. The information on an object is typically attributes of the object. To put it concretely, the attributes of an object typically include the coordinates of the center of gravity of the object, the coordinates of the geometrical center of the object, the area of the object and the shape of the object. That is to say, the object detection unit 16 outputs the attributes of each object as the object information.

The object detection unit 16 supplies the object information to the command recognition/issuance unit 17.

It is to be noted that the object detection unit 16 is not specially required to have the function to generate object information. That is to say, instead of providing the function to generate object information in the object detection unit 16, the function can also be incorporated in the command recognition/issuance unit 17. In this case, the object detection unit 16 detects an object and supplies a result of the detection to the command recognition/issuance unit 17. Then, the command recognition/issuance unit 17 generates object information on the basis of the result of the detection.

In either case, the command recognition/issuance unit 17 is a section for recognizing an operation command given by the operator to the display unit 13 as a command based on light, that is, recognizing an operation command given to the image inputting/outputting apparatus 1, and outputs an internal command corresponding to the operation command to the display-image generation unit 11.

It is to be noted that details of the command recognition/issuance unit 17 and typical commands will be explained later by referring to FIG. 2.

When the command recognition/issuance unit 17 outputs an internal command to the display-image generation unit 11 as described above, the display-image generation unit 11 generates new image data in accordance with the command as data for updating an image displayed on the display unit 13 and supplies the data to the display control unit 12. In this way, an image displayed on the display unit 13 is updated by the internal command.

It is to be noted that the display-image generation unit 11 may also pass on the internal command received from the command recognition/issuance unit 17 to the information processing apparatus 2 without generating data of an image to be displayed by itself. In this case, the information processing apparatus 2 changes the data of an image to be displayed in accordance with the internal command received from the display-image generation unit 11 and supplies the data to the display-image generation unit 11. That is to say, the information processing apparatus 2 generates new data of an image to be displayed and supplies the data to the display-image generation unit 11. The display-image generation unit 11 then passes on the data of an image to be displayed to the display control unit 12. Also in this way, an image displayed on the display unit 13 is updated by the internal command. In other words, the function to generate data of an image to be displayed does not have to be included in the image inputting/outputting apparatus 1, but can be incorporated in the information processing apparatus 2 external to the image inputting/outputting apparatus 1.

It is to be noted that, depending on the screen display state of the display unit 13, there are cases in which it is necessary to issue a command only at a certain time. An example of such a case is a case in which a software button appears on the right edge of the display screen. In this case, the command recognition/issuance unit 17 may supply object information to the information processing apparatus 2 by way of the display-image generation unit 11 without recognizing an operation command and the information processing apparatus 2 may recognize the command. As an alternative, the information processing apparatus 2 or the display-image generation unit 11 recognizes the coordinates of the position of the software button on the display screen or determines whether or not the software button exists, and supplies the result of the recognition or the result of the determination to the command recognition/issuance unit 17 as indicated by a dashed-line arrow in the figure. The definition of a new command is newly added and the command recognition/issuance unit 17 determines whether or not the command has been issued.

Figure 2:
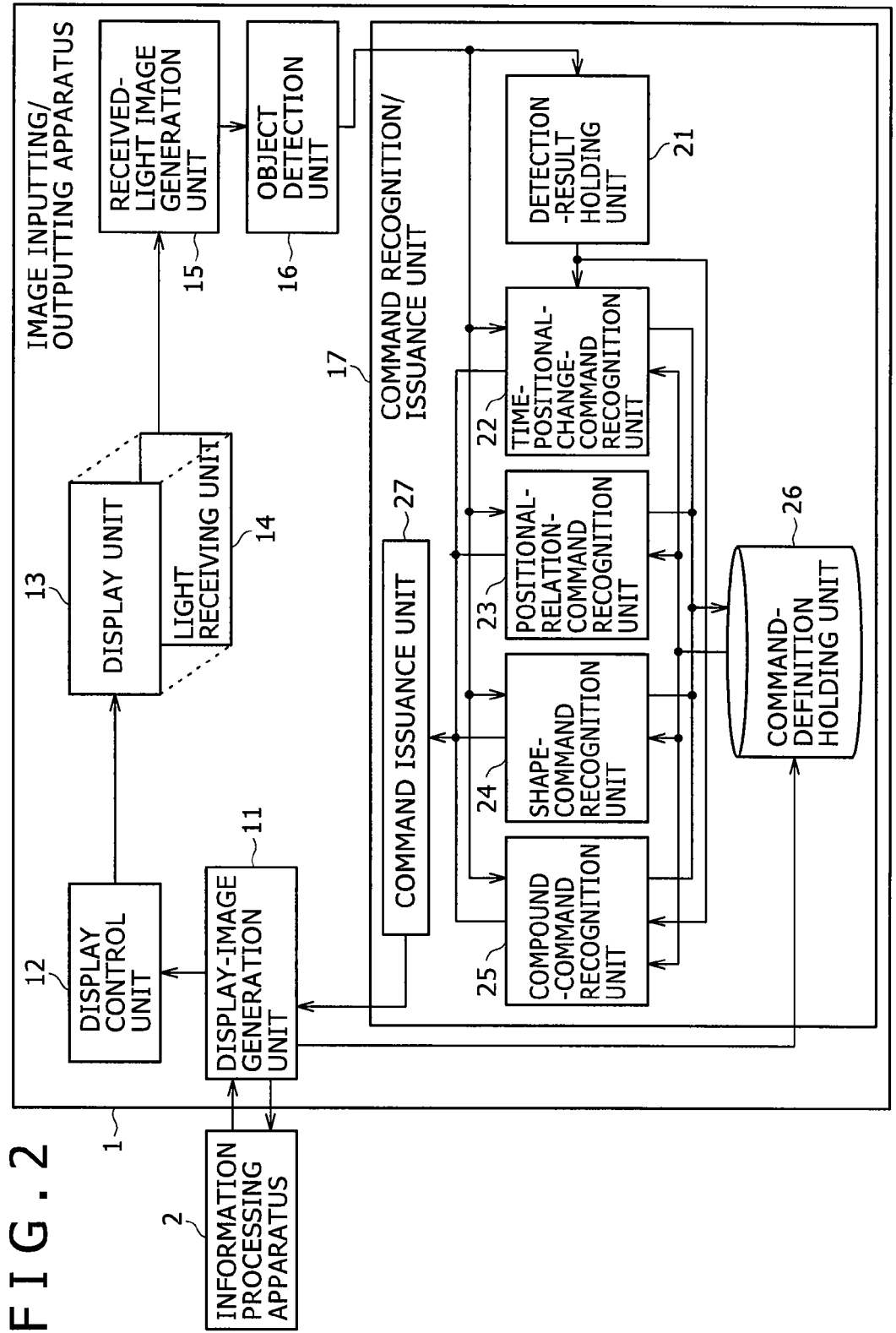
FIG. 2 is a block diagram showing a detailed typical functional configuration of a command recognition/issuance unit employed in an image inputting/outputting apparatus of the information processing system shown in FIG. 1.

FIG. 2 is a block diagram showing a detailed typical functional configuration of the command recognition/issuance unit 17 employed in the image inputting/outputting apparatus 1 of the information processing system shown in FIG. 1.

The command recognition/issuance unit 17 shown in FIG. 2 has a configuration including components ranging from a detection-result holding unit 21 to a command issuance unit 27.

Object information received from the object detection unit 16 is supplied to the detection-result holding unit 21, a time-positional-change-command recognition unit 22, a positional-relation-command recognition unit 23, a shape-command recognition unit 24 and a compound-command recognition unit 25.

A command-definition holding unit 26 is a section for holding one or more conditions for recognizing an operation command entered by the operator to the image inputting/outputting apparatus 1 on the basis of object information received from the object detection unit 16.

In this embodiment, operation commands of the following four types are defined in accordance with the types of object information.

The operation command of the first type is a command recognized on the basis of an object shape included in object information as the shape of an object. In the following description, the operation command of the first type is referred to as a shape-type command.

The operation command of the second type is a command recognized on the basis of an object coordinate-system position included in object information as the coordinates of the position of an object. The operation command of the second type can be a command recognized on the basis of the coordinate-system position of one object only or a command recognized on the basis of the coordinate-system positions of a plurality of objects. In the following description, the operation command of the second type is referred to as a positional-relation-type command.

The operation command of the third type is a command recognized on the basis of an object time positional change included in object information as a change of the position of an object with the lapse of time. As described above, the received-light image generation unit 15 sequentially generates pieces of received-light image data continuously along the time axis. To be more specific, the operation command of the third type is a command recognized on the basis of a relation between coordinate-system-position changes of the same object in two or more specific received-light images, which are included in received-light images corresponding to the generated pieces of received-light image data as received-light images having a difference in time. In the following description, the operation command of the third type is referred to as a time-positional-change-type command.

The command of the fourth type is a command recognized on the basis of a compound including at least two of the shape of an object, the coordinates of the position of the object and a change of the position of the object with the lapse of time, which are included in object information as the shape of an object, the coordinates of the position of the object and a change of the position of the object with the lapse of time respectively. In the following description, the operation command of the fourth type is referred to as a compound-type command.

The following description explains details of the shape-type command, the positional-relation type command, the time-positional-change-type command and the compound-type command individually in an order they are enumerated here.

First of all, the shape-type command is explained as follows.

One or more shapes of an object are associated with a shape-type command and relations each associating the shape of an object and the command are held in the command-definition holding unit 26 as conditions. The shape-command recognition unit 24 acquires the shape of an object from object information received from the object detection unit 16 and collates the shape with the conditions held in the command-definition holding unit 26. If a specific condition matching the shape of an object is held in the command-definition holding unit 26, the shape-command recognition unit 24 recognizes an operation command entered by the operator as a shape-type command corresponding to the specific condition matching the shape of an object or a shape-type command expressed by an object shape matching the specific condition. Then, the shape-command recognition unit 24 notifies the command issuance unit 27 of the result of the command recognition.

In this case, the shape of an object is a concept including not only object shapes such as round and rectangular shapes, but also other object attributes such as the length and width of a predetermined portion of the object, the size or area of the object or a combination of the round and rectangular shapes and the other attributes.

It is to be noted that, as described above, the area of an object is considered as a shape of the object. Typical shape-type commands recognized on the basis of the area of an object will be explained later by referring to figures such as FIG. 40.

Next, the positional-relation-type command is explained as follows.

A positional-relation-type command is associated with the coordinates of the position of an object or a predetermined relation between the coordinates of the positions of a plurality of objects. The relation associating a positional-relation-type command with the coordinates of the position of an object or the relation associating a positional-relation-type command with the predetermined relation between the coordinates of the positions of a plurality of objects is held in the command-definition holding unit 26 as a condition. The positional-relation-command recognition unit 23 acquires the coordinates of the position of an object or a relation between the coordinates of the positions of a plurality of objects from object information received from the object detection unit 16, and collates the coordinates of the position of an object or the relation between the coordinates of the positions of a plurality of objects with the conditions held in the command-definition holding unit 26. If a specific condition matching the coordinates of the position of an object or the relation between the coordinates of the positions of a plurality of objects is held in the command-definition holding unit 26, the positional-relation-command recognition unit 23 recognizes an operation command entered by the operator as a positional-relation-type command corresponding to the specific condition matching the coordinates of the position of an object or the relation between the coordinates of the positions of a plurality of objects, that is, a positional-relation-type command expressed by an object position or inter-position relation matching the specific condition. Then, the positional-relation-command recognition unit 23 notifies the command issuance unit 27 of the result of the command recognition.

It is to be noted that the position of an object is not limited to the position of a specific portion of the object, but can be any position relevant to the object as long as the position can be used for uniquely identifying the object in the received-light image. For example, the coordinates of the center of gravity for the object, the geometrical center of the object or a predetermined edge of the object can be used as the coordinates of the position of the object. It is also worth noting that, if a received-light image generated by the received-light image generation unit 15 includes a plurality of pixels, the coordinates of the position of a predetermined pixel in the received-light image is used as the coordinates of the position of the object.

The predetermined relation between the coordinates of the positions of a plurality of objects is a broadly defined concept including a positional relation between the coordinates of positions (that is, an absolute positional relation between points), a relative positional relation between points in the received-light image or a combination of the absolute and relative positional relations.

To put it concretely, the former relation serving as an absolute positional relation between points is typically a relation based on the absolute distance between the points or a relation based on a shape formed as a result of connecting the points to each other. It is to be noted that a later description with reference to a flowchart shown FIG. 38 explains a typical case in which the absolute distance between points is adopted as an absolute positional relation between the points and a positional-relation-type command is recognized on the basis of a relation based on the absolute distance between points. In addition, later descriptions with reference to flowcharts shown in FIGS. 8 and 22 explain a typical specific case in which a shape formed as a result of connecting points to each other is adopted as an absolute positional relation between the points and a positional-relation-type command is recognized on the basis of a relation based on a shape formed as a result of connecting points to each other. In this specific case, the points are lined up to form an all but straight line oriented in the vertical or horizontal direction.

Next, the time-positional-change-type command is explained as follows.

A change of the position of an object with the lapse of time is associated with a time-positional-change-type command and a relation between a change of the position of an object with the lapse of time and the command is held in the command-definition holding unit 26 as a condition. The time-positional-change-command recognition unit 22 acquires the coordinates of the position of an object from object information received from the object detection unit 16 and the coordinates of one or more past positions of the same object from object information stored in the detection-result holding unit 21. The time-positional-change-command recognition unit 22 then recognizes a change with the lapse of time between the coordinates acquired from the object information received from the object detection unit 16 and the coordinates acquired from the object information stored in the detection-result holding unit 21. Subsequently, the time-positional-change-command recognition unit 22 collates the change in position with the lapse of time with conditions held in the command-definition holding unit 26. If a specific condition matching a change of the position of an object with the lapse of time is held in the command-definition holding unit 26, the time-positional-change-command recognition unit 22 recognizes an operation command entered by the operator as a time-positional-change-type command corresponding to the specific condition matching a change of the position of an object with the lapse of time, that is, a time-positional-change-type command expressed by an object time positional change matching the specific condition. Then, the time-positional-change-command recognition unit 22 notifies the command issuance unit 27 of the result of the command recognition.

It is to be noted that the above coordinates of the position of an object are basically the same as the coordinates used by the positional-relation-command recognition unit 23 as the coordinates of the position of an object.

These coordinates supplied by the object detection unit 16 as the coordinates of the position of an object are the coordinates of a position on a received-light image selected among a plurality of received-light images composing a moving picture. The selected received-light image, which is referred to hereafter as an observed received-light image, is an image serving as a processed object, on which attention should be focused. Typically, the received-light images composing a moving picture are each a frame of a field. On the other hand, the coordinates received from the detection-result holding unit 21 as the coordinates of a past position of the same object are the coordinates of a position on a received-light image processed earlier than the observed received-light image.

That is to say, the detection-result holding unit 21 updates object information every time the received-light image generation unit 15 generates data of a received-light image and the object detection unit 16 detects an object from the generated data. Thus, the time-positional-change-command recognition unit 22 can compare least recent data with data immediately preceding the least recent data. The least recent data is the coordinates of the position of an object on the observed received-light image whereas the data immediately preceding the least recent data is the coordinates of the position of the same object on a received-light image immediately preceding the observed received-light image. It is needless to say that the detection-result holding unit 21 can be used for storing not only the coordinates of the position of the same object on a received-light image immediately preceding the observed received-light image, but also the coordinates of the position of the same object on a received-light image immediately preceding the received-light image immediately preceding the observed received-light image. As a matter of fact, the detection-result holding unit 21 can be used for storing the coordinates of the positions of the same object on a plurality of previous received-light images each preceding the observed received-light image. In this case, the time-positional-change-command recognition unit 22 can compare the coordinates of the position of an object on the observed received-light image with the coordinates of the position of the same object on a received-light image immediately preceding the observed received-light image by a predetermined period of time.

The change recognized by the time-positional-change-command recognition unit 22 as a change of the position of an object with the lapsed of time is not specially limited to a change expressed in terms of predetermined information, but can be to a change expressed in terms of any information as far as the information can be used to express a change of the position of an object with the lapsed of time. For example, a change of the position of an object with the lapsed of time can be expressed by the direction of a movement of the object, the length of a movement of the object or a movement vector representing a combination of the direction and length of the movement.

Figure 24:
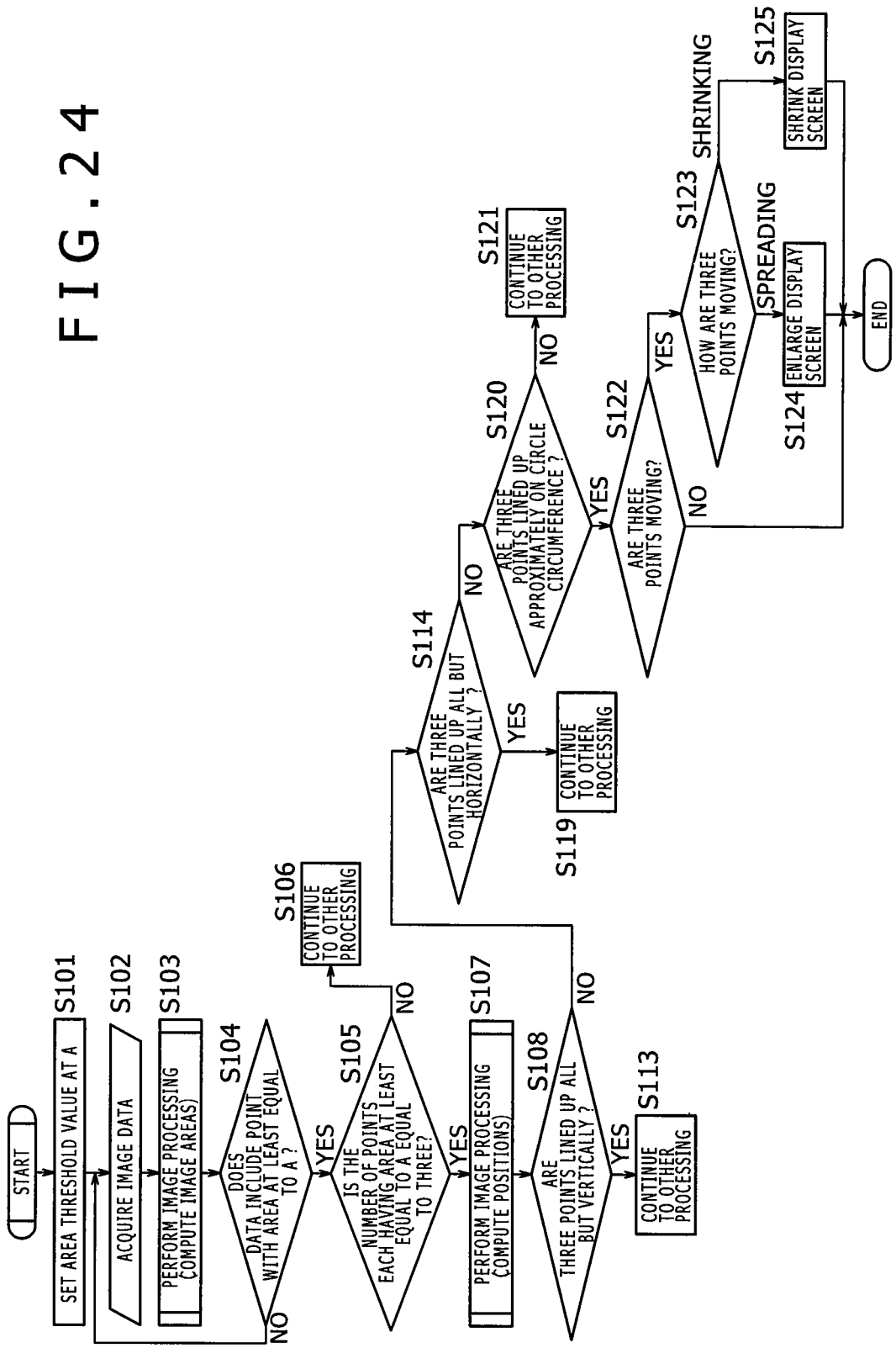
FIG. 24 shows a flowchart representing typical image processing (3) carried out to recognize an operation command from a received-light image in accordance with an embodiment of the present invention.

It is to be noted that a later description with reference to a flowchart shown in FIG. 24 explains a typical case in which a time-positional-change-type command is recognized. It is also worth noting that, more accurately speaking, the typical case represented by the flowchart to be explained later by referring to FIG. 24 is a case to recognize a time-positional-change-type command corresponding to a combination of a condition confirmed in a confirmation process carried out at a step S120 of the flowchart and a condition recognized in a recognition process carried out at a step S123 of the same flowchart. The condition confirmed in the confirmation process carried out at the step S120 is a condition requiring that three points are located approximately on the circumference of a circle. On the other hand, the condition recognized in a recognition process carried out at a step S123 is a request to enlarge or shrink a display screen.

Next, the compound-type command is explained as follows.

A compound-type command is associated with a condition established to represent a compound including at least two of the shape of an object, the coordinates of the position of the object and a change of the position of the object with the lapse of time. These conditions are held in the command-definition holding unit 26. The compound-command recognition unit 25 acquires various kinds of object information from the object detection unit 16 for an object and, if necessary, the past object information from the detection-result holding unit 21 for the same object. The past object information includes the coordinates of a previous position of the object. The compound-command recognition unit 25 then creates the compound described above for the object from the pieces of object information. Subsequently, the compound-command recognition unit 25 collates the compound with conditions held in the command-definition holding unit 26. If a specific condition matching the compound is held in the command-definition holding unit 26, the compound-command recognition unit 25 recognizes an operational command entered by the operator as a compound-type command corresponding to the specific condition matching the compound. Then, the compound-command recognition unit 25 notifies the command issuance unit 27 of the result of the command recognition.

As described above, the command-definition holding unit 26 is used for holding definitions as conditions to be compared with object information received mainly from the object detection unit 16 in order to determine whether or not an operation command entered by the operator is a command of a predetermined type. The command-definition holding unit 26 can be used for holding not only definitions set in advance, but also new definitions based on object information generated as a result of an operation carried out by the operator. The new definitions are supplied by the components ranging from the time-positional-change-command recognition unit 22 to the compound-command recognition unit 25 to the command-definition holding unit 26 as indicated by arrows drawn in directions from the components to the command-definition holding unit 26. In addition, new definitions can also be supplied from the display-image generation unit 11 or the information processing apparatus 2 to the command-definition holding unit 26 to be held in the command-definition holding unit 26 as indicated by an arrow drawn in a direction from the display-image generation unit 11 to the command-definition holding unit 26. The command-definition holding unit 26 receives such a new definition when it is necessary to compare object information with the state of a screen display appearing on the display unit 13 such as a case in which a software button appears on the right edge of the display screen as described earlier.

The command issuance unit 27 executes an internal command corresponding to an operation command recognized by either one of the components ranging from the time-positional-change-command recognition unit 22 to the compound-command recognition unit 25 in order to carry out a process on the display-image generation unit 11.

It is to be noted that the command issuance unit 27 can also execute the function of the compound-command recognition unit 25. In this case, the command issuance unit 27 totally examines the recognition results of the time-positional-change-command recognition unit 22 to the shape-command recognition unit 24 in order to finally determine the substance of an operation command issued by the operator and issues a final internal command on the basis of the determined substance. Then, the command issuance unit 27 supplies the final internal command to the display-image generation unit 11. In particular, if an operation command simultaneously satisfies at least two of the shape of an object, the coordinates of the position of the object and a change of the position of the object with the lapse of time as conditions, the command issuance unit 27 plays a role to issue a compound-type internal command as a final command to the display-image generation unit 11 on the basis of a result of interpreting the satisfied conditions.

Each functional block shown in FIGS. 1 and 2 can be configured as a hardware or software unit. As an alternative, a functional block can also be configured as a combination of hardware and software. In addition, each functional block shown in FIGS. 1 and 2 can also be configured as a block functioning in conjunction with another functional block even though such a joint block is not shown in the figures. On the contrary, each functional block shown in FIGS. 1 and 2 can also be split into a plurality of functional sub-blocks.

Embodiments shown in FIGS. 3 to 43 are each an embodiment applying the image inputting/outputting apparatus 1 with a configuration shown in FIG. 1 to a display apparatus configured as a liquid-crystal display unit. In each of the embodiments, a light receiving device is provided at a location adjacent to each of light emitting devices composing the liquid-crystal display unit to provide an embodiment capable of carrying out a light emitting process (or a display process) and a light receiving process (or a data reading process) in parallel. In this case, a display unit implemented by the embodiment capable of carrying out a light emitting process (or a display process) and a light receiving process (or a data reading process) in parallel is referred to as an expression/received-light display unit. That is to say, an embodiment implementing a combination of the display unit 13 and the light-receiving unit 14, which are employed in the image inputting/outputting apparatus 1 shown in FIG. 1, is referred to as the expression/received-light display unit. In addition, as will be described later, the expression/received-light display unit implemented by the embodiment is capable of sensing not only a touching substance in a state of being in contact with a display screen of the unit, but also a substance in a state of approaching the screen. In the following description, detection of a touching substance in contact with the display screen of the expression/received-light display unit also means detection or a substance approaching the screen unless specified otherwise.

Figure 3:
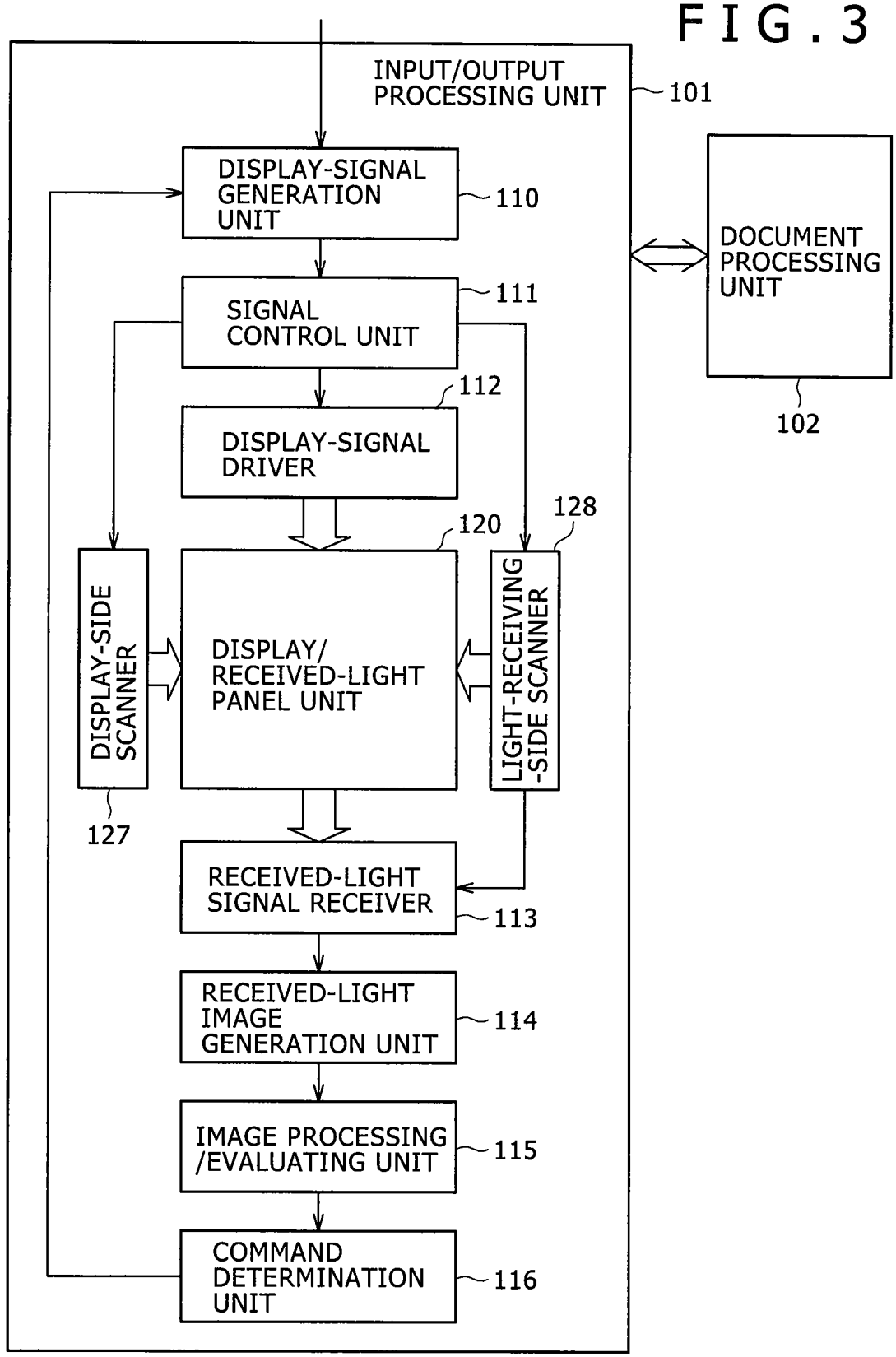
FIG. 3 is a block diagram showing a typical configuration of a display apparatus according to an embodiment of the present invention.

FIG. 3 is a block diagram showing a typical configuration of a display apparatus according to an embodiment. In accordance with this embodiment, the display apparatus includes an input/output processing unit 101 for carrying out input/output processes of the apparatus and a document processing unit 102 for editing information such as a text displayed on a display screen of the apparatus.

The input/output processing unit 101 includes a display-signal generation unit 110, a signal control unit 111, a display-signal driver 112, a received-light signal receiver 113, a received-light image generation unit 114, an image processing/evaluating unit 115, a command determination unit 116, a display/received-light panel unit 120, a display-side scanner 127 and a light-receiving-side scanner 128. The display-signal generation unit 110 is a section for generating display data used for displaying information and supplying the display data to the signal control unit 111. The information to be displayed includes a document requested by the document processing unit 102 and an image requested by another application. The signal control unit 111 passes on the display data to the display-signal driver 112. The display-signal driver 112 is a driver for driving the display/received-light panel unit 120 to display information such as an image.

Figure 4:
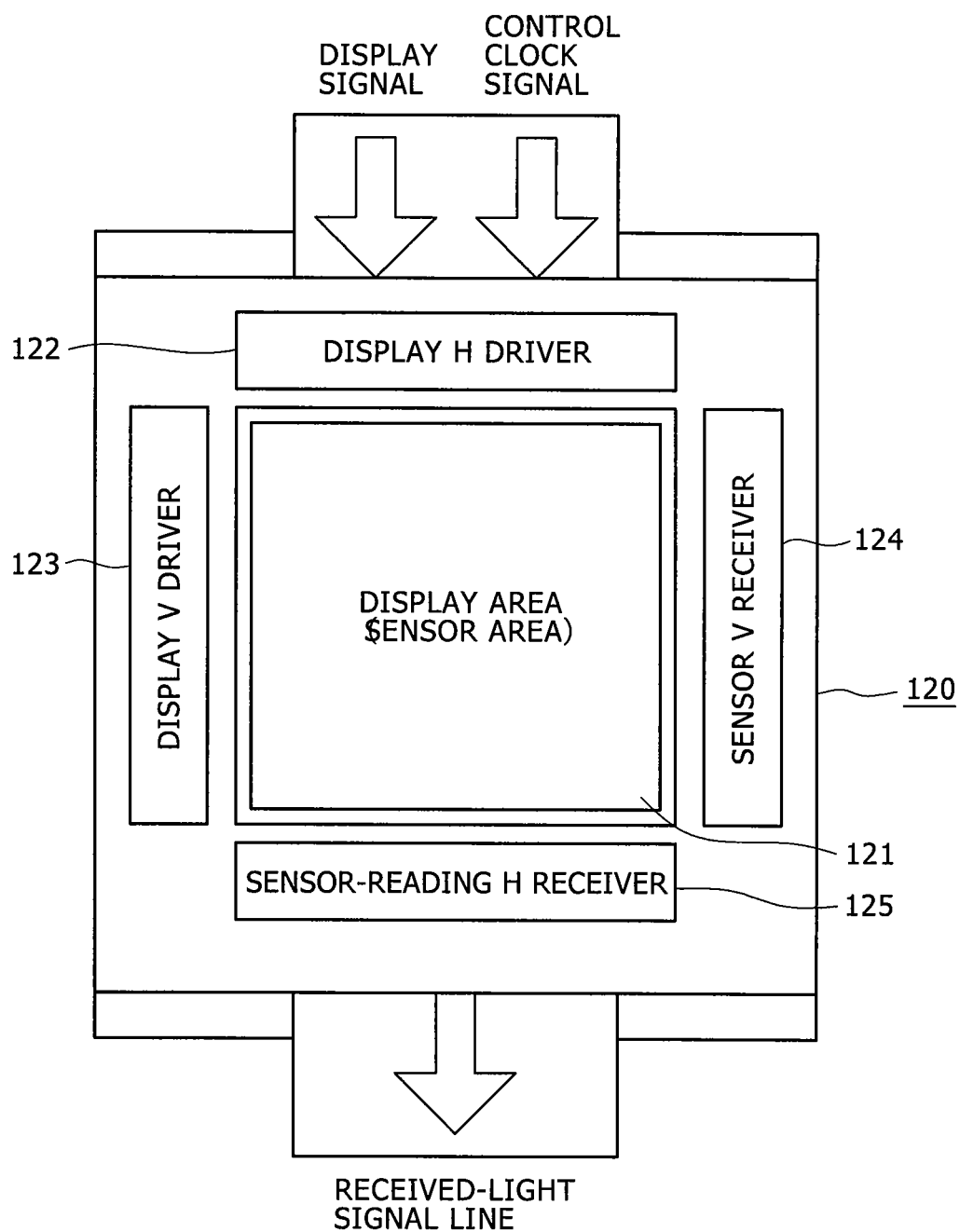
FIG. 4 is a block diagram showing a typical configuration of an expression/received-light display panel according to an embodiment of the present invention.

The display/received-light panel unit 120, which is also referred to as an expression/received-light display panel, is a section configured as a liquid-crystal display unit including typically a transparent electrode provided on a transparent board such as a glass plane. To put it concretely, the transparent electrode employed in the display/received-light panel unit 120 is an electrode having a plurality of pixels laid out on the surface of a display area 121 serving as a sensor area to form a pixel matrix. The display area (the sensor area) 121 itself is shown in FIG. 4. The pixels each function as a display device. A backlight not shown in the figure is provided on the rear face of the display area (the sensor area) 121. In the case of this embodiment, the backlight is a matrix of light emitting diodes. The backlight is capable of executing control to turn backlight beams on and off at a relatively high speed. The backlight executes the control to turn the backlight beams on and off by interlocking the control with a driving operation carried out by the display-signal driver 112. The display-signal driver 112 drives the display/received-light panel unit 120 functioning as a liquid-crystal display unit by applying a driving voltage signal to each of the pixels composing the electrode employed in the display unit.

The display/received-light panel unit 120 also includes a plurality of light-receiving devices in addition to the display devices. Typically, the light-receiving devices are each provided at a location adjacent to a pixel placed on the display area (or the sensor area) 121 to serve as a display device, forming a matrix. The received-light signal receiver 113 is a section for reading out signal charges from the light-receiving devices as quantities each representing the amount of received light accumulated in a light-receiving device.

The signal control unit 111 is a section for passing on display data received from the display-signal generation unit 110 to the display-signal driver 112 as described above and giving driving commands to the display-side scanner 127 and the light-receiving-side scanner 128, which are used for controlling scanning lines of the display devices and the light-receiving devices.

As described above, the received-light signal receiver 113 is a section for reading out light received by the display/received-light panel unit 120 as a received-light signal and supplying the signal to the received-light image generation unit 114. The received-light image generation unit 114 is a section for generating image data typically representing the state of a substance, which has been brought into contact with the display screen or is approaching the screen, on the basis of the received-light signal received from the received-light signal receiver 113. The received-light image generation unit 114 has a storage unit serving as a frame memory used for storing image data of one frame. The frame memory itself is not shown in the figure. The received-light image generation unit 114 supplies the image data to the image processing/evaluating unit 115. The image processing/evaluating unit 115 is a section for processing the data. The image processing/evaluating unit 115 processes the image data in order to recognize attributes of an object corresponding to the substance, which has been brought into contact with the display screen or is approaching the screen. The attributes of an object include the shape, size and positional change of the object. In the process to recognize attributes of an object, the image processing/evaluating unit 115 also finds a difference from a recognition result produced in a recognition process preceding the present process by one frame in order to detect a change in contact state or a change in approaching state. In addition, in the case of this embodiment, the image processing/evaluating unit 115 also recognizes the states of contact with a plurality of locations on the screen. The image processing/evaluating unit 115 outputs a recognition result to the command determination unit 116. The command determination unit 116 is a section for recognizing what operation command has been received by the input/output processing unit 101 on the basis of the recognition result received from the image processing/evaluating unit 115. The command determination unit 116 supplies a result of the command recognition to the display-signal generation unit 110. The display-signal generation unit 110 carries out a predetermined process according to an application being executed. An example of a concrete process state is explained as follows.

As described above, the input/output processing unit 101 is a typical image inputting/outputting apparatus 1 shown in FIG. 1. To put it concretely, the display-signal generation unit 110 is a typical section for implementing the function of the display-image generation unit 11 whereas the signal control unit 111 and the display-signal driver 112 are typical sections for implementing the functions of the display control unit 12. The display/received-light panel unit 120, which may include the display-side scanner 127 and the light-receiving-side scanner 128, is a typical combination of the display unit 13 and the light-receiving unit 14. The received-light signal receiver 113 operating in conjunction with the received-light image generation unit 114 is a typical received-light image generation unit 15. The image processing/evaluating unit 115 mainly functions as a typical object detection unit 16 whereas the command determination unit 116 mainly functions as a typical command recognition/issuance unit 17. The statement saying that the image processing/evaluating unit 115 mainly functions as a typical object detection unit 16 whereas the command determination unit 116 mainly functions as a typical command recognition/issuance unit 17 implies that the image processing/evaluating unit 115 may execute some functions of the command recognition/issuance unit 17 in some cases.

Next, a typical layout of drivers/receivers employed in the display/received-light panel unit 120 is explained by referring to FIG. 4. As shown in FIG. 3, image data appears (or is displayed) on the display/received-light panel unit 120 in accordance with an operation carried out by the display-signal driver 112 for driving the display/received-light panel unit 120. On the other hand, image data is received (or read out) from the display/received-light panel unit 120 in accordance with an operation carried out by the received-light signal receiver 113 for reading the display/received-light panel unit 120. The actual configuration of each of the display-signal driver 112 and the received-light signal receiver 113 is implemented as two units, which are oriented in the horizontal and vertical directions respectively in order to handle a two-dimensional image.

As shown in FIG. 4, the display/received-light panel unit 120 includes a transparent display area (or a transparent sensor area) 121 at the center of the display/received-light panel unit 120. On the four edge faces of the display area (the sensor area) 121, a display H driver 122, a display V driver 123, a sensor V receiver 124 and a sensor-reading H receiver 125 are provided respectively. A display signal and a control-clock signal are supplied to the display H driver 122 and the display V driver 123 as display data and used for driving display pixels, which are laid out on the display area (the sensor area) 121 to form a matrix. A read clock signal is supplied to the sensor V receiver 124 and the sensor-reading H receiver 125, and received-light signals generated by the sensor V receiver 124 and the sensor-reading H receiver 125 synchronously with the read clock signal are supplied to the received-light image generation unit 114 through received-light signal lines.

Figure 5:
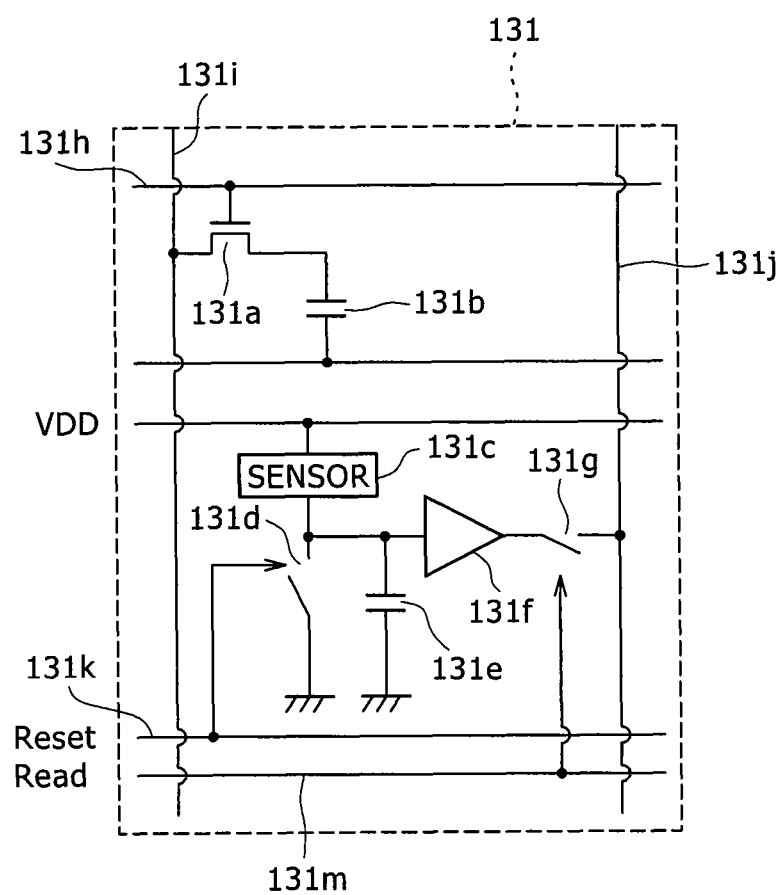
FIG. 5 is a diagram showing a typical configuration of a pixel according to an embodiment of the present invention.

FIG. 5 is a diagram showing a typical configuration of a pixel placed on the display area (the sensor area) 121. Reference numeral 131 denotes a display unit formed by the pixel. The configuration of the display unit 131 includes a gate line 131h oriented in the horizontal direction and a drain line 131i oriented in the vertical direction. A switching device 131a is provided at the point of intersection of the gate line 131h and the drain line 131i. The switching device 131a is connected to a pixel electrode 131b. The switching device 131a is controlled by a control signal supplied thereto through the gate line 131h as a signal for turning on and off the switching device 131a. With the switching device 131a turned on, a signal supplied to the switching device 131a through the drain line 131i sets a display state in the pixel electrode 131b.

A light-receiving sensor 131c also referred to as a light-receiving device is provided at a location adjacent to the pixel electrode 131b. A power-supply voltage Vdd is supplied to the light-receiving sensor 131c. The light-receiving sensor 131c (or the light-receiving device) is connected to a reset switch 131d and a capacitor 131e. After the capacitor 131e is reset by the reset switch 131d turning on, electric charge corresponding to the quantity of received light is accumulated in the capacitor 131e. A voltage proportional to the amount of the electric charge accumulated in the capacitor 131e is supplied to a signal outputting electrode 131j by way of a buffer amplifier 131f to be output to an external component with a timing to turn on a switch 131g. A signal supplied by a reset electrode 131k as a signal for controlling the reset switch 131d turns the reset switch 131d on and off. On the other hand, a signal supplied by a control electrode 131m as a signal for controlling the switch 131g turns the switch 131g on and off.

Figure 6:
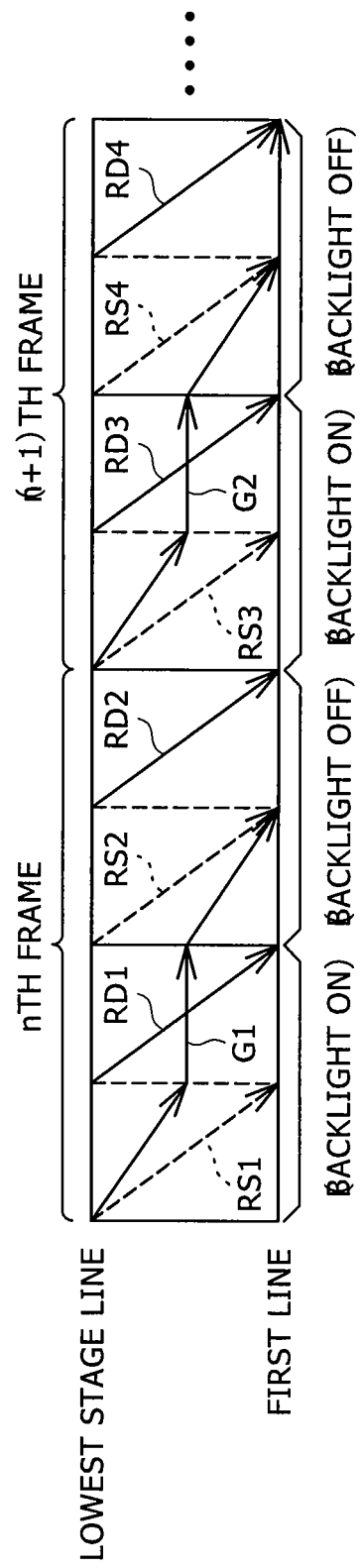
FIG. 6 is a timing diagram showing typical timings to emit light of an image (or display the image) and receive light of the image during frame periods in accordance with an embodiment of the present invention.

FIG. 6 is a diagram showing states of emitting light of an image (or displaying the image) and receiving light of the image during frame periods. The horizontal axis of FIG. 6 is the time axis whereas the vertical axis represents the position of a scanning line for displaying an image or receiving light of an image. The scanning line is also referred to as a horizontal line. A process to renew a display signal or read out received light progresses through scanning lines starting with the bottom line of the screen and eventually ending with the top line or the first line. FIG. 6 shows processing of the nth frame located at an arbitrary frame position and processing of the (n+1)th frame immediately following the nth frame.

In this case, the length of a frame period is typically 1/60 seconds. As shown in FIG. 6, a frame period is divided into first and second halves having lengths equal to each other. The first half is used as a period to turn on the backlight while the second half is used as a period to turn off the backlight. A process to read out a received-light signal is carried out in both the backlight on period and the backlight off period.

Furthermore, the backlight on period and the backlight off period are each divided into first and second halves having lengths equal to each other. During the first half of the backlight on period in the period of the nth frame, a driving line G1 for the display pixel electrode is used for scanning over the lower half of the screen and the display state of this line is used for renewing an image appearing during the frame period. During the second half of the backlight on period in the period of the nth frame, on the other hand, the scanning line G1 is not changed to result in a pause period. By the same token, during the first half of the backlight off period in the period of the nth frame, the driving line G1 is used for scanning over the upper half of the screen and the display state of this line is used for renewing the image appearing during the frame period. During the second half of the backlight off period in the period of the nth frame, on the other hand, the scanning line G1 is not changed to result in a pause period.

As for the light receiving processing, during the first half of the backlight on period in the period of the nth frame, a process RS1 is carried out to sequentially reset the received-light signals of all lines. During the second half of the backlight on period in the period of the nth frame, on the other hand, a process RD1 is carried out to sequentially read out the received-light signals of all lines. By the same token, during the first half of the backlight off period in the period of the nth frame, a process RS2 is carried out to sequentially reset the received-light signals of all lines. During the second half of the backlight off period in the period of the nth frame, on the other hand, a process RD2 is carried out to sequentially read out the received-light signals of all lines.

As described above, for each frame, two read processes are carried out. The first read process is a process to read out received-light signals during the second half of the backlight on period, which is the so-called light self-emitting period. The second read process is a process to read out received-light signals during the second half of the backlight off period, which is the so-called light erasing period. A signal read out in the second read process of a frame is supplied to a frame memory, which is employed in the light-receiving unit 14 but shown in none of the figures, in order to detect a difference between every two signals at pixel positions. A signal representing the differences is then supplied to the image processing/evaluating unit 115 as a received-light difference signal without noises.

FIG. 7 is an explanatory diagram showing fingers carrying out an operation on the display apparatus according to the embodiment. An example of the display apparatus is configured as a small and thin display apparatus 130, which can be carried with ease by the user (or the operator). The configuration of the display apparatus 130 allows the operator to operate the display apparatus 130 by bringing fingers f1, f2 and f3 into contact with the display screen of the display area (the sensor area) 121 employed in the display/received-light panel unit 120 of the display apparatus 130. When an optically reflective substance such as the fingers is brought into contact with the display screen of the display area (the sensor area) 121 employed in the display/received-light panel unit 120 or to a position in close proximity to the display screen, light emitting by an image displayed on the display/received-light panel unit 120 is radiated to the optically reflective substance and reflected by the substance back to the display/received-light panel unit 120. By receiving the reflected light, the shape and position of the optically reflective substance can be determined. As shown in the upper portion of FIG. 7, when the operator brings the three fingers f1, f2 and f3 into contact with the right part of the display screen of the display area (the sensor area) 121, a received-light image like one shown in the lower portion of FIG. 7 is obtained. The received-light image shows three contact portions 141, 142 and 143. It is to be noted that, to speak more accurately, the received-light image like one shown in the lower portion of FIG. 7 is an image shown in FIG. 12 as an image resulting from an image binary-conversion process to be described later by referring to FIGS. 9 to 12.

The image processing/evaluating unit 115 carries out a process to detect the shape and position of each of a plurality of contact portions from a received-light image as shown in FIG. 7. The image processing/evaluating unit 115 then supplies information on the detected shape and position of each of the contact portions to the command determination unit 116. Then, the command determination unit 116 is a section for recognizing an operation command according to the detected shape and position of each of the contact portions and supplying the recognized command to the display-signal generation unit 110.

Figure 8:
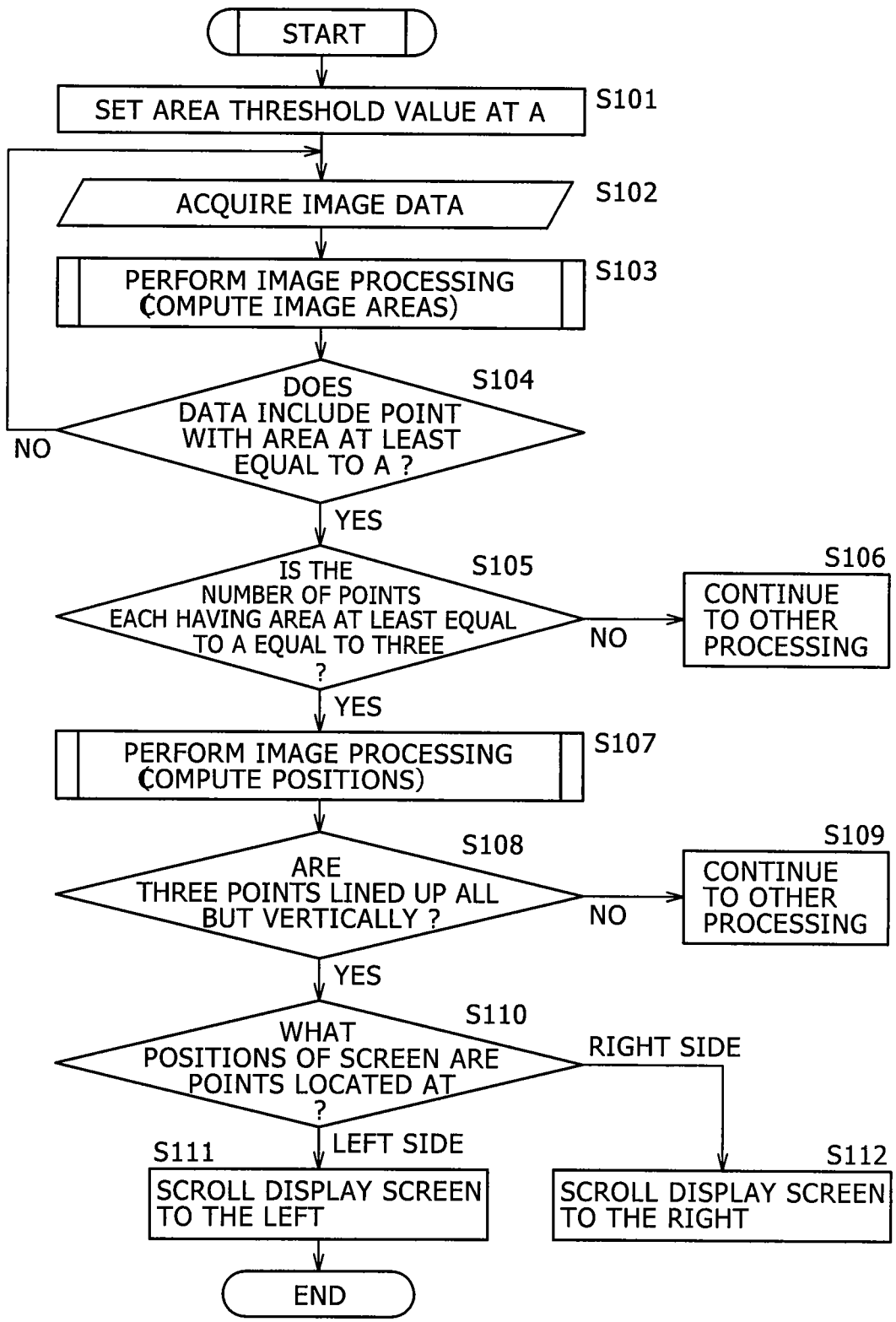
FIG. 8 shows a flowchart representing typical image processing (1) carried out to recognize an operation command from a received-light image in accordance with an embodiment of the present invention.

FIG. 8 shows a flowchart representing typical processing carried out by the image processing/evaluating unit 115 and the command determination unit 116 to recognize an operation command from a received-light image. By referring to this flowchart, the following description explains processing to recognize an operation command, which is entered by the operator, on the basis of relations among the positions of a plurality of detected contact portions. The description explains a case in which, as a relation between contact portions and an operation command, three fingers oriented in the vertical direction and brought into contact with a display screen at the same time are defined in advance as a command to scroll a displayed image in the direction.

In other words, the flowchart to be explained later by referring to FIG. 8 represents typical processing carried out mainly as the functions of the positional-relation-command recognition unit 23, the command-definition holding unit 26 and the command issuance unit 27, which are employed in the command recognition/issuance unit 17 of the image inputting/outputting apparatus 1 shown in FIG. 2 as a section configured to operate as the command determination unit 116 employed in the input/output processing unit 101 shown in FIG. 3. The command-definition holding unit 26 holds a definition stating that three fingers oriented in the vertical direction and brought into contact with a display screen at the same time are interpreted as an operation command to scroll a displayed image in the direction. On the basis of this definition stating that three fingers oriented in the vertical direction and brought into contact with a display screen at the same time are interpreted as an operation command to scroll a displayed image in the direction, the positional-relation-command recognition unit 23 recognizes an operation command to scroll a displayed image. The flowchart to be explained by referring to FIG. 8 represents typical processing to issue an internal command from the command issuance unit 27 on the basis of a result produced by the positional-relation-command recognition unit 23 as the result of a process to recognize an operation command entered by the operator.

The flowchart begins with a step S101 at which the threshold value of an area used for detecting contact portions is set at A. That is to say, the positional-relation-command recognition unit 23 will produce a result of determination as to whether or not fingers of the operator, a pen for issuing an operation command or other means has been brought into contact with an area at least equal to the threshold value A. The threshold value A is set as the area of a screen portion to be subjected to an operation carried out by the operator by bringing any one of the fingers, the command pen or the other mean into contact with the screen portion. Then, at the next step S102, data is acquired as the data of a received-light image obtained as a result of a process carried out by the received-light image generation unit 114 to convert a received-light signal. In the following description, the data of such a received-light image is properly referred to as image data. Subsequently, at the next step S103, first image processing is carried out to compute the area of each contact portion. It is to be noted that the first image processing carried out at the step S103 will be described later in detail by referring to FIGS. 9 to 16. Then, the flow of the processing goes on to a step S104 to produce a result of determination as to whether or not the result of the first image processing indicates that the image data includes a point with an area at least equal to the threshold value A. A point mentioned in the explanation of the processing represented by the flowchart explained by referring to FIG. 8 does not mean a pixel, but implies an object cited earlier. That is to say, the point means a linked element to be described later by referring to diagrams including FIG. 9. If the determination result produced in the process carried out at the step S104 indicates that the image data includes a point having an area at least equal to the threshold value A, the flow of the processing goes on to the next step S105. If the determination result produced in the process carried out at the step S104 indicates that the image data does not include such a point, on the other hand, the flow of the processing goes back to the step S102 to acquire the next image data. At the step S105, the number of points each having an area at least equal to the threshold value A is counted in order to produce a result of determination as to whether or not the number is equal to three. If the number of such points is equal to three, the flow of the processing goes on to a step S107 at which the next process is carried out. If the number of such points is smaller than three, on the other hand, the flow of the processing goes on to a step S106 at which other processing is carried out.

At the step S107, second image processing is carried out to determine relations between the positions of portions with which the three points have been brought into contact. It is to be noted that the second image processing carried out at the step S107 will be described later in detail by referring to FIGS. 17 to 20. Then, the flow of the processing goes on to the next step S108 to produce a result of determination as to whether or not the positions of the three points are lined up approximately in the vertical direction. If the result of the determination indicates that the positions of the three points are lined up approximately in the vertical direction, the flow of the processing goes on to a step S110 at which the next process is carried out. If the result of the determination does not indicate that the positions of the three points are lined up approximately in the vertical direction, on the other hand, the flow of the processing goes on to a step S109 at which at which other processing is carried out. At the step S110, the positions lined up approximately in the vertical direction on the display screen are examined in order to determine what locations on the screen the three points are located. If the three points are located on the left side of the display screen, the flow of the processing goes on to a step S111 at which the operation command is recognized as a command to scroll the screen to the left. If the three points are located on the right side of the display screen, on the other hand, the flow of the processing goes on to a step S112 at which the operation command is recognized as a command to scroll the screen to the right.

Let us assume for example that the operator brings the three fingers f1, f2 and f3 into contact with the right edge of the display screen of the display area (the sensor area) 121 as shown in the upper portion of FIG. 7. In this case, a received-light image like one shown in the lower portion of FIG. 7 is obtained and, accordingly, three contact portions 141, 142 and 143 are detected. In this example, let us assume that the area of each of the contact portions is at least equal to the threshold value A and the positions of the three points are lined up approximately in the vertical direction. Since the three points are located on the right side of the display screen, the screen is scrolled to the right.

Next, the following description explains details of the first image processing carried out at the step S103 of the flowchart explained earlier by referring to FIG. 8 to compute the area of each contact portion and details of the second processing carried out at the step S107 of the same flowchart to recognize the relation between the positions of the contact portions. The description begins with explanation of the first image processing.

It is to be noted that, in the following description, the image processing/evaluating unit 115 is assumed to be a section that carries out the first image processing at the step S103 of the flowchart explained earlier by referring to FIG. 8 to compute the area of each contact portion and the second processing carried out at the step S107 of the same flowchart to recognize the relation between the positions of the contact portions. However, the command determination unit 116 may also execute a portion of the first image processing at the step S103 of the flowchart explained by referring to FIG. 8 to compute the area of each contact portion and the second processing carried out at the step S107 of the same flowchart to recognize the relation between the positions of the contact portions.

Figure 9:
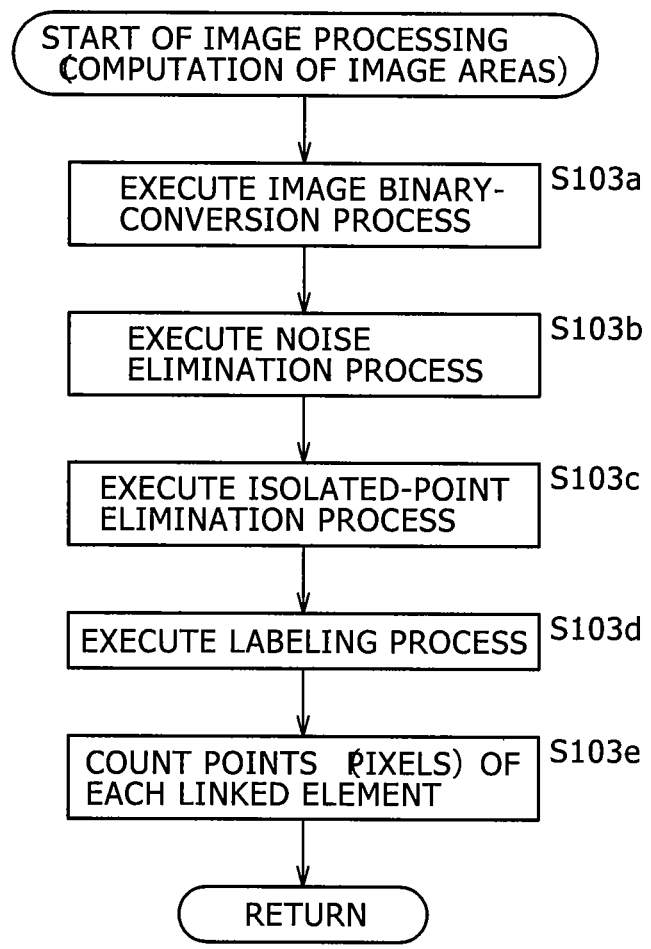
FIG. 9 shows a flowchart representing typical details of first image processing carried out at a step of the flowchart shown in FIG. 8 to compute the area of each contact portion.

FIG. 9 shows a flowchart representing details of the first image processing carried out at the step S103 of the flowchart explained earlier by referring to FIG. 8 to compute the area of each contact portion.

The flowchart begins with a step S103a at which the image processing/evaluating unit 115 carries out an image binary-conversion process.

To put it concretely, let us assume for example that image data like one shown in FIG. 10 is obtained in the process carried out at the step S102 of the flowchart explained earlier by referring to FIG. 8 as the data of a received-light image. The image data is a result of a process to recalibrate outputs produced by light-receiving devices laid out on the display screen during one field period in the state shown in the upper portion of FIG. 7. The display screen is the display face of the display/received-light panel unit 120 employed in the input/output processing apparatus 101 shown in FIG. 3. In an example shown in FIG. 10, the larger the output produced by a light-receiving device, the whiter the color of a screen portion corresponding to the light-receiving device. In addition, a light-receiving device corresponding to a screen portion, which a finger is brought into contact with or which is approached by the finger, produces a large output. On the other hand, a light-receiving device not corresponding to such a screen portion produces a small output.

The signal level (or the brightness) of each pixel on a horizontal line L shown in FIG. 10 as a horizontal line in image data is shown in the upper portion of FIG. 11. The image processing/evaluating unit 115 carries out an image binary-conversion process by comparing the signal level (or the pixel value) of every pixel on the horizontal line with a slice level S shown in FIG. 11. In the image binary-conversion process, a value of one is assigned to a pixel having a signal level as high as or higher than the slice level S. On the other hand, a value of zero is assigned to a pixel having a signal level lower than the slice level S. A result of the image binary-conversion process is shown in the lower portion of FIG. 11. It is to be noted that, even though the slice level S is fixed in the example shown in FIG. 11, the slice level S does not have to be a fixed value. For example, the slice level S can also be found as an average value of the entire image data. As another alternative, the slice level S can be set at a value output by a filter such as an averaging filter created from the image data.

Figure 12:
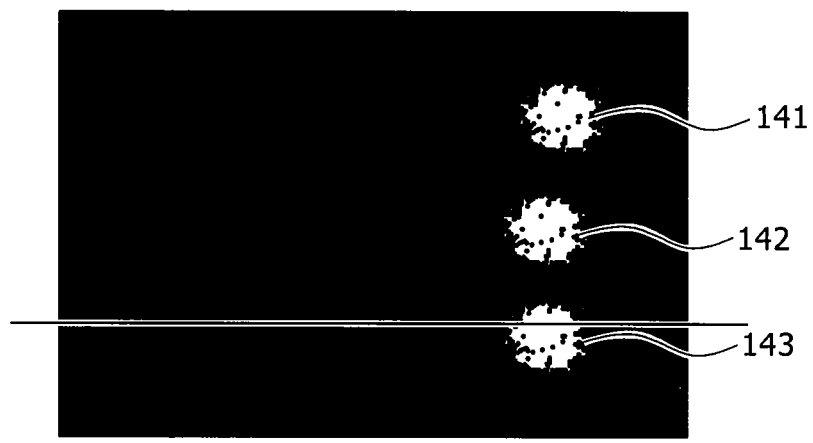
FIG. 12 is a diagram showing a typical result of the image processing represented by the flowchart shown in FIG. 9.

The image binary-conversion process described above is carried out equally for all horizontal lines of the image data shown in FIG. 10 as the data of the received-light image to give a resulting image shown in FIG. 12. That is to say, the image shown in FIG. 12 is similar to the image shown in the lower portion of FIG. 7 as an image, which is obtained when the operator brings the three fingers f1, f2 and f3 into contact with the right edge of the display screen of the display area (the sensor area) 121 as shown in the upper portion of FIG. 7. In other words, to put it more accurately, the three contact portions 141, 142 and 143 explained earlier by referring to FIG. 7 appear in FIG. 12 respectively as areas 141, 142 and 143 each including a large number of white pixels, that is, pixels each having a pixel value of one.

Inside each of the areas 141, 142 and 143 shown in FIG. 12, however, there are also black pixels, that is, pixels each having a pixel value of zero. Here, let us define the area of a set of pixels each having a pixel value of one or a linked element including pixels each having a pixel value of one as a detected object. In this case, however, each of the areas 141, 142 and 143 shown in FIG. 12 cannot be said yet as a detected object. It is to be noted that the definition is adopted because, on the basis of the definition, information on an object can be created with ease. For example, on the basis of the definition, a process to compute the area of an object can be carried out with ease at a step 103e to be described later. As another example, on the basis of the definition, a process to compute the position of the center of gravity of an object can be carried out with ease as will be described later by referring to FIGS. 17 to 20.

Then, processes of the steps S103b to S103d of the flowchart explained by referring to FIG. 9 are further carried out to detect objects (or linked elements) corresponding to the areas 141, 142 and 143 shown in FIG. 12.

To put it concretely, the image processing/evaluating unit 115 employed in the input/output processing unit 101 shown in FIG. 3 carries out a process to get rid of noises at the step S103b, a process to get rid of isolated points at the step S103c and a label assigning process at the step S103d. By carrying out these processes, it is possible to generate some linked elements each serving as a candidate for the object of the area 141, 142 or 143 shown in FIG. 12.

It is to be noted that the process is carried out at the step S103b to get rid of noises for the following reason.

In many cases, the image data shown in FIG. 10 as image data output by the received-light image generation unit 114 employed in the input/output processing unit 101 shown in FIG. 3 includes noises caused by variations of light-receiving devices employed in the display/received-light panel unit 120 and caused by the surrounding environment of the devices. These noises may remain in the image data even after the image binary-conversion process carried out at the step S103a. If many noises remain in the image data, the amount of processing of the process carried out to get rid of isolated points at the step S103c and the label assigning process carried out at the step S103d will increase substantially in some cases. In order to prevent the amount of processing from increasing, the process to get rid of noises is carried out at the step S103b.

A variety of methods have been proposed as methods each provided for the process to get rid of noises and any one of the proposed methods can be adopted. This embodiment adopts a method described as follows. In accordance with this adopted method, the states of some pixels surrounding a pixel observed as an object of processing are examined and the examined states are used as a basis for determining the pixel value of the observed pixel, which is the pixel observed as an object of processing.

In the case of this method, for example, the following rule is established. There are eight pixels surrounding an observed pixel. If the number of black pixels surrounding an observed pixel is one or zero, the pixel value of the observed pixel is set at one or the observed pixel is regarded as a white pixel. As described earlier, a black pixel is a pixel having a pixel value of zero. If the number of black pixels surrounding an observed pixel is at least five, on the other hand, the pixel value of the observed pixel is set at zero or the observed pixel is regarded as a black pixel. If the number of black pixels surrounding an observed pixel is equal to or greater than two but equal to or smaller than four, the pixel value of the observed pixel is kept as it is. That is to say, since the observed pixel has been subjected to an image binary-conversion process, the pixel value of the observed pixel is kept at zero or one.

In implementation of the above rule, the image processing/evaluating unit 115 employed in the input/output processing unit 101 shown in FIG. 3 treats each of the pixels, which compose a received-light image obtained as a result of an image binary-conversion process, as an observed pixel, and determines the pixel value of every observed pixel in accordance with the above rule. It is to be noted that a method to select each observed pixel is not prescribed in particular. For example, it is possible to adopt a method whereby observed pixels can be selected sequentially one after another in an order starting with the pixel at the right/upper corner of the received-light image in a direction toward the right side and, after the pixel at the right-end edge of the present row (horizontal line) has been processed as an observed pixel, the process to select an observed pixel is continued to the pixel at the left-side edge of a row right below the present row. This process to select an observed pixel is carried out in this way from row to row till all the pixels of the last row (the bottom row) of the received-light image are each processed as an observed pixel.

It is to be noted that the rule described above is no more than a typical rule. That is to say, another rule can also be adopted. In accordance with the rule described above, if the number of black pixels surrounding an observed pixel is one or zero, the pixel value of the observed pixel is set at one. However, the criterion for setting the pixel value of the observed pixel at one is not limited to the criterion set by this method. That is to say, the criterion for setting the pixel value of the observed pixel at one can be properly changed in accordance with the prevailing condition. By the same token, if the number of black pixels surrounding an observed pixel is at least five, on the other hand, the pixel value of the observed pixel is set at zero. For the same reason, however, the criterion for setting the pixel value of the observed pixel at zero is not limited to the criterion set by this method. That is to say, the criterion for setting the pixel value of the observed pixel at zero can be properly changed in accordance with the prevailing condition.

Next, the process carried out at the step S103c to get rid of isolated points is explained in detail as follows.

As described above, objects are detected from some linked elements obtained as a result of the label assigning process carried out at the step S103d. That is to say, some linked elements each serving as the candidate for an object are obtained as a result of the label assigning process carried out at the step S103d. It is to be noted that, in this case, a group of pixels corresponding to a substance (which is a finger in this embodiment) brought into contact with a contact portion or approaching the contact portion are detected as an object. In this case, in order to make the process to detect objects easy to carry out, that is, in order to reduce the number of object candidates, it is necessary to appropriately carry out a process to get rid of linked elements, that are obviously not a substance brought into contact with a contact portion or approaching the contact portion, from some linked elements each included in image data resulting from the noise elimination process as a candidate for an object. A linked element that is obviously not a substance brought into contact with a contact portion or approaching the contact portion is a linked element created by noises not eliminated in the noise elimination process. The isolated-point elimination process carried out at the step S103c of the flowchart explained by referring to FIG. 9 is a typical process to get rid of linked elements, that obviously do not correspond to a substance brought into contact with a contact portion or approaching the contact portion.

Figure 13:
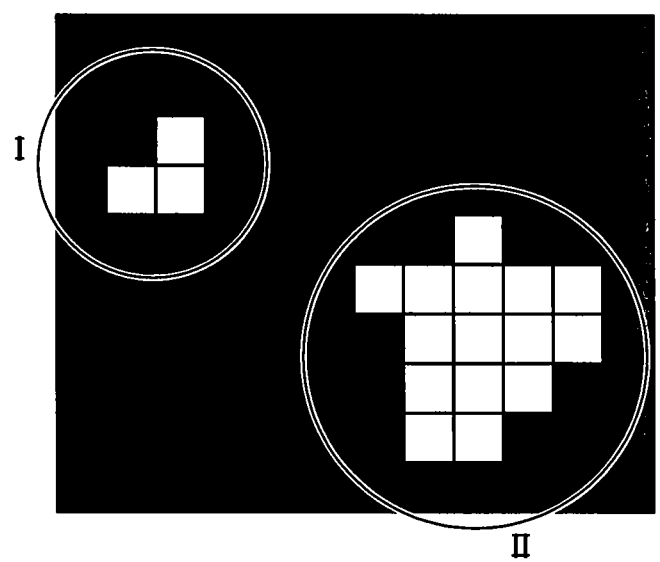
FIG. 13 is a diagram showing a typical result of the image processing represented by the flowchart shown in FIG. 9.

To put it concretely, let us assume for example that a received-light image (or a portion of it) like one shown in FIG. 13 has been obtained as a result of the process carried out at the step S103b to get rid of noises.

In this case, linked elements I and II, which are each a set of white pixels in a surrounding black environment, are each a candidate for an object.

As described before, the area threshold value is set at A in a process carried out at the step S101 of the flowchart explained earlier by referring to FIG. 8. Then, a process is carried out at the step S104 to produce a result of determination as to whether or not the result of the first image processing indicates that the image data includes a point with an area at least equal to the threshold value A. As described before, the point in this case is not a pixel, but a linked element. That is to say, in the embodiment shown in FIG. 8, a linked element (or a point at the step S104) with an area at least equal to the threshold value A is detected as an object.

In this embodiment, the area of a linked element (or a point at the step S104) is the number of pixels pertaining to the linked element. Let us assume that the area threshold value is set at A (=10). In this case, a linked element (or a group of pixels) with an area much smaller than the area threshold value A is determined to be a noise, instead of an object or a linked element corresponding to a finger. For example, a group of five pixels much fewer than the area threshold value A is regarded as a noise.

Figure 14:
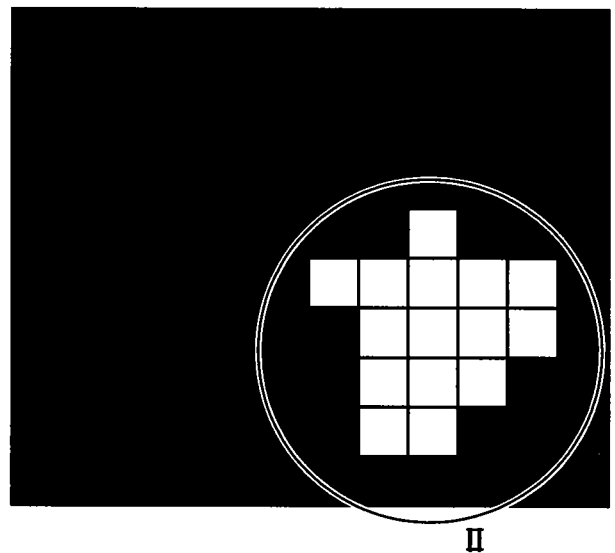
FIG. 14 is a diagram showing a typical result of the image processing represented by the flowchart shown in FIG. 9.

In the case of an example shown in FIG. 13, linked element I is a set of three white pixels. That is to say, the area of linked element I is three. Thus, linked element I is determined to be not meaningful data or not a candidate for an object. The process to determine that linked element I is not meaningful data or not a candidate for an object and to eliminate linked element I is a process to get rid of an isolated point. It is to be noted that the process to eliminate linked element I means a process to convert the three white pixels composing linked element I into black pixels or, to put it concretely, a process to change the pixel values of the three white pixels composing linked element I from one to zero. It is also worth noting that linked element II is a set of 15 white pixels. That is to say, the area of linked element II is 15. Thus, linked element II is not eliminated in the process to get rid of isolated points. As a result, linked element II remains as it is. That is to say, as a result of carrying out the process to get rid of isolated points on (a portion of) the received-light image shown in FIG. 13, an image like one shown in FIG. 14 is obtained.

Next, the label assigning process carried out at the step S103d is explained in detail.

The label assigning process is a process to append an arbitrary label to every linked element, which remains as a set of white pixels each having a pixel value of one in image data after a process to get rid of isolated points from the image data.

Figure 15:
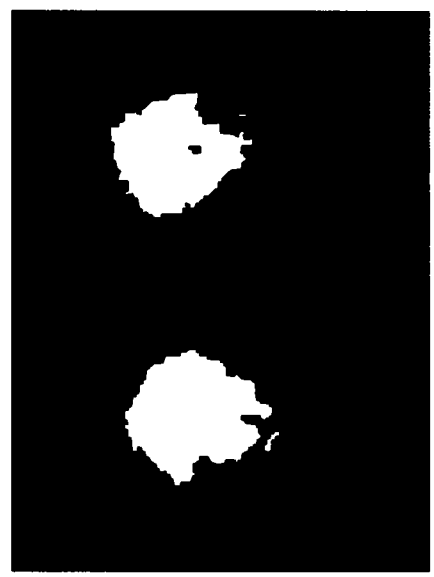
FIG. 15 is a diagram showing a typical result of the image processing represented by the flowchart shown in FIG. 9.

To put it concretely, let us assume for example that, as a result of a process carried out at the step S103c to get rid of isolated points, (a portion) of a received-light image is obtained as shown in FIG. 15.

Figure 16:
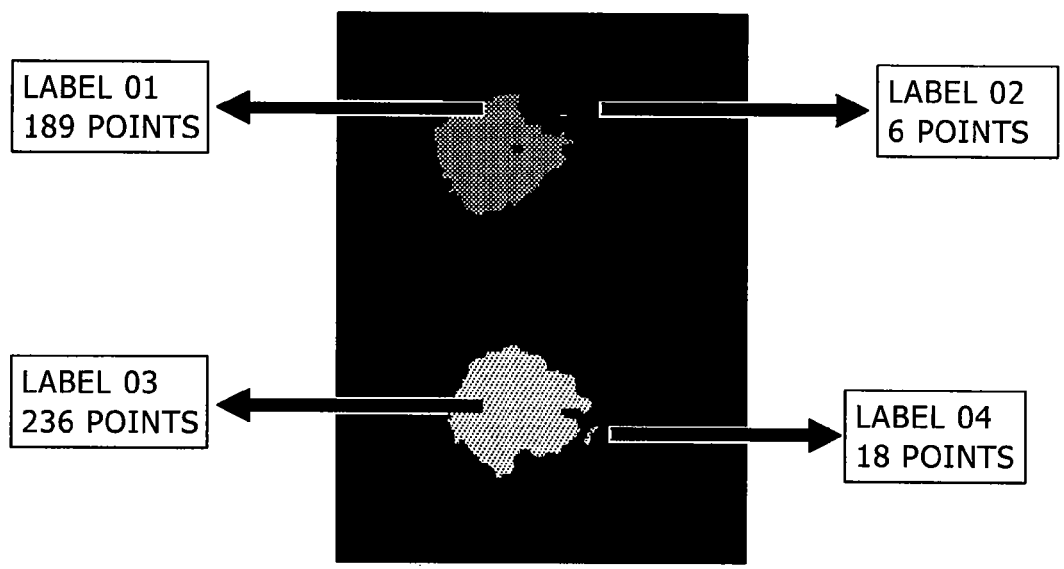
FIG. 16 is a diagram showing a typical result of the image processing represented by the flowchart shown in FIG. 9.

In this case, as a result of a label assigning process carried out on the received-light image shown in FIG. 15, Label 01, Label 02, Label 03 and Label 04 are appended respectively to four linked elements as shown in FIG. 16.

After the process to assign labels to linked elements is carried out at the step S103d of the flowchart explained by referring to FIG. 9 as described above, the flow of the processing goes on to a step S103e. At the step S103e, the image processing/evaluating unit 115 employed in the input/output processing unit 101 shown in FIG. 3 counts the number of points (pixels) included in each linked element with a label appended thereto.

A pixel count resulting from the pixel counting process carried out at the step S103e as the number of pixels included in a linked element represents the area of the linked element. To put it concretely, as a result of the pixel counting process carried out at the step S103e on a typical received-light image shown in FIG. 16 for example, the area of the linked element with Label 01 is found to be 189, the area of the linked element with Label 02 is found to be six, the area of the linked element with Label 03 is found to be 236 and the area of the linked element with Label 04 is found to be 18.

Let us assume for example that the area threshold value A is set at 100. In this case, the linked element with Label 01 and the linked element with Label 03 are each detected as an object. That is to say, the linked element with Label 01 and the linked element with Label 03 are each a linked element for a finger brought into contact with a contact portion on the display screen or approaching the contact portion. Thus, at the step S104 of the flowchart explained earlier by referring to FIG. 8, for example, the linked element with Label 01 and the linked element with Label 03 are each detected as a point having an area at least equal to the threshold value A.

The above description has explained details of the image processing carried out at the step S103 of the flowchart explained earlier by referring to FIG. 8 to compute areas.

The following description explains details of the image processing carried out at the step S107 of the flowchart explained earlier by referring to FIG. 8 to find positions.

Figure 17:
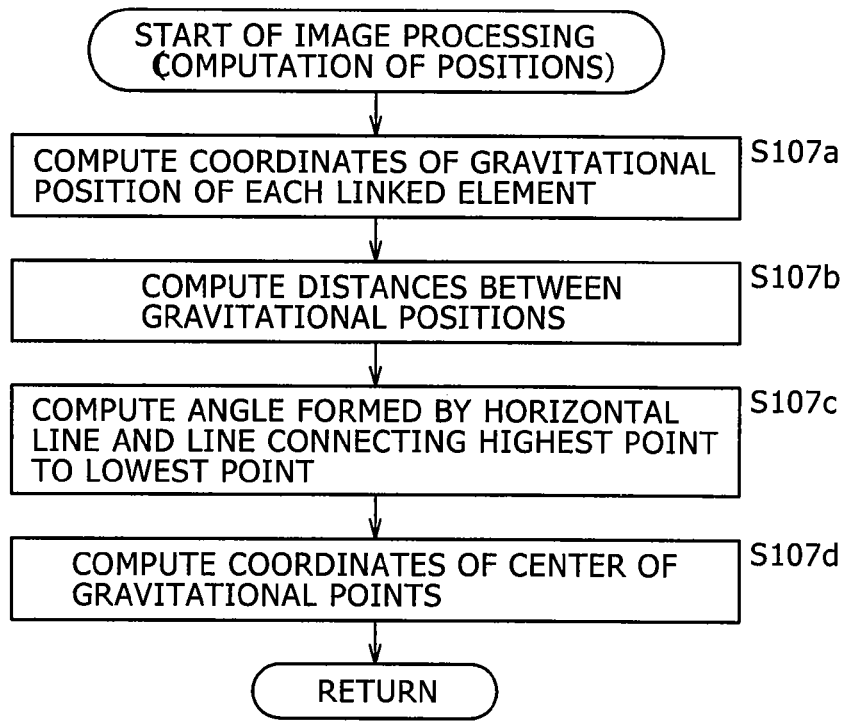
FIG. 17 shows a flowchart representing typical details of second image processing carried out at a step of the flowchart shown in FIG. 8 to compute the position of each contact portion.

FIG. 17 shows a flowchart representing details of the image processing carried out at the step S107.

The flowchart begins with a step S107a at which the image processing/evaluating unit 115 employed in the input/output processing unit 101 shown in FIG. 3 finds the coordinates of the center of gravity for each linked element.

A linked element, for which the coordinates of the center of gravity are found at the step S107a, is a linked element that has been detected as an object. That is to say, a linked element, for which the coordinates of the center of gravity are found at the step S107a, is a linked element that has been detected typically at the step S104 of the flowchart explained earlier by referring to FIG. 8 as a linked element having an area at least equal to the threshold value A. To put it concretely, in the case of the example shown in FIG. 16, the linked element with Label 01 and the linked element with Label 03 are each taken as an object of the process carried out at the step S107a.

To put it more accurately, however, in order for each of the linked element with Label 01 and the linked element with Label 03 to be qualified for an object of the process carried out at the step S107a, there must be another point (or another linked element) having an area at least equal to the threshold value A as demanded by the condition adopted in the determination process carried out at the step S105 of the flowchart explained earlier by referring to FIG. 8. This other linked element besides the linked element with Label 01 and the linked element with Label 03 is not shown in FIG. 16 though. Let us assume in this case that a linked element with Label 02 not shown in FIG. 16 actually exists as the other linked element having an area at least equal to the threshold value A besides a linked element shown in FIG. 16 as the linked element with Label 01 and a linked element shown in FIG. 16 as the linked element with Label 03. It is needless to say that the assumed other linked element with Label 02 is different from a linked element shown in FIG. 16 as the linked element with Label 02. The following description explains the image processing carried out in accordance with the flowchart shown in FIG. 17 to compute the positions of the other linked element with Label 02, the linked element with Label 01 and the linked element with Label 03.

Let us assume for example that pixels Pn compose a linked element shown in FIG. 16 as the linked element with Label 01 and (xn, yn) denote the coordinates of a pixel Pn where subscript n is an integer in the range one to 189. In this case, the coordinates of the center of gravity of for the linked element with Label 01 are computed as follows.

Since the linked element with Label 01 is a set of 189 pixels, the coordinates G01 of the center of gravity of for the linked element with Label 01 are computed as the average coordinates of the positions of the 189 pixels. That is to say, the coordinates G01 of the center of gravity are computed as follows:

$$G01=((x1+x2+x3++x189)/189,(y1+y2+y3++y189)/189)$$

In general, the coordinates Gk of the center of gravity of for the linked element with Label k where k is any one of label numbers 01, 02 and 03 are expressed as follows:

$$Gk=((\Sigma xi*wi)/\Sigma wi,(\Sigma yi*wi)/\Sigma wi) \quad (1)$$

where weight wi in Eq. (1) has a value of one in the case of a pixel having Label k or a value of zero in the case of a pixel other than a pixel having Label k.

By carrying out the process of the step S107a, it is possible to compute the coordinates G01 of the center of gravity of for the linked element with Label 01, the coordinates G02 of the center of gravity of for the linked element with Label 02 and the coordinates G03 of the center of gravity of for the linked element with Label 03. It is to be noted that FIG. 18 is a diagram showing results of the process to compute the coordinates G01 of the center of gravity of for the linked element with Label 01 and the coordinates G03 of the center of gravity of for the linked element with Label 03. The linked element with Label 01 and the linked element with Label 03 are the same as the linked elements of the example shown in FIG. 16.

It is to be noted that, in the following description, reference notation GK denotes a point having coordinates Gk, which are the coordinates of the center of gravity of for the linked element with Label k where k is any one of label numbers 01, 02 and 03. FIG. 19 is a diagram showing results of the process carried out at the step S107a to compute the coordinates G01 of the center of gravity of for the linked element with Label 01, the coordinates G02 of the center of gravity of for the linked element with Label 02 and the coordinates G03 of the center of gravity of for the linked element with Label 03. The subsequent processes are explained as follows.

At the next step S107b, the image processing/evaluating unit 115 computes distances between the centers of gravity. To put it concretely, the image processing/evaluating unit 115 computes a distance between points G01 and G02 shown in FIG. 19, a distance between points G02 and G03 shown in the same figure and a distance between points G03 and G01.

Then, at the next step S107c, the image processing/evaluating unit 115 computes an angle formed by a horizontal line and a line connecting the highest center of gravity to the lowest center of gravity. The highest center of gravity is the center of gravity having the largest y coordinate among y coordinates computed at the step S107a as the coordinates G01 of the center of gravity of for the linked element with Label 01, the coordinates G02 of the center of gravity of for the linked element with Label 02 and the coordinates G03 of the center of gravity of for the linked element with Label 03. On the other hand, the lowest center of gravity is the center of gravity having the smallest y coordinate among the coordinates G01, G02 and G03. In the case of an example shown in FIG. 19, the highest center of gravity is the point G01 whereas the lowest center of gravity is the point G03. Thus, the image processing/evaluating unit 115 computes an angle θs formed by the horizontal line and a line connecting the point G01 to the point G03.

Then, at the next step S107d, the image processing/evaluating unit 115 computes the coordinates Gtotal of the center of the gravitational points G01, G02 and G03. To put it concretely, in the case of the example shown in FIG. 19, the coordinates Gtotal of the center of the gravitational points G01, G02 and G03 are computed in accordance with Eq. (2) as follows:

$$Gtotal=((x1+x2+x3)/3,(y1+y2+y3)/3) \quad (2)$$

By using the results of the processing carried out at the step S107 of the flowchart explained earlier by referring to FIG. 8 to compute positions as described above, it is possible to carry out the determination processes at the steps S108 and S110 of the same flowchart.

For example, in the process carried out at the step S108 to produce a result of determination as to whether or not the positions of the three points are lined up approximately in the vertical direction, the angle θs found at the step S107c can be used.

To put it concretely, for example, an angle θv is taken as a criterion of the determination. Then, the process to produce a result of determination as to whether or not the positions of the three points are lined up approximately in the vertical direction is carried out by checking whether or not the following relations (3) are satisfied:

$$(90-\theta v)<\theta s<(90+\theta v) \quad (3)$$

Let us assume for example that θv=10 degrees. In this case, if the angle θs is in the range 80 degrees to 100 degrees, the determination result produced at the step S108 is YES. That is to say, the determination result indicates that the positions of the three points are lined up approximately in the vertical direction.

In addition to the angle θs described above, in the process carried out at the step S1108 to produce a result of determination as to whether or not the positions of the three points are lined up approximately in the vertical direction, the distances computed at the step S1107b can also be used to produce a more detailed result of determination.

To put it concretely, for example, in addition to the angle θs used in the process carried out at the step S108 to produce a result of determination as to whether or not the positions of the three points are lined up approximately in the vertical direction, conditions expressed by the following relations (4) and (5) can also be used.

$$\text{Distance between } G01 \text{ and } G02 < \text{Distance between } G03 \text{ and } G01 \quad (4)$$

$$\text{Distance between } G02 \text{ and } G03 < \text{Distance between } G03 \text{ and } G01 \quad (5)$$

As an alternative, for example, a condition expressed by the following relation (6) can also be used.

$$\text{Distance between } Gmid \text{ and } G02 < \text{Half distance between } G03 \text{ and } G01 \quad (6)$$

Figure 20:
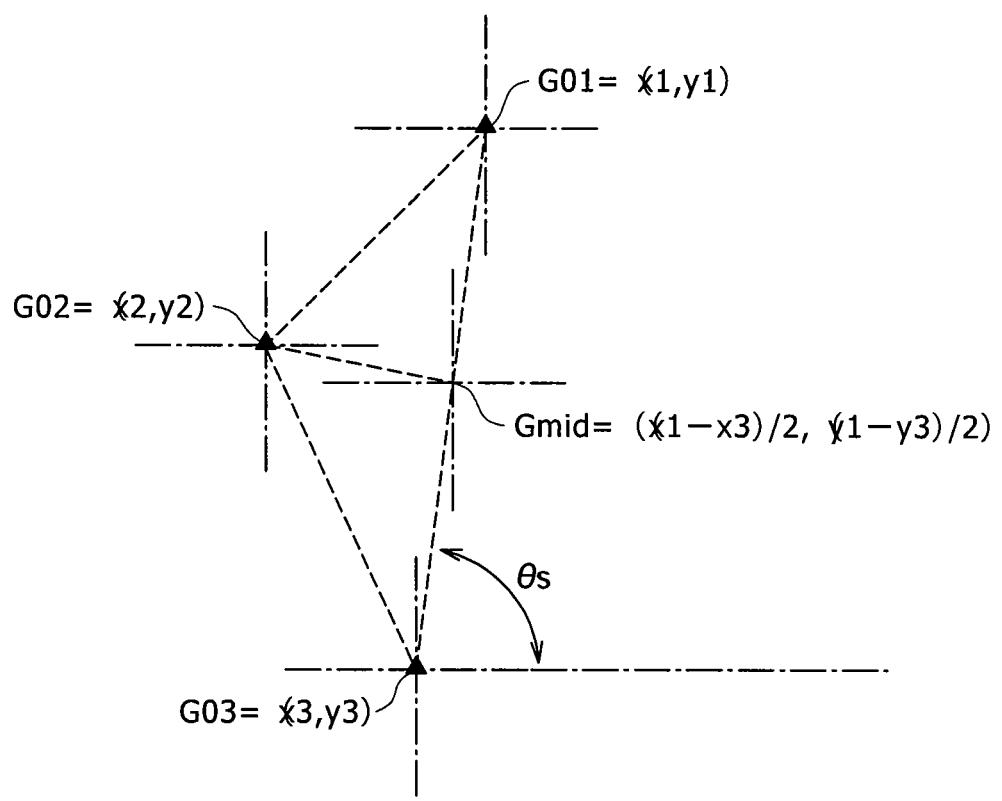
FIG. 20 is a diagram showing a typical result of the image processing represented by the flowchart shown in FIG. 17.

It is to be noted that, as shown in FIG. 20, symbol Gmid used in relation (6) denotes the middle point located between the points G01 and G03 as a point having the following coordinates:

$$((x1-x3)/2,(y1-y3)/2))$$

It is also worth noting that determination processing based on the condition expressed by relation (6) will be explained in detail later by referring to a flowchart shown in FIG. 25.

The process carried out at the step S110 of the flowchart explained earlier by referring to FIG. 8 to determine what locations on the screen the three points of gravity are located can be based on the coordinates Gtotal found at the step S107*d* as the coordinates of the center of the gravitational points G01, G02 and G03. To put it concretely, if the center of the points of gravity is located on the left side of the center of the display screen, the points of gravity are determined to be points located on the left side of the display screen. If the center of the points of gravity is located on the right side of the center of the display screen, on the other hand, the points of gravity are determined to be points located on the right side of the display screen.

Figure 22:
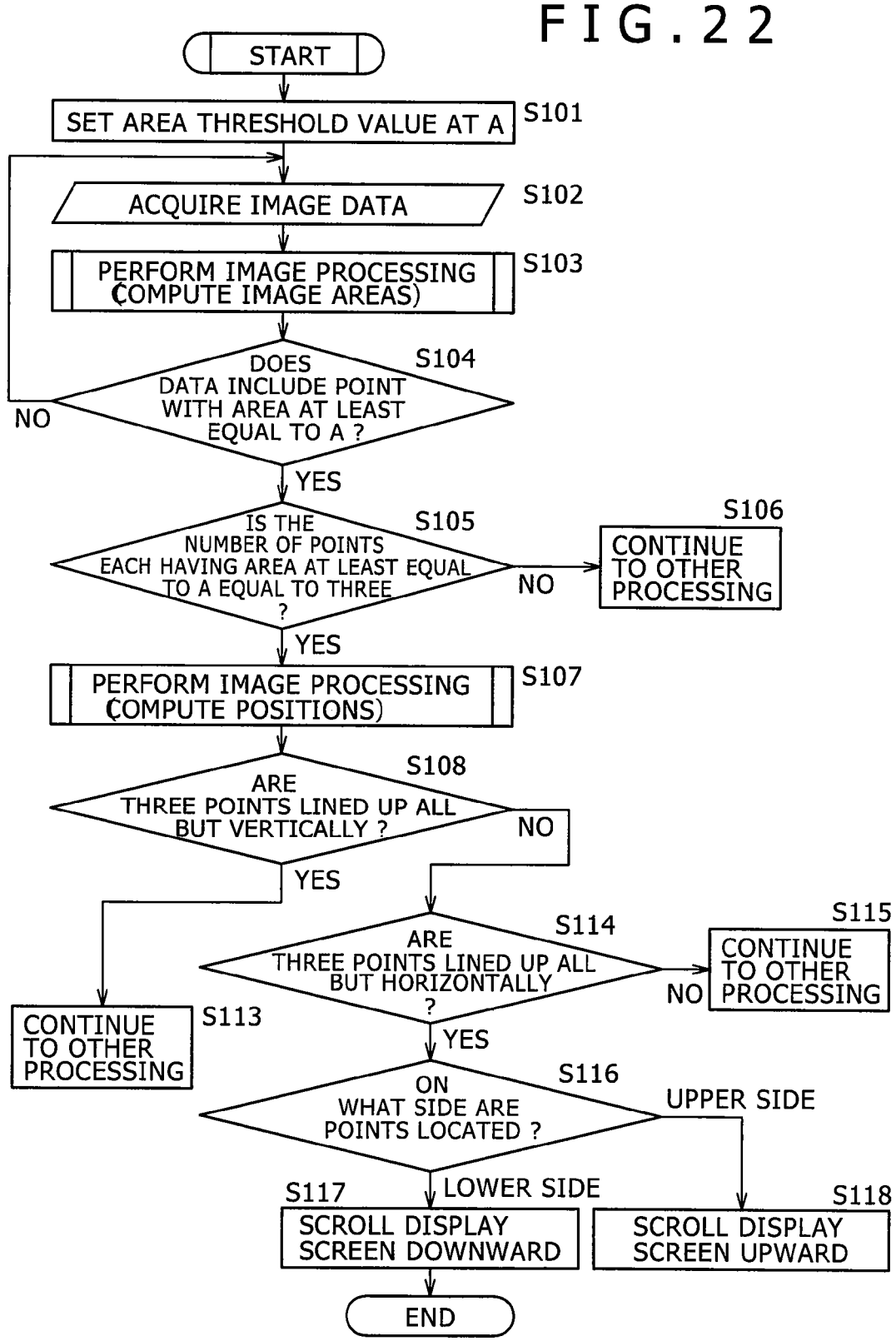
FIG. 22 shows a flowchart representing typical image processing (2) carried out to recognize an operation command from a received-light image in accordance with an embodiment of the present invention.

Next, by referring to FIGS. 21 and 22, the following description explains other typical processing to recognize an operation command issued by the operator on the basis of relations between the positions of a plurality of contact portions. FIG. 21 is a diagram showing a case in which the operator brings its three fingers f1, f2 and f3 into contact with the lower edge of the display screen of the display area (the sensor area) 121, causing three contact portions 151, 152 and 153 to be detected.

FIG. 22 shows a flowchart representing typical processing to recognize an operation command issued by the operator on the basis of a received-light image when the contact portions like the ones shown in FIG. 21 are detected. By referring to this flowchart, the following description explains typical processing to recognize an operation command issued by the operator on the basis of relations between the positions of the detected contact portions.

The processing is explained on the assumption that the following command definitions are added in advance as definitions of an operation command indicated by contact portions. If three fingers are brought into contact at the same time with contact portions in a state of being lined up in the vertical direction, the operation command represented by the fingers is recognized as a command to scroll the displayed image in the vertical direction. If three fingers are brought into contact at the same time with contact portions in a state of being lined up in the horizontal direction, the operation command represented by the fingers is recognized as a command to scroll the displayed image in the horizontal direction.

In other words, the flowchart explained by referring to FIG. 22 represents typical processing carried out mainly as the functions of the positional-relation-command recognition unit 23, the command-definition holding unit 26 and the command issuance unit 27, which are employed in the command recognition/issuance unit 17 of the image inputting/outputting apparatus 1 shown in FIG. 2 as a section configured to operate as the command determination unit 116 employed in the input/output processing unit 101 shown in FIG. 3. That is to say, in the typical processing represented by the flowchart explained by referring to FIG. 22, the command-definition holding unit 26 contains the command definitions declaring that, if three fingers are brought into contact at the same time with contact portions in a state of being lined up in the vertical direction, the operation command represented by the fingers is recognized as a command to scroll the displayed image in the vertical direction whereas, if three fingers are brought into contact at the same time with contact portions in a state of being lined up in the horizontal direction, the operation command represented by the fingers is recognized as a command to scroll the displayed image in the horizontal direction. Then, on the basis of these two command definitions, the positional-relation-command recognition unit 23 recognizes an operation command entered by the operator as a command to scroll the displayed image in the right, left, upward or downward direction, and the command issuance unit 27 issues an internal command corresponding to the recognized operation command.

It is to be noted that, much like the point mentioned in the explanation of the processing represented by the flowchart shown in FIG. 8, a point mentioned in the explanation of the processing represented by the flowchart shown in FIG. 22 does not mean a pixel, but implies an object cited earlier or a linked element cited in the flowchart explained by referring to figures such as FIG. 9.

In the typical processing represented by the flowchart explained by referring to FIG. 22, a process carried out at a step S101 as a process of setting the area threshold value A for detection of a contact portion to a process carried out at a step S1108 as a process of producing a result of determination as to whether or not the positions of the three points are lined up approximately in the vertical direction are respectively identical with the corresponding processes of the steps S101 to S108 of the flowchart explained earlier by referring to FIG. 8. If the determination result produced at the step S108 indicates that the positions of the three points are lined up approximately in the vertical direction, the flow of the processing goes on to a step S113 at which another process is carried out. It is to be noted that an example of the other process carried out at the step S113 is the processes carried out at the steps S110 to S112 of the flowchart explained earlier by referring to FIG. 8. If the determination result produced at the step S108 does not indicate that the positions of the three points are lined up approximately in the vertical direction, on the other hand, the flow of the processing goes on to a step S114 to produce a result of determination as to whether or not the positions of the three points are lined up approximately in the horizontal direction. If the result of the determination does not indicate that the positions of the three points are lined up approximately in the horizontal direction, the flow of the processing goes on to a step S115 at which another process is carried out. If the result of the determination indicates that the positions of the three points are lined up approximately in the horizontal direction, on the other hand, the flow of the processing goes on to a step S116 to recognize what side of the display screen the three points are located. If the three points are located on the lower side of the screen display, the flow of the processing goes on to a step S117 at which the display screen is scrolled in the downward direction. If the three points are located on the upper side of the screen display, on the other hand, the flow of the processing goes on to a step S118 at which the display screen is scrolled in the upward direction.

It is to be noted that the process carried out at the step S114 to produce a result of determination as to whether or not the positions of the three points are lined up approximately in the horizontal direction can be implemented in the same way as the process carried out at the step S108. In addition, the process carried out at the step S116 to recognize what side of the display screen the three points are located can be implemented in the same way as the process carried out at the step S110 of the flowchart described before by referring to FIG. 8.

For example, if the operator brings its three fingers f1, f2 and f3 into contact with the lower edge of the display screen of the display area (the sensor area) 121 as explained earlier by referring to the upper portion of FIG. 21, a received-light image like the one shown in the lower portion of FIG. 21 is obtained. In this case, since the three detected contact portions 151, 152 and 153 are lined up approximately in the horizontal direction and placed at the lower edge of the display screen, the display screen is scrolled in the downward direction.

In the embodiment described above, an operation command entered by the operator is recognized on the basis of relations between detected contact portions. Next, by referring to FIGS. 23 to 36, the following description explains typical processing carried out to recognize an operation command entered by the operator on the basis of changes of positions at which a plurality of contact portions are located. FIG. 23 is a diagram showing a state in which the operator has brought its three fingers f1, f2 and f3 into contact with the display screen of the display area (the sensor area) 121. Let us assume that, from this state, the contact positions touched by the fingers f1, f2 and f3 are moved in directions indicated by arrows a1, a2 and a3 respectively. The lower portion of FIG. 23 shows received-light images for the state shown in the upper portion. A received-light image P1 is a typical received-light image obtained prior to the movements of the fingers f1, f2 and f3. On the received-light image P1, three contact portions 161a, 162a and 163a are detected for the fingers f1, f2 and f3 respectively. A received-light image P2 is a typical received-light image obtained in the course of the movements of the fingers f1, f2 and f3. A received-light image P3 is a typical received-light image obtained after the movements of the fingers f1, f2 and f3. In this way, in the data of the received-light image, the positions of the contact portions change with the lapse of time. As a result, on the received-light image P3, the distances between contact portions 161c, 162c and 163c are obviously greater than the distances between respectively the contact portions 161a, 162a and 163a in the initial received-light image P1.

FIG. 24 shows a flowchart representing processing carried out to recognize an operation command entered by the operator for a case in which a plurality of contact portions like the ones shown in FIG. 23 are detected. By referring to this flowchart, the following description explains the processing carried out to recognize an operation command entered by the operator on the basis of the moving positions of the detected contact portions. The processing is explained on the assumption that the following command definitions are stored in advance as definitions of an operation command indicated by contact portions. If three fingers are brought into contact at the same time with contact portions in a state of being placed approximately on the circumference of a circle and the positions of the fingers are moving to enlarge the circle, the operation command represented by the fingers is recognized as a command to enlarge the displayed image. If three fingers are brought into contact at the same time with contact portions in a state of being placed approximately on the circumference of a circle and the positions of the fingers are moving to shrink the circle, the operation command represented by the fingers is recognized as a command to shrink the displayed image.

In other words, the flowchart explained by referring to FIG. 24 represents typical processing carried out mainly as the functions of the detection-result holding unit 21, the compound-command recognition unit 25, the command-definition holding unit 26 and the command issuance unit 27, which are employed in the command recognition/issuance unit 17 of the image inputting/outputting apparatus 1 shown in FIG. 2 as a section configured to operate as the command determination unit 116 employed in the input/output processing unit 101 shown in FIG. 3. That is to say, in the typical processing represented by the flowchart explained by referring to FIG. 24, the command-definition holding unit 26 contains the command definitions declaring that, if three fingers are brought into contact at the same time with contact portions in a state of being placed approximately on the circumference of a circle and the positions of the fingers are moving to enlarge the circle, the operation command represented by the fingers is recognized as a command to enlarge the displayed image whereas, if three fingers are brought into contact at the same time with contact portions in a state of being placed approximately on the circumference of a circle and the positions of the fingers are moving to shrink the circle, the operation command represented by the fingers is recognized as a command to shrink the displayed image. Then, on the basis of these two command definitions, the compound-command recognition unit 25 recognizes an operation command as a command to enlarge or shrink the displayed image, and the command issuance unit 27 issues an internal command corresponding to the recognized operation command.

That is to say, a compound condition including a condition based on relations between the positions of three objects each corresponding to a finger (that is, a condition requiring that the three fingers be brought into contact at the same time with contact portions in a state of being placed approximately on the circumference of a circle) and a condition based on changes of the positions of the objects with the lapse of time (that is, a condition requiring that the three fingers be moved in directions to enlarge the circle) is the condition for execution of a compound command to enlarge the display screen. By the same token, a compound condition including a condition based on relations between the positions of three objects each corresponding to a finger (that is, a condition requiring that the three fingers be brought into contact at the same time with contact portions in a state of being placed approximately on the circumference of a circle) and a condition based on changes of the positions of the objects with the lapse of time (that is, a condition requiring that the three fingers be moved in directions to shrink the circle) is the condition for execution of a compound command to shrink the display screen.

For the reason described above, the compound-command recognition unit 25 operates in the typical processing represented by the flowchart explained by referring to FIG. 24. In other words, if the function of the compound-command recognition unit 25 is transferred to the command issuance unit 27 as described above, the positional-relation-command recognition unit 23 and the time-positional-change-command recognition unit 22 operate in the processing.

It is to be noted that, much like the point mentioned in the explanation of the processing represented by the flowchart shown in FIG. 8, a point mentioned in the explanation of the processing represented by the flowchart shown in FIG. 24 does not mean a pixel, but implies an object cited earlier or a linked element cited in the flowchart explained earlier by referring to figures such as FIG. 9.

In the typical processing represented by the flowchart explained by referring to FIG. 24, a process carried out at a step S101 as a process of setting the area threshold value A for detection of a contact portion to a process carried out at a step S114 as a process of producing a result of determination as to whether or not the positions of the three points are lined up approximately in the horizontal direction are respectively identical with the corresponding processes of the steps S101 to S114 of the flowchart explained earlier by referring to FIG. 22. If the result of the determination indicates that the three points are lined up approximately in the horizontal direction, the flow of the processing goes on to a step S1119 at which another process is carried out.

It is to be noted that the other process carried out at the step S113 is typically the processes carried out at the steps S110 to S112 of the flowchart explained earlier by referring to FIG. 8. In order to carry out this other process, however, the command-definition holding unit 26 must hold a command definition stating that, if three fingers are brought into contact at the same time with contact portions in a state of being lined up in the vertical direction, the operation command represented by the fingers is recognized as a command to scroll the displayed image in the vertical direction.

The other process carried out at the step S119 is typically the processes carried out at the steps S116 to S118 of the flowchart explained earlier by referring to FIG. 22. In order to carry out this other process, however, the command-definition holding unit 26 must hold a command definition stating that, if three fingers are brought into contact at the same time with contact portions in a state of being lined up in the horizontal direction, the operation command represented by the fingers is recognized as a command to scroll the displayed image in the horizontal direction.

If a determination result produced in the process carried out at the step S114 is NO indicating that the three points are lined up not in the horizontal direction, the flow of the processing goes on to a step S120 to produce a result of determination as to whether or not the three points are located approximately on the circumference of a circle. If the result of the determination does not indicate that the three points are located approximately on the circumference of a circle, the flow of the processing goes on to a step S121 at which another process is carried out. If the result of the determination indicates that the three points are located approximately on the circumference of a circle, on the other hand, the flow of the processing goes on to a step S122 to produce a result of determination as to whether or not the three points are moving. If the result of the determination indicates that the three points are not moving, the execution of the processing represented by this flowchart is ended. If the result of the determination indicates that the three points are moving, on the other hand, the flow of the processing goes on to a step S123 to produce a result of determination as to whether or not the three points are moving in directions to enlarge the display screen. If the result of the determination indicates that the three points are moving in directions to enlarge the display screen, the flow of the processing goes on to a step S124 at which the operation command entered by the operator is recognized as a command to enlarge the display screen. If the result of the determination indicates that the three points are moving in directions to shrink the display screen, on the other hand, the flow of the processing goes on to a step S125 at which the operation command entered by the operator is recognized as a command to shrink the display screen.

Next, by referring to FIGS. 25 to 35, the following description explains details of every main process included in the processing represented by the flowchart explained above by referring to FIG. 24.

It is to be noted that, in the following description, the image processing/evaluating unit 115 employed in the input/output processing unit 101 shown in FIG. 3 carries out the processes of the steps S101 to S120 of the flowchart explained above by referring to FIG. 24. However, the command determination unit 116 may carry out at least some of the processes of the steps S101 to S120 of the flowchart explained above by referring to FIG. 24.

Figure 25:
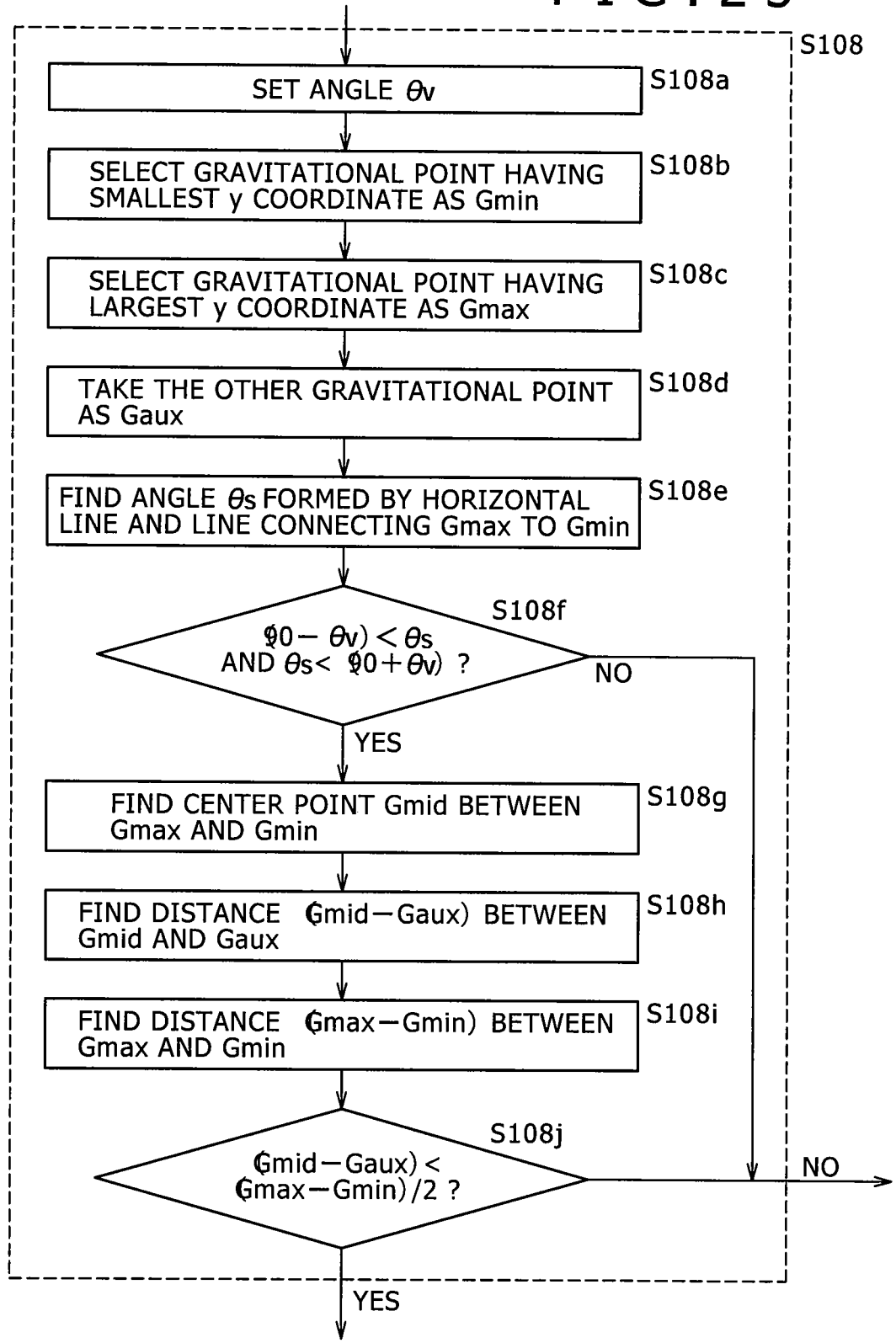
FIG. 25 shows a flowchart representing typical details of a determination process carried out at a step S108 of the flowchart shown in FIG. 24.

FIG. 25 shows a flowchart representing details of the process carried out at the step S1108 to produce a result of determination as to whether or not the positions of the three points are lined up approximately in the vertical direction.

Figure 26:
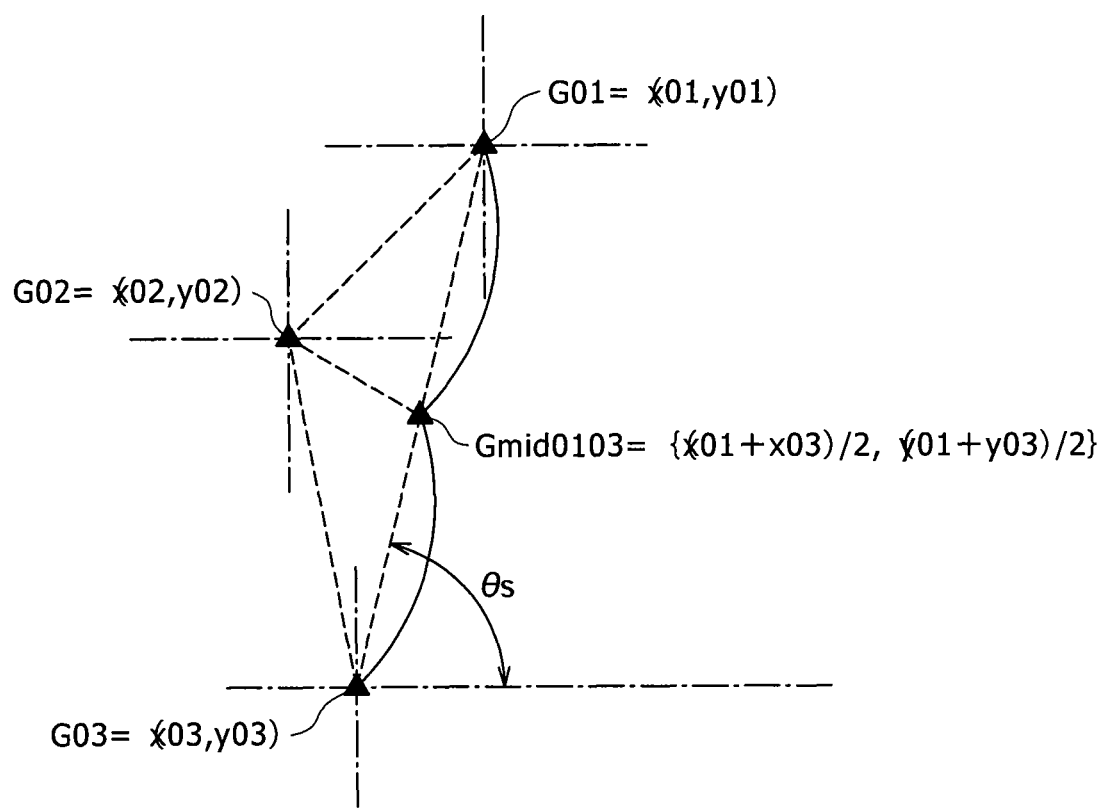
FIG. 26 is a diagram showing a typical result of the image processing represented by the flowchart shown in FIG. 25.

Let us keep in mind that, in the following description, it is assumed that the positions of points shown in FIG. 26 are obtained as a result of the image processing carried out at the step S107 of the flowchart explained earlier by referring to FIG. 24 as processing to find positions.

Processes carried out at steps S108a to S108f are processing of determination based on relation (3) described earlier.

To put it in detail, at the step S108a, the image processing/evaluating unit 115 employed in the input/output processing unit 101 shown in FIG. 3 acquires an angle $\theta v$. As described earlier, the angle $\theta v$ is an angle serving as a criterion as to whether or not the positions of the three linked elements (that is, the three points cited in the step S1108 of the flowchart explained earlier by referring to FIG. 24) are lined up approximately in the vertical direction. Normally, this angle has been stored in advance typically in the command-definition holding unit 26 employed in the image inputting/outputting unit 1 shown in FIG. 2.

Then, at the next step S108b, the image processing/evaluating unit 115 selects a linked element with a point of gravity having the smallest y coordinate among the three linked elements. Let reference notation Gmin denotes the point of gravity of the selected linked element. In the case of typical points shown in FIG. 26, for example, a point G03 is the point of gravity of the linked element Gmin.

Then, at the next step S108c, the image processing/evaluating unit 115 selects a linked element with a point of gravity having the largest y coordinate among the three linked elements. Let reference notation Gmax denotes the point of gravity of the selected linked element. In the case of the typical points shown in FIG. 26, for example, a point G01 is the point of gravity of the linked element Gmax.

Then, at the next step S108d, the image processing/evaluating unit 115 takes the point of gravity of the remaining one among the three linked elements as the point of gravity Gaux which is a point G02 in the case of the example shown in FIG. 26.

Subsequently, at the next step S108e, the image processing/evaluating unit 115 finds the angle $\theta s$ formed by a horizontal line and a line connecting the point of gravity of the linked element Gmin to the point of gravity of the linked element Gmax. In the case of the example shown in FIG. 26, the angle $\theta s$ is an angle formed by a horizontal line and a line connecting the point G01 to the point G03.

Then, at the next step S108f, the image processing/evaluating unit 115 produces a result of determination as to whether or not the following relation holds true:

$$(90-\theta v) < \theta s < (90+\theta v)$$

That is to say, at the step S108f, the image processing/evaluating unit 115 produces a result of determination as to whether or not relation (3) holds true.

If the determination result produced in the process carried out at the step S108f is NO indicating that the three points (or the three linked elements) are located at positions lined up not in the vertical direction, that is, if the process carried out at the step S108 produces a determination result of NO, the flow of the processing represented by the flowchart explained earlier by referring to FIG. 24 goes on to the step S114.

If the determination result produced in the process carried out at the step S108f is YES indicating that the three points (or the three linked elements) are located at positions lined up approximately in the vertical direction, on the other hand, processes of steps S108g to S108j are carried out. The processes of steps S108g to S108j are processing of determination based on relation (6) described earlier. In other words, the determination processing carried out at the steps S108g to S108j is processing for a case in which attention is focused on the way the three points are lined up.

To be more specific, at the step S108g, the image processing/evaluating unit 115 finds the middle point Gmid between the points Gmax and Gmin. In the example shown in FIG. 26, the points Gmax and Gmin are the points G01 and G03 respectively and reference notation Gmid0103 denotes the middle point Gmid.

Then, at the next step S108h, the image processing/evaluating unit 115 finds the distance (Gmid−Gaux) between the points Gmid and Gaux. As described earlier, in the example shown in FIG. 26, the point Gaux is the point G02. Subsequently, at the next step S108i, the image processing/evaluating unit 115 finds the distance (Gmax−Gmin) between the points Gmax and Gmin.

Then, at the next step S108j, the image processing/evaluating unit 115 produces a result of determination as to whether or not the following relation holds true:

(Gmid−Gaux)<(Gmax−Gmin)/2

It is to be noted that in the case of the example shown in FIG. 26, that is, in an example with the points G01, G03 and G02 serving as Gmax, Gmin and Gaux respectively, the relation (Gmid−Gaux)<(Gmax−Gmin)/2 corresponds to relation (6). That is to say, the determination process carried out at the step S108j is a process to produce a result of determination as to whether or not relation (6) holds true.

In other words, the determination process carried out at the step S108j is a process to produce a result of determination as to whether or not the distance (Gmid−Gaux) is shorter than half the distance (Gmax−Gmin). A relation indicating that the distance (Gmid−Gaux) is shorter than half the distance (Gmax−Gmin) means that the distance (Gmid−Gaux) is shorter than the distance (Gmax−Gmid) or shorter than the distance (Gmin−Gmid). In the example shown in FIG. 26, the distance (Gmid−Gaux) is the distance (Gmid0103−G02), the distance (Gmax−Gmid) is the distance (G01−Gmid0103) and the distance (Gmin−Gmid) is the distance (G03−Gmid0103).

Thus, if the distance (Gmid−Gaux) or the distance (Gmid0103−G02) in the example shown in FIG. 26 is shorter than the distance (Gmax−Gmid) or the distance (G01−Gmid0103) in the example shown in FIG. 26 or shorter than the distance (Gmin−Gmid) or the distance (G03−Gmid0103) in the same example, the determination result produced in the process carried out at the step S108j is YES meaning that the three points or the three linked elements are located at positions lined up approximately in the vertical direction. Thus, the determination result produced in the process carried out at the step S108 of the flowchart explained earlier by referring to FIG. 24 is also YES. If the determination result produced in the process carried out at the step S108 is YES, the flow of the processing represented by the flowchart goes on to the step S113.

If the determination result produced in the process carried out at the step S108j is NO meaning that the three points or the three linked elements are located at positions lined up not in the vertical direction, on the other hand, the determination result produced in the process carried out at the step S108 of the flowchart explained earlier by referring to FIG. 24 is also NO. If the determination result produced in the process carried out at the step S108 is NO, the flow of the processing represented by the flowchart explained earlier by referring to FIG. 24 goes on to the step S114.

As described above, the embodiment explained by referring to the flowchart shown in FIG. 25 implements not only the determination processes carried out at the steps S108a to S108f or determination processes based on relation (3) explained earlier, but also the determination processes carried out at the steps S108g to S108i or determination processes based on relation (6) described before. This is because, by carrying out only the determination processes based on relation (3), there are cases in which the flow of the processing represented by the flowchart explained before by referring to FIG. 24 may not reach the step S120 of the flowchart to produce a result of determination as to whether or not the three points are located approximately on the circumference of a circle.

Figure 27:
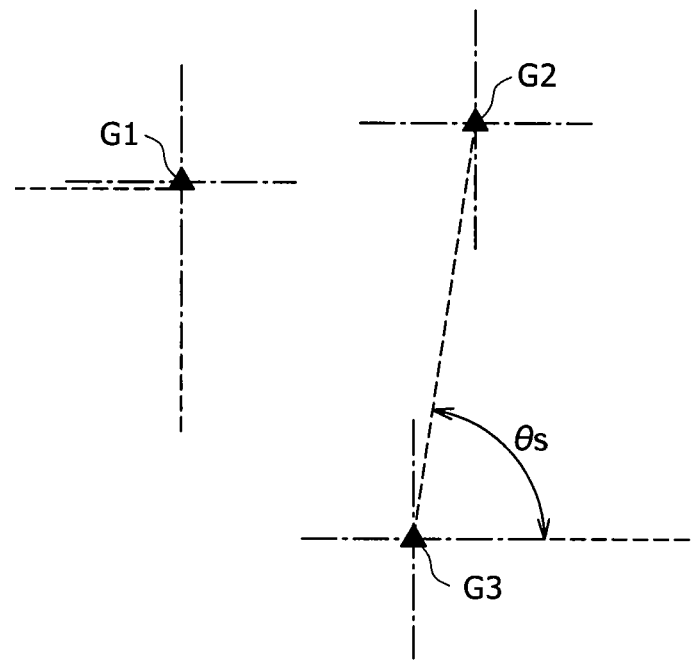
FIG. 27 is an explanatory diagram to be referred to in describing reasons why steps 108g to 108j of the flowchart shown in FIG. 25 are executed.

To put it concretely, let us assume for example that the image processing carried out at the step S107 of the flowchart explained before by referring to FIG. 24 produces a result shown in FIG. 27 instead of the result shown in FIG. 26. In this case, as shown in FIG. 27, the angle θs is an angle formed by a horizontal line and a line connecting the center of gravity G2 to the center of gravity G3. Thus, by carrying out only the determination processes at the steps S108a to S108f or the determination processes based on relation (3), the positions of the three points or the three linked elements are determined as positions lined up approximately in the vertical direction. In the case of the relation shown in FIG. 27 as a relation between the positions, however, the positions of the three points or the three linked elements are determined as positions lined up not in the vertical direction. Rather, in many cases, the positions of the three points or the three linked elements are properly determined as positions located approximately on the circumference of a circle. In order to solve this problem, the embodiment explained by referring to the flowchart shown in FIG. 25 adds the determination processes based on relation (6) in order to give a stricter condition for the positions of the three points or the three linked elements to be determined as positions lined up approximately in the vertical direction. However, there will be no problem to deliberately set a rule determining that the relation like the one shown in FIG. 27 as a relation between positions is a relation of three points lined up approximately in the vertical direction.

The above description has explained details of the determination process carried out at the step S108 of the flowchart explained earlier by referring to FIG. 24 to produce a result of determination as to whether or not the positions of the three points are lined up approximately in the vertical direction.

Figure 28:
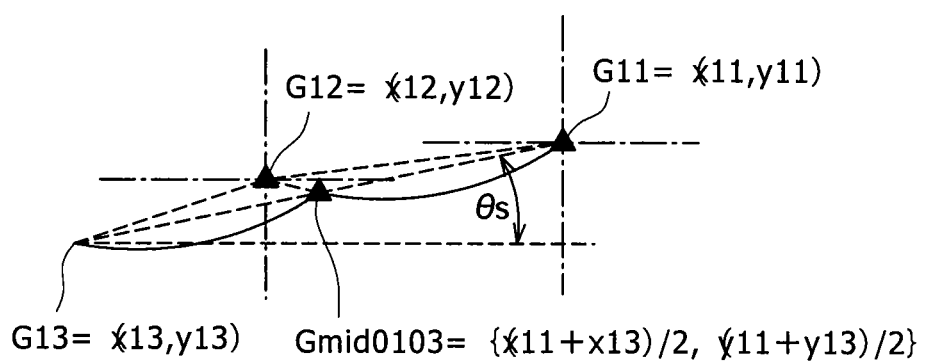
FIG. 28 is a diagram showing a typical result of a determination process carried out at a step S114 of the flowchart shown in FIG. 24.

By taking a case shown in FIG. 28 as an example, the following description explains details of the determination processing carried out at the step S1114 of the flowchart described earlier by referring to FIG. 24 to produce a result of determination as to whether or not the positions of the three points are lined up approximately in the horizontal direction. The positions of points shown in FIG. 28 are obtained as a result of the image processing carried out at the step S107 of the flowchart described earlier by referring to FIG. 24 to find positions. Accordingly, the determination result produced in the process carried out at the step S108 of the flowchart described earlier by referring to FIG. 24 is NO causing the flow of the processing to go on to the step S114 as described below in detail.

It is to be noted that the processing to produce a result of determination as to whether or not the positions of three points are lined up approximately in the horizontal direction is basically similar to the processing to produce a result of determination as to whether or not the positions of three points are lined up approximately in the vertical direction. For this reason, the following description properly excludes some of explanation of processes included in the processing to produce a result of determination as to whether or not the positions of three points are lined up approximately in the horizontal direction as processes corresponding to their respective counterparts included in the processing to produce a result of determination as to whether or not the positions of three points are lined up approximately in the vertical direction.

Figure 29:
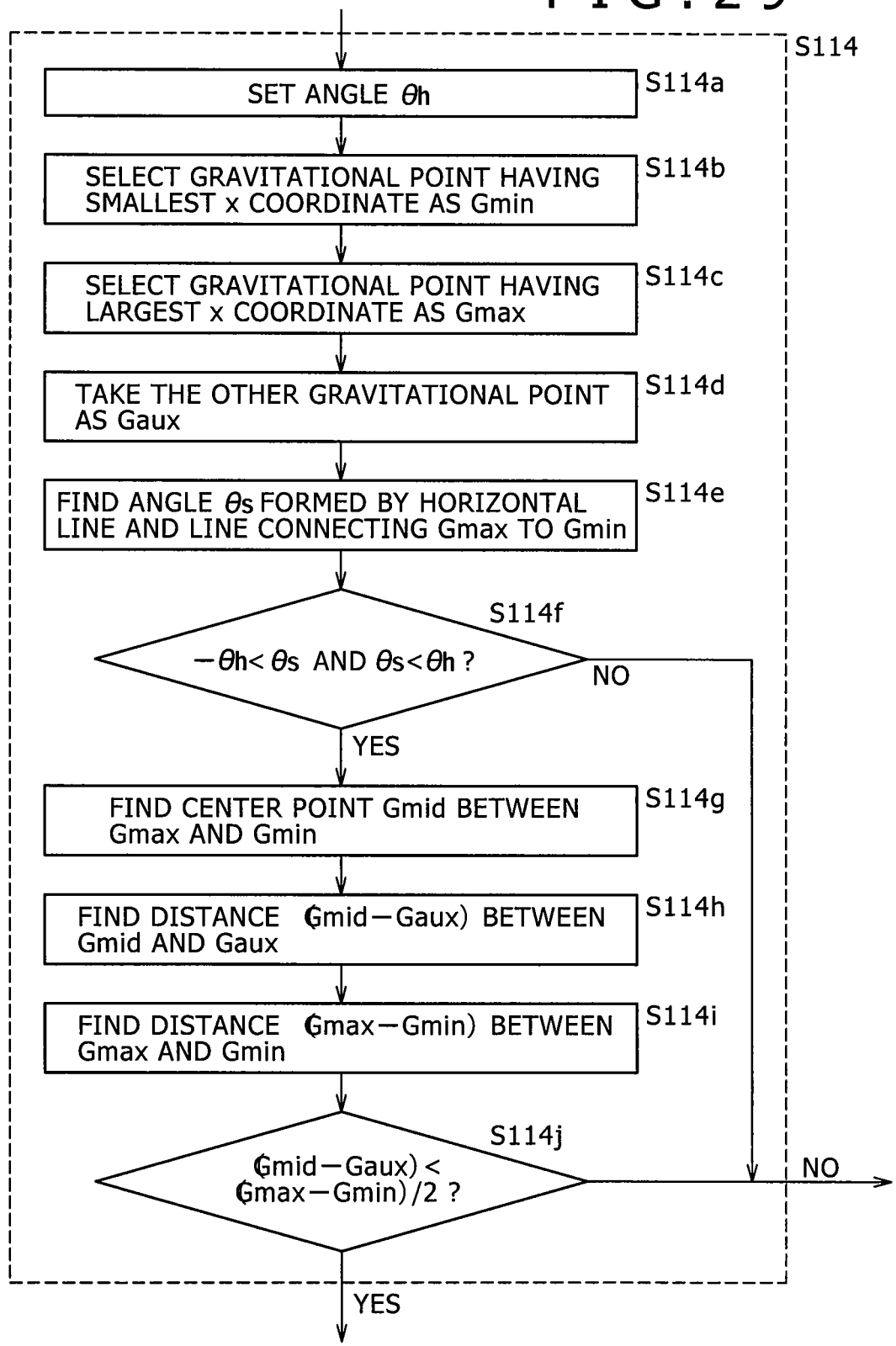
FIG. 29 shows a flowchart representing typical details of the determination process carried out at the step S114 of the flowchart shown in FIG. 24.

FIG. 29 shows a flowchart representing details of the determination processing carried out at the step S114 of the flowchart described earlier by referring to FIG. 24 to produce a result of determination as to whether or not the positions of the three points are lined up approximately in the horizontal direction.

Processes of the steps S114a to S114f of the flowchart to be explained later by referring to FIG. 29 are the counterparts of the processes of the steps S108a to S108f of the flowchart explained earlier by referring to FIG. 25.

To put it in detail, at the step S114a, the image processing/evaluating unit 115 employed in the input/output processing unit 101 shown in FIG. 3 acquires an angle θh. Much like the angle θv, the angle θh is an angle serving as a criterion as to whether or not the positions of the three linked elements (that is, the three points cited in the step S114 of the flowchart explained earlier by referring to FIG. 24) are lined up approximately in the horizontal direction. Normally, this angle has been stored in advance typically in the command-definition holding unit 26 employed in the image inputting/outputting unit 1 shown in FIG. 2.

Then, at the next step S114b, the image processing/evaluating unit 115 selects a linked element with a point of gravity having the smallest x coordinate among the three linked elements. Let reference notation Gmin denotes the point of gravity of the selected linked element. In the case of typical points shown in FIG. 28, for example, a point G13 is the point of gravity of the linked element Gmin.

Then, at the next step S114c, the image processing/evaluating unit 115 selects a linked element with a point of gravity having the largest x coordinate among the three linked elements. Let reference notation Gmax denotes the point of gravity of the selected linked element. In the case of the typical points shown in FIG. 28, for example, a point G11 is the point of gravity of the linked element Gmax.

Then, at the next step S114d, the image processing/evaluating unit 115 takes the point of gravity of the remaining one among the three linked elements as the point of gravity Gaux which is a point G12 in the case of the example shown in FIG. 28.

Subsequently, at the next step S114e, the image processing/evaluating unit 115 finds the angle θs formed by a horizontal line and a line connecting the point of gravity of the linked element Gmin to the point of gravity of the linked element Gmax. In the case of the example shown in FIG. 28, the angle θs is an angle formed by a horizontal line and a line connecting the point G11 to the point G13.

Then, at the next step S114f, the image processing/evaluating unit 115 produces a result of determination as to whether or not the following relation holds true:

$-\theta h < \theta s < +\theta h$

If the determination result produced in the process carried out at the step S114f is NO indicating that the three points (or the three linked elements) are located at positions lined up not in the horizontal direction, that is, if the process carried out at the step S114 of the flowchart explained earlier by referring to FIG. 24 produces a determination result of NO, the flow of the processing represented by the flowchart goes on to the step S120.

If the determination result produced in the process carried out at the step S114f is YES indicating that the three points (or the three linked elements) are located at positions lined up approximately in the horizontal direction, on the other hand, processes of steps S114g to S114j are carried out. The processes of steps S114g to S114j respectively correspond to the processes of steps S108g to S108j of the flowchart explained earlier by referring to FIG. 25. In other words, the determination processing carried out at the steps S114g to S114j is processing for a case in which attention is focused on the way the three points are lined up.

To be more specific, at the step S114g, the image processing/evaluating unit 115 finds the middle point Gmid between the points Gmax and Gmin. In the example shown in FIG. 28, the points Gmax and Gmin are the points G11 and G13 respectively and reference notation Gmid0103 denotes the middle point Gmid.

Then, at the next step S114h, the image processing/evaluating unit 115 finds the distance (Gmid–Gaux) between the point Gmid and the point Gaux, which is the point G12 in the example shown in FIG. 28. Subsequently, at the next step S114i, the image processing/evaluating unit 115 finds the distance (Gmax–Gmin) between the points Gmax and Gmin.

Then, at the next step S114j, the image processing/evaluating unit 115 produces a result of determination as to whether or not the following relation holds true:

$(Gmid - Gaux) < (Gmax - Gmin)/2$

If the determination result produced in the process carried out at the step S114j is YES, the determination result produced in the process carried out at the step S114 of the flowchart explained earlier by referring to FIG. 24 is also YES meaning that the three points or the three linked elements are located at positions lined up approximately in the horizontal direction. If the determination result produced in the process carried out at the step S114 is YES, the flow of the processing represented by the flowchart goes on to the step S19.

If the determination result produced in the process carried out at the step S114j is NO meaning that the three points or the three linked elements are located at positions lined up not in the vertical direction, that is, if the determination result produced in the process carried out at the step S114 is NO, on the other hand, the flow of the processing represented by the flowchart explained earlier by referring to FIG. 24 goes on to the step S120.

As described above, the embodiment explained by referring to the flowchart shown in FIG. 29 implements not only the determination processes carried out at the steps S114a to S114f, but also the determination processes carried out at the steps S114g to S114j. This is because, by carrying out only the determination processes of the steps S114a to S114f, that is, by carrying out only the determination processes based on the angle θs, there are cases in which the flow of the processing represented by the flowchart explained before by referring to FIG. 24 may not reach the step S120 of the flowchart to produce a result of determination as to whether or not the three points are located approximately on the circumference of a circle. This case has been explained earlier by referring to FIG. 27.

The above description has explained details of the determination process carried out at the step S114 of the flowchart explained earlier by referring to FIG. 24 to produce a result of determination as to whether or not the positions of the three points are lined up approximately in the horizontal direction.

The following description explains details of the processing carried out at the step S120 of the flowchart explained earlier by referring to FIG. 24 to produce a result of determination as to whether or not the three points are located approximately on the circumference of a circle.

As described earlier, the embodiment represented by the flowchart explained before by referring to FIG. 24 carries out a process at the step S1108 to produce a result of determination as to whether or not the positions of the three points are lined up approximately in the vertical direction and a process at the step S114 to produce a result of determination as to whether or not the positions of the three points are lined up approximately in the horizontal direction. That is to say, the embodiment represented by the flowchart explained before by referring to FIG. 24 includes conditions of "being vertical or horizontal" and "being lined up." Thus, other positions, which the three points or the three linked elements are located at and different from the positions satisfying the conditions, may be determined to be locations existing approximately on the circumference of a circle. If the determination result produced in the process carried out at the step S108 does not indicate that the positions of the three points are lined up approximately in the vertical direction and the determination result produced in the process carried out at the step S114 does not indicate that the positions of the three points are lined up approximately in the horizontal direction, the flow of the processing goes on to a step S120 to produce a result of determination as to whether or not the three points are located approximately on the circumference of a circle. In this case, the determination result produced in the process carried out at the step S120 is YES.

Figure 30:
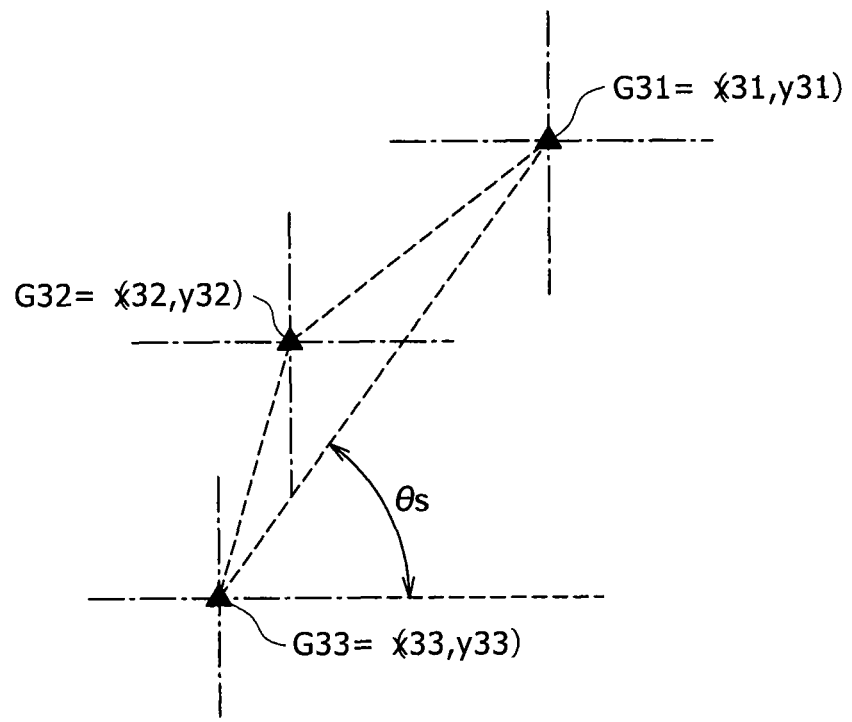
FIG. 30 is an explanatory diagram to be referred to in describing a typical determination technique adopted in a determination process carried out at a step S120 of the flowchart shown in FIG. 24.

However, let us assume in this case that the image processing carried out at the step S107 of the flowchart explained earlier by referring to FIG. 24 to compute positions produces a result shown in FIG. 30. As shown in FIG. 30, the centers of gravity of the three linked elements, that is, the points cited at the step S120 or other steps, are relatively lined up even though in a direction, which is neither vertical nor horizontal. Thus, even in this case, the determination result produced in the process carried out at the step S120 indicates that the three points are located approximately on the circumference of a circle.

Figure 31:
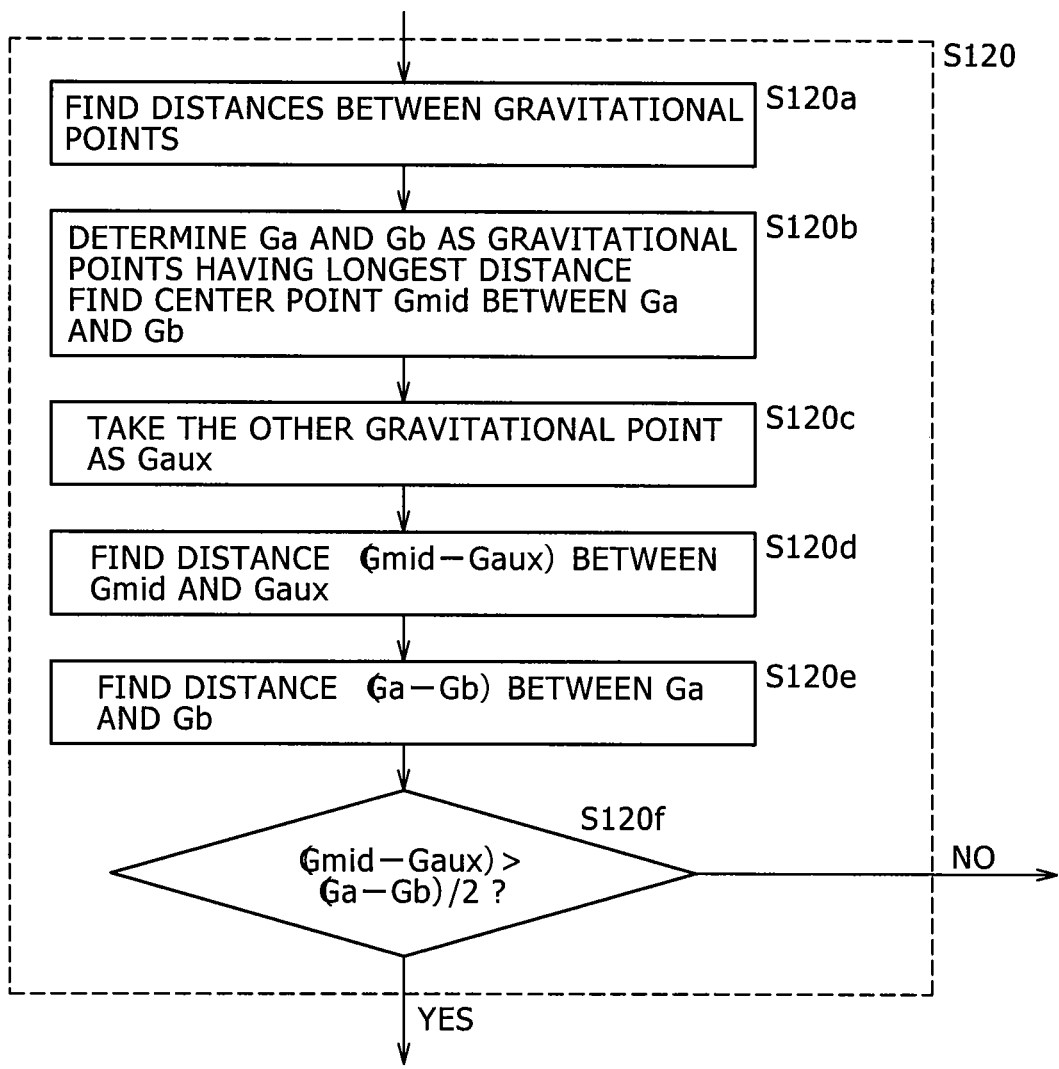
FIG. 31 shows a flowchart representing typical details of the determination process carried out at the step S120 of the flowchart shown in FIG. 24.

Thus, in order to avoid the process carried out at the step S120 of the flowchart explained earlier by referring to FIG. 24 from indicating that the three points are located approximately on the circumference of a circle for a case in which the centers of gravity of the three linked elements are relatively lined up even though in a direction, which is neither vertical nor horizontal, that is, in order to exclude the conditions of "being neither vertical nor horizontal" but "being relatively lined up" from the condition of "being located approximately on the circumference of a circle," for example, processing like one represented by a flowchart to be explained later by referring to FIG. 31 can be carried out.

That is to say, FIG. 31 shows a flowchart representing details of the process carried out at the step S120 to produce a result of determination as to whether or not the three points are located approximately on the circumference of a circle.

Figure 32:
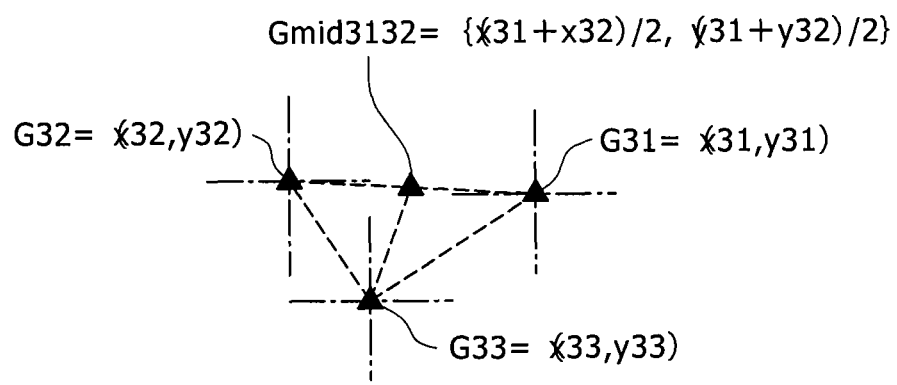
FIG. 32 is a diagram showing a typical result of the processing represented by the flowchart shown in FIG. 31.

The details of the process are explained on the assumption that the image processing carried out at the step S1107 of the flowchart explained earlier by referring to FIG. 24 to compute positions produces a result shown in FIG. 32.

The flowchart to be explained by referring to FIG. 31 begins with a step S120a at which the image processing/evaluating unit 115 employed in the input/output processing unit 101 shown in FIG. 3 computes distances between the centers of gravity of the three linked elements, that is, the three points cited at the step S120 or other steps.

In the typical result shown in FIG. 32, points G31, G32 and G33 are centers of gravity of the three linked elements respectively. Thus, this step is executed to find the distances between the points G31 and G32, between the points G32 and G33 as well as between the points G33 and G31.

Then, at the next step S120b, the image processing/evaluating unit 115 selects centers of gravity Ga and Gb, the distance between which is longest, and finds the middle point between them as a point Gmid. Subsequently, at the next step S120c, the image processing/evaluating unit 115 takes the remaining center of gravity as a point Gaux. For example, in the typical result shown in FIG. 32, the point G31 is the center of gravity Ga, the point G32 is the center of gravity Gb, the point Gmid3132 is the middle point Gmid and the point G33 is the center of gravity Gaux.

Then, at the next step S120d, the image processing/evaluating unit 115 finds the distance (Gmid−Gaux) between the points Gmid and Gaux. Subsequently, at the next step S120e, the image processing/evaluating unit 115 finds the distance (Ga−Gb) between the points Ga and Gb.

Then, at the next step S120f, the image processing/evaluating unit 115 produces a result of determination as to whether or not the following relation holds true:

$$(Gmid-Gaux) > (Ga-Gb)/2$$

If the determination result produced in the process carried out at the step S120f is YES indicating that the distance (Gmid−Gaux) is longer than half the distance (Ga−Gb), the positions of the three points or the three linked centers of gravity are determined to be points located approximately on the circumference of a circle. That is to say, the final determination result produced in the process carried out at the step S120 of the flowchart explained earlier by referring to FIG. 24 is YES causing the flow of the processing to go on to the step S122.

If the determination result produced in the process carried out at the step S120f is NO indicating that the distance (Gmid−Gaux) is not longer than half the distance (Ga−Gb), on the other hand, the positions of the three points or the three linked centers of gravity are determined to be points not located on the circumference of a circle. That is to say, the final determination result produced in the process carried out at the step S120 of the flowchart explained earlier by referring to FIG. 24 is NO causing the flow of the processing to go on to the step S121.

The above description has explained details of the process carried out at the step S120 of the flowchart explained earlier by referring to FIG. 24 to produce a result of determination as to whether or not the three linked centers of gravity are located approximately on the circumference of a circle.

The following description explains details of the process carried out at the step S122 of the flowchart explained earlier by referring to FIG. 24 to produce a result of determination as to whether or not the three linked centers of gravity are moving.

The received-light image generation unit 114 employed in the input/output processing unit 101 shown in FIG. 3, that is, the received-light image generation unit 15 employed in the image inputting/outputting unit 1 shown in FIG. 2, outputs a plurality of pieces of received-light image data sequentially and continuously along the time axis. The received-light image data output by the received-light image generation unit 114 functioning as the received-light image generation unit 15 is field data or frame data. In this case, the typical processing represented by the flowchart explained earlier by referring to FIG. 24 is carried out for each piece of received-light image data taken, which is taken as a unit. In the following description, a piece of received-light image data subjected to the typical processing represented by the flowchart explained earlier by referring to FIG. 24 is referred to as observed received-light image data.

Point coordinates obtained as a result of execution of the processing represented by the flowchart explained earlier by referring to FIG. 24 (or, particularly, execution of the process at the step S107 of the flowchart) on received-light image data immediately preceding the observed received-light image data are stored in the detection-result holding unit 21 of the command recognition/issuance unit 17 employed in the image inputting/outputting unit 1 shown in FIG. 2 as explained before. As described earlier, the coordinates of each point of interest are part of object information.

On the other hand, point coordinates obtained as part of object information resulting from execution of the processing represented by the flowchart explained earlier by referring to FIG. 24 (or, particularly, execution of the process at the step S107 of the flowchart) on the observed received-light image data are also transferred from the object detection unit 16 to the command recognition/issuance unit 17 in the image inputting/outputting unit 1 shown in FIG. 2.

Either of the time-positional-change-command recognition unit 22 and the compound-command recognition unit 25 (which are employed in the command recognition/issuance unit 17 of the image inputting/outputting unit 1 shown in FIG. 2), that is, the command determination unit 116 employed in the input/output processing unit 101 shown in FIG. 3, compares the coordinates of the observed received-light image data with those of the received-light image data immediately preceding the observed received-light image data in order to produce a result of determination as to whether or not the points are moving at the step S122 of the flowchart explained earlier by referring to FIG. 24.

It is to be noted that in order to make the explanation simple, the following description is given on the assumption that the main section carrying out the processes of the step S122 and subsequent steps is the time-positional-change-command recognition unit 22.

Figure 33:
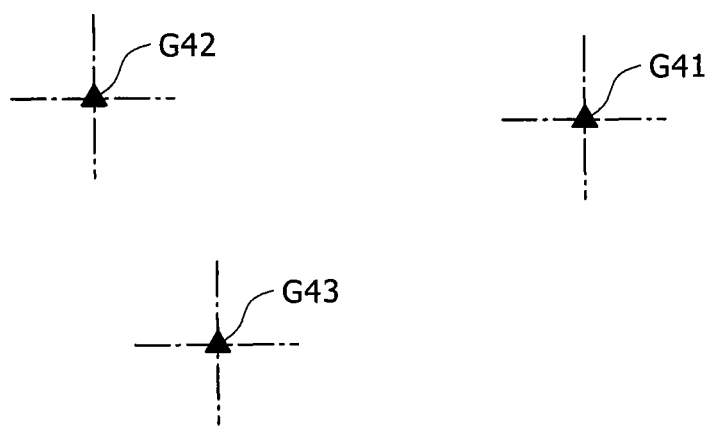
FIG. 33 is an explanatory diagram to be referred to in describing a typical substance of a determination process carried out at a step S122 of the flowchart shown in FIG. 24.

In addition, in the following description, it is also assumed that information on the centers of gravity G31, G32 and G33 having their positions related to each other as shown in FIG. 32 has been stored in the detection-result holding unit 21 of the command recognition/issuance unit 17 employed in the image inputting/outputting unit 1 shown in FIG. 2 as object information of the received-light image data immediately preceding the observed received-light image data. In the following description, the object information of the received-light image data immediately preceding the observed received-light image data is referred to as immediately preceding object information. On the other hand, information on the centers of gravity G41, G42 and G43 having their positions related to each other as shown in FIG. 33 is transferred from the object detection unit 16 to the time-positional-change-command recognition unit 22 of the command recognition/issuance unit 17 employed in the image inputting/outputting unit 1 shown in FIG. 2 as object information of the observed received-light image data. In the following description, the object information of the observed received-light image data is referred to as observed object information.

Figure 34:
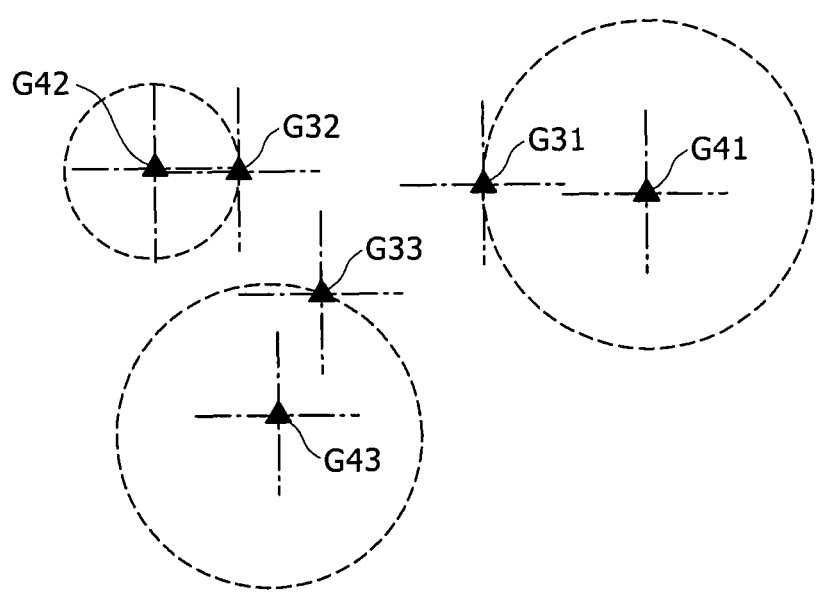
FIG. 34 is an explanatory diagram to be referred to in describing a typical substance of the determination process carried out at the step S122 of the flowchart shown in FIG. 24.

The positional relations between the observed object information and the immediately preceding object information are shown in FIG. 34. It is to be noted that, in the following description, the centers of gravity G41, G42 and G43 are referred to as observed centers of gravity G41, G42 and G43 while the centers of gravity G31, G32 and G33 are referred to as immediately preceding centers of gravity G31, G32 and G33.

That is to say, at the step S122 of the flowchart explained earlier by referring to FIG. 24, the time-positional-change-command recognition unit 22 employed in the image inputting/outputting apparatus 1 shown in FIG. 2 refers to information shown in FIG. 34 in order to produce a result of determination as to whether or not the points are moving.

To put it concretely, for example, the time-positional-change-command recognition unit 22 first produces a result of determination as to whether or not the positions of the observed centers of gravity G41, G42 and G43 have been shifted from the positions of the immediately preceding centers of gravity G31, G32 and G33 respectively. Then, if the result of the determination indicates that the positions of the observed centers of gravity G41, G42 and G43 have been shifted from the positions of the immediately preceding centers of gravity G31, G32 and G33 respectively, the time-positional-change-command recognition unit 22 finds movement vectors each representing the direction and distance of each of the movements made by the observed centers of gravity G41, G42 and G43.

The determination technique itself is not specially prescribed. However, the embodiment adopts the following technique to produce a result of determination as to whether or not the positions of the observed centers of gravity G41, G42 and G43 have been shifted from the positions of the immediately preceding centers of gravity G31, G32 and G33 respectively by measuring a distance between predetermined coordinates. That be more specific, the embodiment adopts a technique to measure the distance between the coordinates of an observed center of gravity and the coordinates of the corresponding immediately preceding center of gravity closest to the observed center of gravity.

In the case of the example shown in FIG. 34, the distance between the position of the observed center of gravity G43 and the position of the immediately preceding center of gravity G33 closest to the observed center of gravity G43 is measured in order to produce a result of determination as to whether or not the position of the observed center of gravity G43 has been shifted from the position of the immediately preceding center of gravity G33. Thus, in this case, a movement vector is found as a movement vector representing the movement distance and direction of a movement from the position of the immediately preceding center of gravity G33 to the position of the observed center of gravity G43. By the same token, the movement distance between the position of the observed center of gravity G42 and the position of the immediately preceding center of gravity G32 closest to the observed center of gravity G42 is measured in order to produce a result of determination as to whether or not the position of the observed center of gravity G42 has been shifted from the position of the immediately preceding center of gravity G32. Thus, in this case, a movement vector is found as a movement vector representing the movement distance and direction of a movement from the position of the immediately preceding center of gravity G32 to the position of the observed center of gravity G42. In the same way, the movement distance between the position of the observed center of gravity G41 and the position of the immediately preceding center of gravity G31 closest to the observed center of gravity G41 is measured in order to produce a result of determination as to whether or not the position of the observed center of gravity G41 has been shifted from the position of the immediately preceding center of gravity G31. Thus, in this case, a movement vector is found as a movement vector representing the movement distance and direction of a movement from the position of the immediately preceding center of gravity G31 to the position of the observed center of gravity G41.

To be more specific, the measured movement distance between the position of the observed center of gravity G43 and the position of the immediately preceding center of gravity G33 is compared with a threshold value determined in advance. By the same token, the measured movement distance between the position of the observed center of gravity G42 and the position of the immediately preceding center of gravity G32 is compared with the threshold value. In the same way, the measured movement distance between the position of the observed center of gravity G41 and the position of the immediately preceding center of gravity G31 is compared with the threshold value. If the time-positional-change-command recognition unit 22 finds that the movement distances are each greater than the threshold value, the determination result produced in the process carried out at the step S122 of the flowchart explained earlier by referring to FIG. 24 indicates that the points are being shifted. In this case, the flow of the processing represented by the flowchart explained earlier by referring to FIG. 24 goes on to the step S123. Otherwise, the execution of the processing is ended. It is to be noted that, as an alternative to the condition requiring that all the movement distances for the centers of gravity G41, G42 and G43 be greater than the threshold value, if any one of the movement distances for the centers of gravity G41, G42 and G43 is found greater than the threshold value, the determination result produced in the process carried out at the step S122 may also indicate that the points are being shifted. As another alternative, if any two of the movement distances for the centers of gravity G41, G42 and G43 are each found greater than the threshold value, the determination result produced in the process carried out at the step S122 may also indicate that the points are being shifted.

If the flow of the processing goes on to the step S123, at this step, the time-positional-change-command recognition unit 22 further determines how the points are moving. The determination technique itself is not specially limited. For example, since the movement vector representing the distance and direction of the movement made by each of the centers of gravity G41, G42 and G43 is known, however, a determination technique using the movement vectors can be adopted.

As another determination technique, the area of a triangle having its vertexes coinciding with the centers of gravity G31, G32 and G33 is compared with the area of a triangle having its vertexes coinciding with the centers of gravity G41, G42 and G43 as shown in FIG. 35 in order to further determine how the points are moving. In the following description, the triangle having its vertexes coinciding with the centers of gravity G31, G32 and G33 is referred to as an immediately preceding triangle whereas the triangle having its vertexes coinciding with the centers of gravity G41, G42 and G43 is referred to as an observed triangle. In accordance with this technique, if the area of the observed triangle is greater than that of the immediately preceding triangle by a predetermined quantity as is obvious from FIG. 35, the determination result produced in the process carried out at the step S123 of the flowchart explained earlier by referring to FIG. 24 indicates that the points are each being shifted in a direction enlarging the area of the immediately preceding triangle. In this case, the flow of the processing goes on to the step S124. If the area of the observed triangle is smaller than that of the immediately preceding triangle by a predetermined quantity, on the other hand, the determination result produced in the process carried out at the step S123 of the flowchart explained earlier by referring to FIG. 24 indicates that the points are each being shifted in a direction shrinking the area of the immediately preceding triangle. In this case, the flow of the processing goes on to the step S125.

By referring to FIGS. 25 to 35, main processes of the processing represented by the flowchart explained earlier by referring to FIG. 24 have been explained above.

If the processing represented by the flowchart explained earlier by referring to FIG. 24 is carried out while, for example, the operator is bringing its three fingers f1, f2 and f3 into contact with the display screen as shown in the upper portion of FIG. 23 and then moving the fingers in directions increasing the distances between the fingers, received-light images like the ones shown in the lower portion of FIG. 23 are obtained. In this case, since the three detected contact portions are moving in directions separating the contact portions from each other, the display screen is enlarged as shown in FIG. 36 after the operation is carried out by the user to move the fingers.

An example of changing the display state of a displayed image has been explained so far. In addition, by bringing a finger, a pen or other means into contact with the display area of the display apparatus, a variety of application processes can also be carried out. Next, by referring to FIGS. 37, 38 and 39, the following description explains an embodiment carrying out a process to edit sentences appearing on the display area. This embodiment is applied to a case in which text data such as a character string is displayed on the display area 121 as shown in the upper portion of FIG. 37, and an operation is carried out on the text data. In this case, the operator brings its two fingers f1 and f2 into contact with the display screen in such a way that the fingers sandwich a part of the sentences displayed on the screen. At that time, a received-light image like one shown in the lower portion of FIG. 37 is obtained and two contact portions 171 and 172 are detected.

Figure 38:
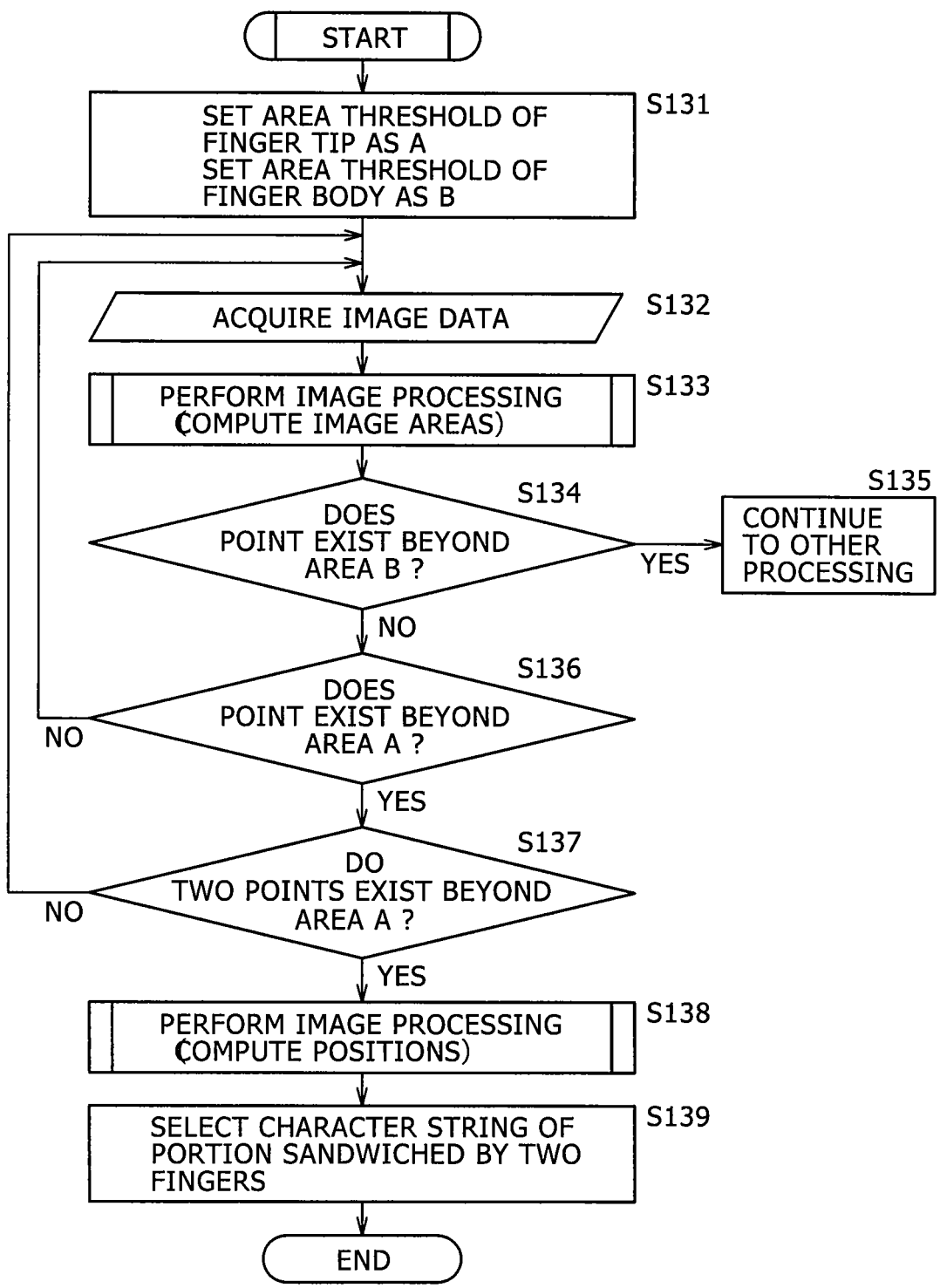
FIG. 38 shows a flowchart representing typical image processing (4) carried out to recognize an operation command from a received-light image in accordance with an embodiment of the present invention.

FIG. 38 shows a flowchart representing processing, which is carried out to recognize an operation command from a received-light image when the contact portions like the ones shown in FIG. 37 are detected. By referring to this flowchart, the following description explains the processing carried out to recognize an operation command entered by the operator on the basis of the sizes of a plurality of detected contact portions on a received-light image. In this case, a relation associating contact portions with an operation command entered by the operator is defined in advance as a statement saying that, if two fingers are brought at the same time into contact with the two ends of a character string of text data serving as displayed data, the character string is said to be a character string selected by the operation command.

In other words, an example of the processing represented by the flowchart to be explained later by referring to FIG. 38 represents processing carried out mainly as the functions of the positional-relation-command recognition unit 23, the command-definition holding unit 26 and the command issuance unit 27. Which are employed in the command recognition/issuance unit 17 of the image inputting/outputting apparatus 1 shown in FIG. 2 as a section configured to operate as the command determination unit 116. That is to say, the processing represented by the flowchart to be explained by referring to FIG. 38 represents following processing. As a relation associating contact portions with an operation command entered by the operator is carried out, a definition has been stored in the command-definition holding unit 26 as the definition stating that, if two fingers are brought at the same time into contact with the two ends of a character string of text data serving as displayed data, the character string is said to be a character string selected by the operation command. On the basis of the definition stored in the command-definition holding unit 26, the positional-relation-command recognition unit 23 recognizes an operation command as an internal command to be issued by the command issuance unit 27 to scroll a displayed image in the direction to the left or an internal command to be issued by the command issuance unit 27 to scroll a displayed image in the direction to the right.

It is to be noted that much like the point mentioned in the explanation of the processing represented by the flowchart shown in FIG. 8, a point mentioned in the explanation of the processing represented by the flowchart shown in FIG. 38 does not mean a pixel, but implies an object cited earlier or a linked element cited in the flowchart explained earlier by referring to figures such as FIG. 9.

The flowchart to be explained by referring to FIG. 38 begins with a step S131 at which a threshold value of an area used for detecting the tip of a finger as a contact portion is set at A and a threshold area used for detecting the body of a finger as a contact portion is set at B. Then, at the next step S132, image data obtained as a result of a process carried out by the received-light image generation unit 114 to convert a received-light signal is acquired. Subsequently, at the next step S133, first image processing is carried out to compute the area of each contact portion. It is to be noted that details of the first image processing carried out at the step S133 have been explained earlier by referring to FIGS. 9 to 16. The flow of the processing then goes on to the next step S134 to produce a result of determination as to whether or not the image data includes a point with a computed area at least equal to the threshold value B. If the result of the determination indicates that the image data includes a point with a computed area at least equal to the threshold value B, the flow of the processing goes on to a step S135 at which another process is carried out. If the result of the determination indicates that the image data does not include a point with a computed area at least equal to the threshold value B, on the other hand, the flow of the processing goes on to a step S136 to produce a result of determination as to whether or not the image data includes a point with a computed area at least equal to the threshold value A. If the result of the determination indicates that the image data does not include a point with a computed area at least equal to the threshold value A, the flow of the processing goes back to the step S132 at which the next image data is acquired. If the result of the determination indicates that the image data includes a point with a computed area at least equal to the threshold value A, on the other hand, the flow of the processing goes on to the step S137 to produce a result of determination as to whether or not the image data includes two points each having a computed area at least equal to the threshold value A. If the result of the determination indicates that the image data does not include two points each having a computed area at least equal to the threshold value A, the flow of the processing goes back to the step S132 at which the next image data is acquired. If the result of the determination indicates that the image data includes two points each having a computed area at least equal to the threshold value A, on the other hand, the flow of the processing goes on to the step S138 at which a process is carried out to find a relation between the positions of the two points each having a computed area at least equal to the threshold value A. It is to be noted that details of the process carried out at the step S138 have been described before by referring to FIGS. 17 to 20. If a result of the process carried out at the step S138 to find a relation between the positions of the two points each having a computed area at least equal to the threshold value A indicates that the two points are separated from each other by a predetermined distance, the flow of the processing goes on to a step S139 at which an internal command is issued to select a character string sandwiched by the two points.

In this embodiment, the operator issues an operation command to edit sentences. Thus, after the command determination unit 116 carries out the processing represented by the flowchart described above, the input/output processing unit 101 reports the substance of the recognized operation command to the document processing unit 102, which carries out an external application corresponding to the operation command. That is to say, the document processing unit 102 carries out a process to edit the text data in accordance with the substance of the recognized operation command. Finally, the document processing unit 102 supplies the result of the edit process to the image inputting/outputting unit 1 which generates data from the result of the edit process and displays an image based on the data.

For example, the operator carries out an operation to bring the two fingers f1 and f2 into contact with the display area 121 so as to sandwich a portion H1 of a sentence displayed on the display area 121 as shown in the upper portion of FIG. 37. In this case, after the operator carries out the operation, the display screen shows a state in which the sentence portion H1 sandwiched by the fingers f1 and f2 is selected as shown in FIG. 39.

Figure 41:
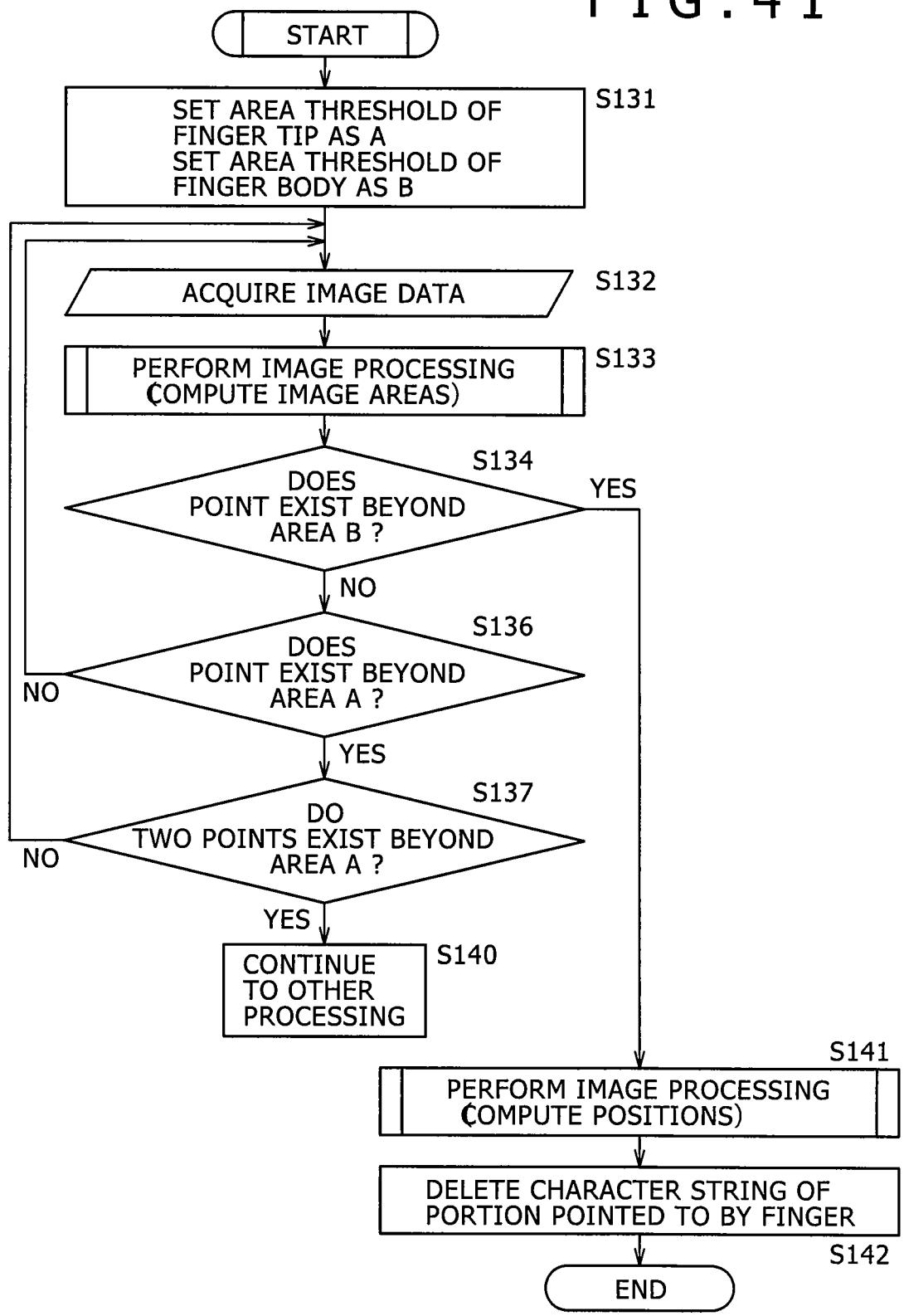
FIG. 41 shows a flowchart representing typical image processing (5) carried out to recognize an operation command from a received-light image in accordance with an embodiment of the present invention.

Next, by referring to FIGS. 40, 41 and 42, the following description explains another process to edit sentences appearing on the display area 121. FIG. 40 is a diagram showing a case in which text data such as a character string appears on the display area 121 and the operator placed a finger f1 on the character string of a sentence appearing on the display screen. At that time, a received-light image like one shown in the lower portion of FIG. 40 is obtained and a thin long contact portion 181 is detected.

FIG. 41 shows a flowchart representing processing to recognize an operation command from a received-light image for a case in which a contact portion like the one shown in FIG. 40 is detected. In the case of this processing, a relation associating a contact portion with an operation command is defined in advance as a relation stating that, in the case of text data displayed on the screen, a character string of the text data is erased if a finger is placed on the character string.

In other words, an example of processing represented by a flowchart to be explained later by referring to FIG. 41 represents processing carried out mainly as the functions of the shape-command recognition unit 24, the command-definition holding unit 26 and the command issuance unit 27. These units are employed in the command recognition/issuance unit 17 of the image inputting/outputting apparatus 1 shown in FIG. 2 as a section configured to operate as the command determination unit 116 employed in the input/output processing unit 101 shown in FIG. 3. That is to say, the processing represented by the flowchart to be explained by referring to FIG. 41 represents processing in which, as a relation has been stored in the command-definition holding unit 26 as a relation associating contact portions with an operation command entered by the operator, the definition stating that, if a finger is placed on a character string of text data serving as displayed data, the characters string is determined as a character string to be deleted by the operation command. On the basis of the definition stored in the command-definition holding unit 26, the shape-command recognition unit 24 recognizes an operation command as an internal command to be issued by the command issuance unit 27 to delete the character string in a range covered by the finger.

It is to be noted that much like the point mentioned in the explanation of the processing represented by the flowchart shown in FIG. 8, a point mentioned in the explanation of the processing represented by the flowchart shown in FIG. 41 does not mean a pixel, but implies an object cited earlier or a linked element cited in the flowchart explained earlier by referring to figures such as FIG. 9.

In the processing represented by the flowchart to be explained by referring to FIG. 41, from the step S131 to the step S134, is similar to those of the flowchart explained earlier by referring to FIG. 38. The processing at the step S131 executes to set a threshold value of an area used for detecting the tip of a finger as a contact portion at A and sets a threshold area used for detecting the body of a finger as a contact portion at B. The processing at the step S134 executes to produce a result of determination as to whether or not the image data includes two points each having a computed area at least equal to the threshold value B. The processing if the image data does not include two points each having a computed area at least equal to the threshold value B, which is identical with their respective counterpart steps of the flowchart explained earlier by referring to FIG. 38. The flowchart to be explained by referring to FIG. 41 includes additional steps S141 and S142, which are executed if the determination result produced in the process carried out at the step S134 indicates that the image data includes a point with a computed area at least equal to the threshold value B. To be more specific, at the step S141, second image processing is carried out to compute the position of a contact position at the point. It is to be noted, however, that the second image processing carried out to compute the position of a contact position is different from the image processing carried out to compute positions in accordance with the flowchart explained earlier by referring to FIG. 17. The second image processing is carried out to compute the position of the contact portion, which is one whole linked element on the received-light image in this case. If the result of the second image processing carried out to compute the position of a contact position indicates that the contact portion is superposed on a character string appearing on the display screen, the flow of the processing goes on to the step S142. At this step, the operation command entered by the operator is recognized as an internal command to delete the character string, on which the contact portion is superposed.

FIG. 42 is a diagram showing a post-operation display screen obtained as a result of execution of the processing described above. When the operator places the finger f1 on a character string H2 appearing on the display area 121 as shown in the upper portion of FIG. 40, the character string H2 superposed by the finger f1 is deleted as shown in FIG. 42.

It is to be noted that the processing represented by the flowchart explained by referring to FIGS. 38 and 41 are not exclusive of each other. That is to say, the former processing and the latter processing can be carried out at the same time as shown in a flowchart shown in FIG. 43. In this embodiment, text data is edited by "selecting" or "deleting" a sentence as described above. However, the operation command can also be associated with contact portions in a relation other than the relations of selecting and deleting a sentence. In addition, the operation command can also be associated with contact portions in a relation stating execution of any internal command.

Figure 43:
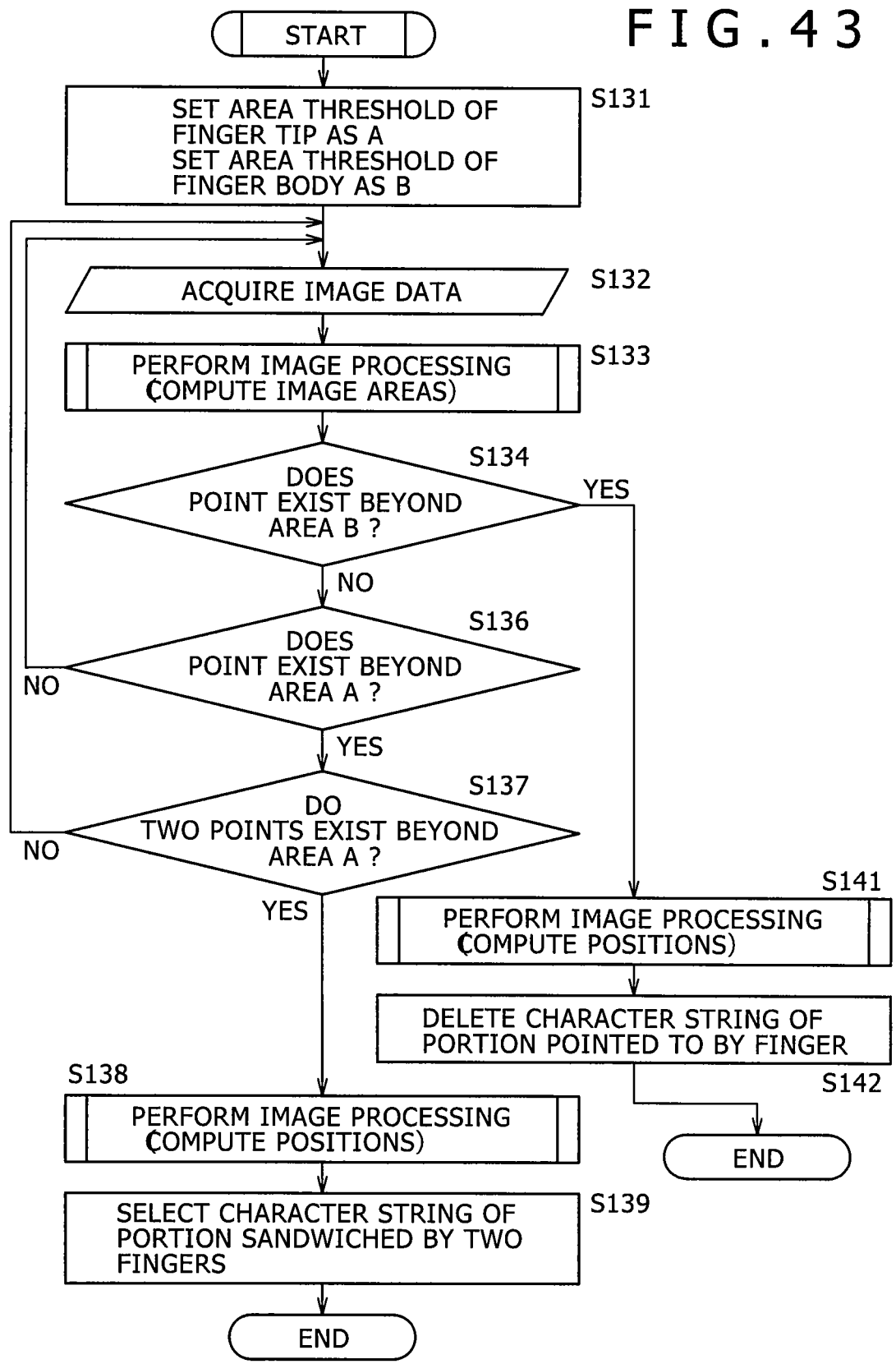
FIG. 43 shows a flowchart representing typical image processing (6) carried out to recognize an operation command from a received-light image in accordance with an embodiment of the present invention.

It is to be noted that much like the point mentioned in the explanation of the processing represented by the flowchart shown in FIG. 8, a point mentioned in the explanation of the processing represented by the flowchart shown in FIG. 43 does not mean a pixel, but implies an object cited earlier or a linked element cited in the flowchart explained earlier by referring to figures such as FIG. 9.

In the embodiments described above, substances brought into contact with respectively a plurality of contact portions on a display area of a display apparatus or brought to positions in close proximity to the contact portions respectively in accordance with an operation command entered by the operator are detected and the state of each of the contact portions is used as a basis to recognize the operation command as follows.

Relations of the positions of the contact portions each serving as an object are used as a basis to recognize the operation command.

Changes of the positions of the contact portions, which each serve as an object, with the lapse of time are used as a basis to recognize the operation command.

Shapes (such as sizes and other attributes) of the contact portions each serving as an object are used as a basis to recognize the operation command.

By defining a relation associating another condition with an operation command, the operation command can be recognized as an internal command to carry out another operation on the display screen and another process to edit text data. The other condition can be a combination of the bases listed above, the number of contact portions each touched or approached by a substance or directions of movements of the contact portions. In addition to the other operation carried out on the display screen and the other process to edit text data, a specific application can also be performed. In the case of a specific application, an application processing unit for carrying out the application can be configured as a unit external to the input/output processing unit 101.

In the embodiments described above, mainly, a reflective substance such as a finger is brought into contact with a contact portion on a display area or brought to a position in close proximity to the contact portion. However, the set of operation commands is not limited to commands according to conditions set by these embodiments because light receiving devices are laid out on the display surface of the display/received-light panel unit 120 provided by the present invention to form a two-dimensional array of devices. For example, an operation command can be issued by using a plurality of light sources including a laser pointer, changing the size of the light beam, changing the shape of the light beam or using any of their combinations.

As an alternative, the operator can issue an operation command by using any image appearing on the display screen as an image other than a received-light image as long as the other image varies in accordance with the command. An example of the other image is a created and detected image of another substance brought into contact with a contact portion on the display area of the display apparatus or brought to a position in close proximity to the display screen to carry out specific processing. For example, when a clip is put on the display screen, a specific application can be processed or when a key is placed on the display screen and rotated in the clockwise or counterclockwise direction, respectively, a locking or unlocking process can be carried out.

By the way, the series of processes described previously can be carried out by hardware and/or execution of software.

Figure 44:
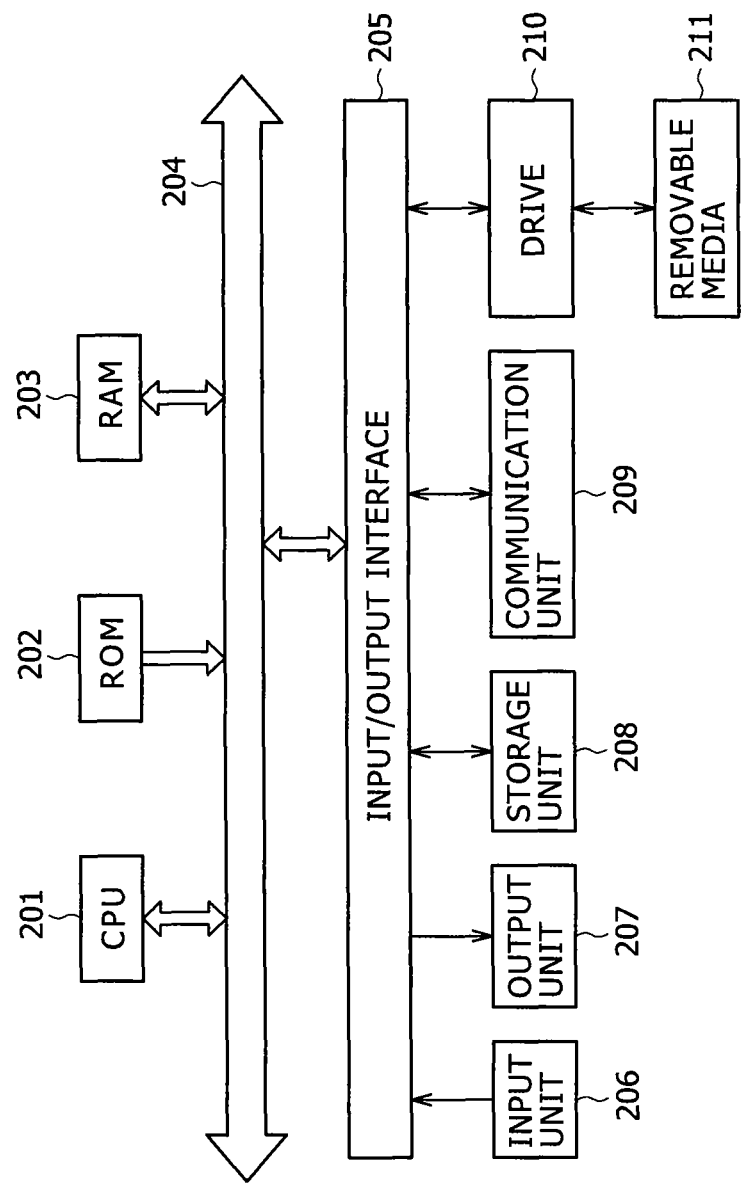
FIG. 44 is a block diagram showing a typical configuration of a personal computer for executing software in order to carry out processing to which the present invention is applied.

In this case, at least some parts of the image inputting/outputting unit 1 shown in FIG. 1 can be implemented by a personal computer having a configuration like one shown in FIG. 44.

In the personal computer shown in FIG. 44, a CPU (Central Processing Unit) 201 carries out various kinds of processing by execution of programs stored in a ROM (Read Only Memory) 202 or programs loaded from a storage unit 208 into a RAM (Random Access Memory) 203. The RAM 203 is also used for properly storing various kinds of information such as data demanded by the CPU 201 in execution of the processing.

The CPU 201, the ROM 202 and the RAM 203 are connected to each other by a bus 204, which is also connected to an input/output interface 205.

The input/output interface 205 is connected to an input unit 206, an output unit 207, the storage unit 208 and a communication unit 209. The input unit 206 includes a keyboard and a mouse whereas the output unit 207 includes a display unit. The storage unit 208 includes a hard disk. The communication unit 209 has a modem or a terminal adaptor. The communication unit 209 controls for carrying out communication processing with other apparatus not shown in the figure through a network including the Internet.

If necessary, the input/output interface 205 is also connected to a drive 210 on which a removable recording medium 211 is properly mounted. The removable recording medium 211 can be a magnetic disk, an optical disk, a magneto-optical disk or a semiconductor memory. A computer program to be executed by the CPU 201 is loaded from the removable recording medium to be installed in the storage unit 208 if necessary.

The series of processes described previously can be carried out by hardware and/or execution of software. If the series of processes described above is carried out by execution of software, programs including the software can be installed into a computer embedded in dedicated hardware, a general-purpose personal computer or the like from typically a network or the recording medium. In this case, the computer or the personal computer serves as at least some parts of the image inputting/outputting unit 1 described above by referring to FIG. 2. A general-purpose personal computer is a personal computer, which can be made capable of carrying out a variety of functions by installing a variety of programs into the personal computer.

The aforementioned recording medium for recording programs to be installed into the computer or the general-purpose personal computer as programs to be executed by the computer or the general-purpose personal computer respectively is a removable recording medium 211 provided to the user separately from the main unit of the image inputting/outputting unit 1 as shown in FIG. 44. Examples of the removable recording medium 211, which is also referred to as a package medium, include the magnetic disk such as a flexible disk, the optical disk such as a CD-ROM (Compact Disk-Read Only Memory) or a DVD (Digital Versatile Disk), the magneto-optical disk such as an MD (Mini Disk) as well as the semiconductor memory. Instead of installing the programs from the removable recording medium 211, the programs can also be stored in advance in an embedded recording medium included in the main unit of the image inputting/outputting unit 1. Examples of the embedded recording medium are a hard disk included in the storage unit 208 and the ROM 202.

It is also worth noting that, in this specification, steps of the flowchart described above can be carried out in a pre-prescribed order along the time axis as well as concurrently or individually.

It is also to be noted that the technical term "system" used in this specification implies the configuration of a confluence including a plurality of apparatus.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display apparatus capable of displaying an image and receiving light simultaneously or alternately, said display apparatus comprising:
   a processor;
   a backlight;
   a plurality of display devices configured to form a matrix;
   a plurality of light receiving devices operatively connected to the processor, the plurality of light receiving devices placed at a location in close proximity to one of said display devices; and
   a memory device operatively coupled to the processor, the memory device storing instructions which when executed by the processor, cause the processor to operate with the plurality of light receiving devices and the backlight to:
   (a) turn on the backlight during a backlight on period of a frame and turn off the backlight during a backlight off period of the frame;
   (b) read out received-light signals representing light received by the light receiving devices during the backlight on period and the backlight off period;
   (c) generate image data representing a state of a substance brought into contact with said display screen or close proximity thereof based on the received-light signals, said image data including a plurality of pixels, said pixels including a first type of pixel and a second type of pixel;
   (d) for said first type of pixel, determine whether a designated number of the second type of pixels surround said first type of pixel;
   (e) if the designated number of the second type of pixels surround said first type of pixel, set a first pixel value for said first type of pixel;
   (f) if the designated number of the second type of pixels do not surround said first type of pixel, set a second different pixel value for said first type of pixel;
   (g) determine whether a plurality of said first type of pixels form a linked element;
   (h) eliminate a linked element from the plurality of linked elements before appending a label to the plurality of linked elements if the linked element is formed of a number of the first type of pixels less than a first predetermined number of pixels;
   (i) append a label to at least two of the plurality of linked elements formed of a number of the first type of pixels greater than or equal to the first predetermined number of pixels;
   (j) for at least two of the plurality of linked elements with an appended label, evaluate:
      (i) a position and size of a substance brought into contact with said display screen or close proximity thereof; and
      (ii) changes in said position and in said size based on the set pixel value for said first type of pixel of the generated image data; and
   (k) recognize, upon detection of a plurality of contact portions each touched or approached by said substance, a command entered by an operator based on at least one of:
      (i) a relation between positions of the plurality of contact portions each touched by a substance or approached by said substance;
      (ii) a change of the position of each of said contact portions; and
      (iii) the size of each of said contact portions; and (l) for the plurality of contact portions which correspond to linked elements, carry out predetermined processing according to the recognized command; and
wherein the backlight on period and the backlight off period each include a first half and a second half such that:
the received-light signals are reset during the first half of the backlight on period and the backlight off period, and
the received-light signals are read out during the second half of the backlight on period and the backlight off period.

2. The display apparatus of claim 1, wherein said predetermined processing includes changing a displayed image displayed by said display devices.

3. The display apparatus of claim 1, wherein said predetermined processing includes changing an operation of an application for generating a displayed image displayed by said display devices.

4. The display apparatus of claim 1, wherein an image to be detected in processing is an image of a substance placed on said display screen or a shape of a shadow of a substance placed at a position in close proximity to said display screen.

5. A display method capable of displaying an image and receiving light simultaneously or alternately, said display method comprising:
displaying an image by using a plurality of display devices forming a matrix;
turning on a backlight during a backlight on period of a frame and turning off the backlight during a backlight off period of the frame;
reading out received-light signals representing light received by a plurality of light receiving devices placed adjacent to at least one of the display devices during the backlight on period and the backlight off period;
generating image data which includes a plurality of pixels based on the received-light signals, said pixels including a first type of pixel and a second type of pixel;
for said first type of pixel, determining whether a designated number of the second type of pixels surround said first type of pixel;
if the designated number of the second type of pixels surround said first type of pixel, setting a first pixel value for said first type of pixel;
if the designated number of the second type of pixels do not surround said first type of pixel, setting a second different pixel value for said first type of pixel;
determining whether a plurality of said first type of pixels form a linked element;
eliminating a linked element from the plurality of linked elements before appending a label to the plurality of linked elements if the linked element is formed of a number of the first type of pixels less than a first predetermined number of pixels;
appending a label to at least two of the plurality of linked elements formed of a number of the first type of pixels greater than or equal to the first predetermined number of pixels; and
carrying out predetermined processing for a plurality of contact portions corresponding to the linked elements, which are detected when a substance is brought into contact with said contact portion or close proximity thereof, in accordance with at least one of:
(a) a relation between positions of said contact portions;
(b) a change of the position of each of said contact portions; and
(c) the size of each of said contact portions; and
wherein the backlight on period and the backlight off period each include a first half and a second half such that:
the received-light signals are reset during the first half of the backlight on period and the backlight off period, and
the received-light signals are read out during the second half of the backlight on period and the backlight off period.

6. An image processing method used for a display apparatus, said display apparatus capable of: (a) displaying an image by using a plurality of display devices configured to form a matrix; (b) turning on a backlight during a backlight on period of a frame and turning off the backlight during a backlight off period of the frame; and (c) reading out received-light signals representing light received by a plurality of light receiving devices placed adjacent to at least one of the display devices during the backlight on period and the backlight off period, said image processing method comprising:
generating image data which includes a plurality of pixels based on said received-light signals, said pixels including a first type of pixel and a second type of pixel;
for said first type of pixel, determining whether a designated number of the second type of pixels surround said first type of pixel;
if the designated number of the second type of pixels surround said first type of pixel, setting a first pixel value for said first type of pixel;
if the designated number of the second type of pixels do not surround said first type of pixel, setting a second different pixel value for said first type of pixel;
determining whether a plurality of said first type of pixels form a linked element;
eliminating a linked element from the plurality of linked elements before appending a label to the plurality of linked elements if the linked element is formed of a number of the first type of pixels less than a first predetermined number of pixels;
appending a label to at least two of the plurality of linked elements formed of a number of the first type of pixels greater than or equal to the first predetermined number of pixels; and
carrying out predetermined processing for a plurality of contact portions corresponding to the linked elements, which are detected when a substance is brought into contact with said contact portion or close proximity thereof, in accordance with at least one of:
(a) a relation between positions of said contact portions;
(b) a change of the position of each of said contact portions; and
(c) the size of each of said contact portions; and
wherein the backlight on period and the backlight off period each include a first half and a second half such that:
the received-light signals are reset during the first half of the backlight on period and the backlight off period, and
the received-light signals are read out during the second half of the backlight on period and the backlight off period.

7. The display apparatus of claim 1, wherein the processor operates with the plurality of light receiving devices to:
(l) for each of the plurality of linked elements, count a number of the first type of pixels forming the linked element.

8. The display apparatus of claim 7, wherein the processor operates with the plurality of light receiving devices to:

(m) eliminate at least one of the plurality of linked elements with the appended label, formed of a number of the first type of pixels below a second predetermined number of pixels, from the plurality of linked elements with the appended label before evaluating the plurality of linked elements with the appended label.

9. The display apparatus of claim 1, wherein each of the plurality of display devices has a corresponding light receiving device.

10. The display apparatus of claim 1, wherein the processor operates with the plurality of light receiving devices to:
generate a received-light difference signal representing a difference between a received-light signal read out during the backlight on period and a received-light signal read out during the backlight off period,
wherein the image data is generated based on the received-light difference signal.

\* \* \* \* \*